United States Patent
Hirschmann et al.

(10) Patent No.: US 11,920,075 B2
(45) Date of Patent: Mar. 5, 2024

(54) LIQUID-CRYSTAL MEDIUM

(71) Applicant: MERCK PATENT GMBH, Darmstadt (DE)

(72) Inventors: Harald Hirschmann, Darmstadt (DE); Andreas Pohle, Pfungstadt (DE); Christian Hock, Mainaschaff (DE); Martina Windhorst, Muenster (DE); Sabine Schoen, Herten (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 17/415,819

(22) PCT Filed: Dec. 17, 2019

(86) PCT No.: PCT/EP2019/085543
§ 371 (c)(1),
(2) Date: Jun. 18, 2021

(87) PCT Pub. No.: WO2020/127193
PCT Pub. Date: Jun. 25, 2020

(65) Prior Publication Data
US 2022/0112426 A1    Apr. 14, 2022

(30) Foreign Application Priority Data
Dec. 20, 2018 (DE) .................. 10 2018 010 212.3

(51) Int. Cl.
| | |
|---|---|
| *C09K 19/30* | (2006.01) |
| *C09K 19/02* | (2006.01) |
| *C09K 19/04* | (2006.01) |
| *C09K 19/54* | (2006.01) |
| *G02F 1/137* | (2006.01) |

(52) U.S. Cl.
CPC ...... *C09K 19/3066* (2013.01); *C09K 19/0208* (2013.01); *C09K 19/3003* (2013.01); *C09K 19/54* (2013.01); *G02F 1/13706* (2021.01); *C09K 2019/0466* (2013.01); *C09K 2019/3004* (2013.01); *C09K 2019/3009* (2013.01); *C09K 2019/3016* (2013.01); *C09K 2019/3019* (2013.01); *C09K 2019/3021* (2013.01); *C09K 2019/3025* (2013.01)

(58) Field of Classification Search
CPC ..................................................... C09K 19/30
See application file for complete search history.

(56) References Cited

U.S. PATENT DOCUMENTS

| | | | | |
|---|---|---|---|---|
| 5,714,087 | A  * | 2/1998 | Pausch ................... | C09K 19/12 252/299.6 |
| 2014/0061534 | A1* | 3/2014 | Goebel .................. | C09K 19/44 252/299.61 |
| 2014/0361219 | A1 | 12/2014 | Yanai et al. | |
| 2018/0127652 | A1 | 5/2018 | Yano | |
| 2018/0179446 | A1* | 6/2018 | Klasen-Memmer ....................... | C09K 19/3003 |
| 2018/0187080 | A1* | 7/2018 | Song ................... | C08F 220/282 |

FOREIGN PATENT DOCUMENTS

| | | | | |
|---|---|---|---|---|
| EP | 2811003 | A1 * | 12/2014 | ......... C09K 19/3003 |
| WO | 2013114780 | A1 | 8/2013 | |
| WO | 2016199528 | A1 | 12/2016 | |

OTHER PUBLICATIONS

International Search Report for PCT/EP2019/085543 dated Mar. 27, 2020.
Search report in corresponding EP 19829495.1 dated Oct. 17, 2023 (pp. 1-4).
Search report in corresponding JP Patent Application No. 2021-535704 dated Oct. 30, 2023 (pp. 1-2).

* cited by examiner

*Primary Examiner* — Chanceity N Robinson
(74) *Attorney, Agent, or Firm* — Millen, White, Zelano & Branigan, P.C.; Brion P. Heaney

(57) ABSTRACT

The present invention relates to a liquid-crystalline medium (LC medium), to the use thereof for electro-optical purposes, and to LC displays containing this medium.

26 Claims, No Drawings

LIQUID-CRYSTAL MEDIUM

The present invention relates to a liquid-crystalline medium (LC medium), to the use thereof for electro-optical purposes, and to LC displays containing this medium.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a "twisted nematic" structure, STN ("super-twisted nematic") cells, SBE ("super-birefringence effect") cells and OMI ("optical mode interference") cells. The commonest display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and give rise to short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), LC media having large positive dielectric anisotropy, broad nematic phases, relatively low birefringence, very high specific resistance, good UV and temperature stability and low vapour pressure are desired.

Matrix liquid-crystal displays of this type are known. Examples of non-linear elements which can be used to individually switch the individual pixels are active elements (i.e. transistors). The term "active matrix" is then used, where a distinction can be made between two types:
1. MOS (metal oxide semiconductor) or other diodes on silicon wafers as substrate.
2. Thin-film transistors (TFTs) on a glass plate as substrate.

The use of single-crystal silicon as substrate material restricts the display size, since even modular assembly of various part-displays results in problems at the joints.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are backlit.

The term MLC displays here encompasses any matrix display with integrated non-linear elements, i.e., besides the active matrix, also displays with passive elements, such as varistors or diodes (MIM=metal-insulator-metal).

MLC displays of this type are particularly suitable for TV applications (for example pocket televisions) or for high-information displays for computer applications (laptops) and in automobile or aircraft construction. Besides problems regarding the angle dependence of the contrast and the response times, difficulties arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: a 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris].

With decreasing resistance, the contrast of an MLC display deteriorates, and the problem of after-image elimination may occur. Since the specific resistance of the liquid-crystal mixture generally drops over the life of an MLC display owing to interaction with the inside surfaces of the display, a high (initial) resistance is very important in order to obtain acceptable lifetimes. In particular in the case of low-volt mixtures, it was hitherto impossible to achieve very high specific resistances. It is furthermore important that the specific resistance exhibits the smallest possible increase with increasing temperature and after heat and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not satisfy today's requirements.

Besides liquid-crystal displays which use backlighting, and are thus operated transmissively and if desired transflectively, reflective liquid-crystal displays are also particularly interesting. These reflective liquid-crystal displays use the ambient light for information display. They therefore consume significantly less energy than backlit liquid-crystal displays having a corresponding size and resolution. Since the TN effect is characterised by very good contrast, reflective displays of this type can still be read well even in bright ambient conditions. This is already known of simple reflective TN displays, as used, for example, in watches and pocket calculators. However, the principle can also be applied to high-quality, relatively high-resolution displays with active-matrix addressing, such as, for example, TFT displays.

Here, as already in the case of the generally usual transmissive TFT-TN displays, the use of liquid crystals of low birefringence ($\Delta n$) is necessary in order to achieve low optical retardation ($d \cdot \Delta n$). This low optical retardation results in usually acceptable low viewing-angle dependence of the contrast (cf. DE 30 22 818). In the case of reflective displays, the use of liquid crystals of low birefringence is even more important than in the case of transmissive displays since the effective layer thickness through which the light passes is approximately twice as great in reflective displays than in transmissive displays having the same layer thickness.

In order to achieve 3D effects by means of shutter spectacles, use is made of, in particular, fast-switching mixtures having low rotational viscosities and correspondingly high optical anisotropy (Δn). Electro-optical lens systems, by means of which a 2-dimensional representation of a display can be converted into a 3-dimensional autostereoscopic representation, can be achieved using mixtures having high optical anisotropy (Δn).

Thus, there continues to be a great demand for MLC displays having very high specific resistance at the same time as a large working-temperature range, short response times, even at low temperatures, and a low threshold voltage which do not exhibit these disadvantages or only do so to a reduced extent.

In the case of TN (Schadt-Helfrich) cells, LC media are desired which facilitate the following advantages in the cells:
  extended nematic phase range (in particular down to low temperatures)
  the ability to switch at extremely low temperatures (outdoor use, automobiles, avionics)
  increased resistance to UV radiation (longer lifetime)
  low threshold voltage.

With the LC media available from the prior art, these advantages cannot be achieved while simultaneously retaining the other parameters. Modern LCD flat-panel screens require ever-faster response times in order to be able to reproduce multimedia content, such as, for example, films and video games, realistically. This in turn requires nematic liquid-crystal mixtures that have very low rotational viscosity $\gamma_1$ with high optical anisotropy Δn. In order to obtain the requisite rotational viscosities, substances are sought which have a particularly advantageous $\gamma_1$/clearing point ratio at the same time as high Δn with high polarity.

In the case of supertwisted (STN) cells, media are desired which facilitate greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

In particular in the case of LC displays for TV and video applications (for example LCD TVs, monitors, PDAs, notebooks, games consoles), a significant reduction in the response times is desired. This requires LC mixtures having low rotational viscosities and high dielectric anisotropies. At the same time, the LC media should have high clearing points.

The invention is based on the object of providing LC media, in particular for MLC, TN, PS-TN, STN, ECB, OCB, IPS, PS-IPS, FFS, PS-FFS or positive VA displays of this type, which do not have the disadvantages indicated above, or only do so to a lesser extent, and preferably have fast response times and low rotational viscosities at the same time as a high clearing point, and high dielectric anisotropy and a low threshold voltage.

It has now been found that this object can be achieved if LC media as described below are used.

The invention relates to a liquid-crystalline (LC) medium, characterised in that it has positive dielectric anisotropy and comprises one or more compounds of the formula IA and one or more compounds of the formula IB

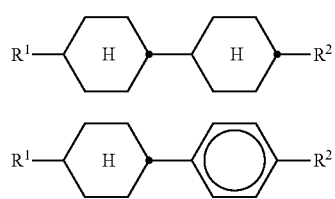

in which $R^1$ and $R^2$ in each case, independently of one another, denote alkyl, alkoxy, oxaalkyl or fluoroalkyl, in each case having 1 to 8 C atoms, and where the LC medium comprises no compounds selected from the formulae IA and IB in which the radicals $R^1$ and $R^2$ have the meaning indicated above and in which, in addition, one or both radicals $R^1$ or $R^2$ contain a C=C double bond.

The LC medium according to the invention preferably comprises no compounds containing a C=C double bond, except for a C=C double bond as constituent of a polymerisable group or of an aromatic or unsaturated ring.

The present invention furthermore relates to the use of LC mixtures according to the invention, as described above and below, in electro-optical displays, in particular LC displays, preferably in TN, PS-TN, STN, TN-TFT, OCB, IPS, PS-IPS, FFS, PS-FFS, positive-VA and PS-positive-VA displays, and in LC windows and shutter spectacles, in particular for 3D applications.

The invention furthermore relates to an electro-optical display, in particular an LC display, preferably of the TN, PS-TN, STN, TN-TFT, OCB, IPS, PS-IPS, FFS, PS-FFS, positive-VA or positive-PS-VA type, an LC window, or shutter spectacles for 3D applications, containing an LC medium according to the invention.

Surprisingly, it has been found that the LC media according to the invention have high dielectric anisotropy Δε, high birefringence Δn, low rotational viscosity $\gamma_1$ and at the same time high VHR values and good low-temperature stability. They are therefore particularly suitable for applications in monitors, notebooks and multimedia devices.

The following meanings apply above and below:

The term "mesogenic group" is known to the person skilled in the art and is described in the literature, and denotes a group which, due to the anisotropy of its attractive and repulsive interactions, makes a significant contribution to effecting a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in *Pure Appl. Chem.* 2001, 73(5), 888 and C. Tschierske, G. Pelzl, S. Diele, *Angew. Chem.* 2004, 116, 6340-6368.

The term "spacer" of "spacer group", also called "Sp" above and below, is known to the person skilled in the art and is described in the literature, see, for example, *Pure Appl. Chem.* 2001, 73(5), 888 and C. Tschierske, G. Pelzl, S. Diele, *Angew. Chem.* 2004, 116, 6340-6368. Unless indicated otherwise, the term "spacer group" or "spacer" above and below denotes a flexible group which connects the mesogenic group and the polymerisable group(s) in a polymerisable mesogenic compound to one another.

The term "reactive mesogen" or "RM" denotes a compound containing a mesogenic group and one or more functional groups which are suitable for polymerisation (also called polymerisable group or group P).

The terms "low-molecular-weight compound" and "unpolymerisable compound" denote compounds, usually monomeric, which do not contain a functional group that is suitable for polymerisation under the usual conditions known to the person skilled in the art, in particular under the conditions used for the polymerisation of RMs.

The term "polymerisable compound", unless indicated otherwise, denotes a monomeric polymerisable compound.

Above and below,

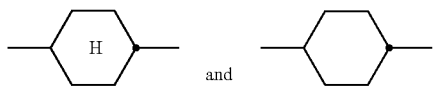

in each case denote a trans-1,4-cyclohexylene ring, and

denotes a 1,4-phenylene ring.

In the formulae above and below, an alkyl radical or alkoxy radical can be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexoxy or heptoxy, furthermore methyl, octyl, nonyl, decyl, undecyl, dodecyl, tridecyl, tetradecyl, pentadecyl, methoxy, octoxy, nonoxy, decoxy, undecoxy, dodecoxy, tridecoxy or tetradecoxy.

Oxaalkyl preferably denotes straight-chain 2-oxapropyl (=methoxymethyl), 2- (=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxa-decyl.

If an alkyl radical is at least monosubstituted by halogen, this radical is preferably straight-chain and halogen is preferably F or Cl. In the case of polysubstitution, halogen is preferably F. The resultant radicals also include perfluorinated radicals. In the case of monosubstitution, the fluorine or chlorine substituent can be in any desired position, but is preferably in the ω-position.

In the formulae above and below, $X^0$ is preferably F, Cl or a mono- or polyfluorinated alkyl or alkoxy radical having 1, 2 or 3 C atoms or a mono- or polyfluorinated alkenyl radical having 2 or 3 C atoms. $X^0$ is particularly preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$, $OCH=CF_2$ or $CH=CF_2$, very particularly preferably F or $OCF_3$, furthermore $CF_3$, $OCF=CF_2$, $OCHF_2$ or $OCH=CF_2$.

The expression "alkyl" or "alkyl*" in this application preferably encompasses straight-chain and branched alkyl groups having 1-6 carbon atoms, in particular the straight-chain groups methyl, ethyl, propyl, butyl, pentyl and hexyl. Groups having 2 to 5 carbon atoms are generally preferred.

The expression "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The expression "oxaalkyl" or "alkoxy" preferably encompasses straight-chain radicals of the formula $C_nH_{2n+1}$—O—$(CH_2)_m$, in which n and m in each case, independently of one another, denote an integer from 1 to 6. m may also denote 0. Preferably, n=1 and m is 1 to 6 or m=0 and n=1 to 3.

The compounds of the formula IA are preferably selected from the following sub-formulae:

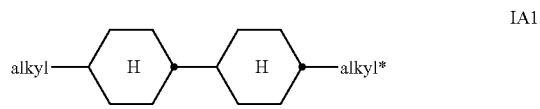

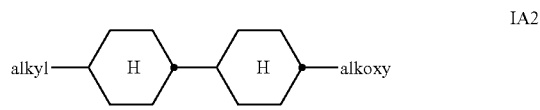

in which the individual radicals, in each case independently of one another and identically or differently on each occurrence, have the following meaning alkyl, alkyl* straight-chain alkyl having 1-6 C atoms, in particular ethyl, propyl, butyl or pentyl, alkoxy straight-chain alkoxy having 1-6 C atoms, in particular methoxy ethoxy or propoxy.

Particularly preferred compounds of the formula IA and sub-formulae thereof are selected from the group consisting of the following formulae

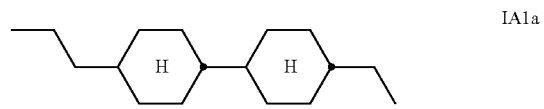

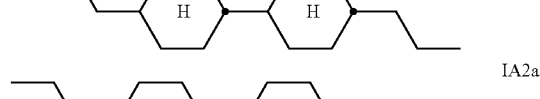

In a preferred embodiment, the LC medium according to the invention comprises one or more compounds of the formula IA, preferably selected from the group consisting of the formulae IA1 and IA2, particularly preferably selected from the group consisting of the formulae IA1a, IA1b and IA2a, very particularly preferably of the formula IA1a and/or IA1b. The individual concentration of each of these compounds is preferably in each case 3 to 25% by weight, particularly preferably 5 to 20% by weight. The total concentration of these compounds is preferably 10 to 50% by weight, particularly preferably 15 to 40% by weight.

The compounds of the formula IB are preferably selected from the following sub-formula:

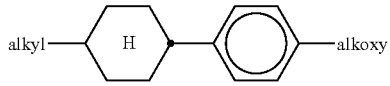

IB1 in which "alkyl" and "alkoxy" have the meanings indicated in formula IA2.

Particularly preferred compounds of the formula IB and IB1 are selected from the group consisting of the following formulae

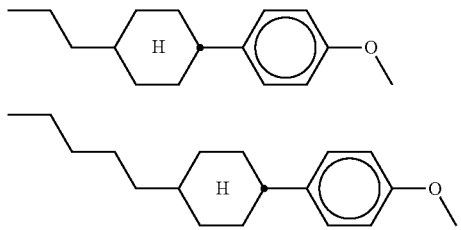

IB1a

IB1b

In a preferred embodiment, the LC medium according to the invention comprises one or more compounds of the formula IB, preferably selected from formula IB1, particularly preferably selected from the group consisting of the formulae IB1a and IB1b, very particularly preferably of the formula IB1a. The individual concentration of each of these compounds is preferably in each case 3 to 25% by weight, particularly preferably 8 to 20% by weight. The total concentration of these compounds is preferably 5 to 30% by weight, particularly preferably 8 to 25% by weight.

In a preferred embodiment, the LC medium according to the invention comprises one or more compounds of the formula IA, preferably of the formula IA1, very particularly preferably of the formula IA1a and/or of the formula IA1b, and one or more compounds of the formula IB, preferably of the formula IB1, very particularly preferably of the formula IB1a.

In a further preferred embodiment, the LC medium according to the invention comprises one or more stabilisers.

Preferred stabilisers are selected from the group consisting of the following formulae

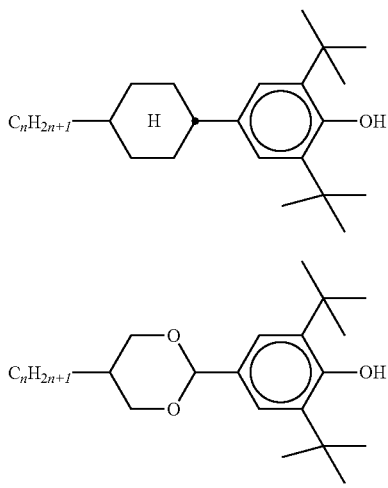

S1

S2

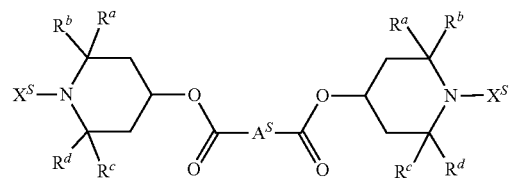

S3

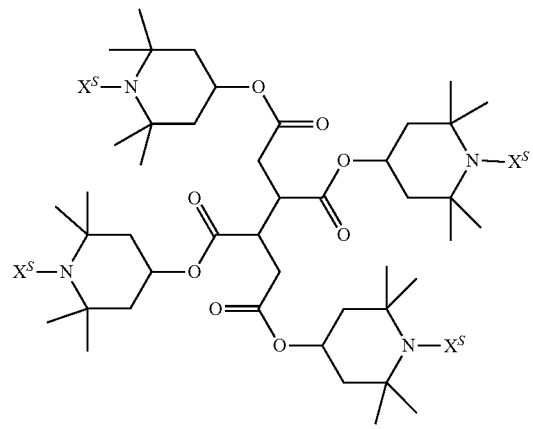

S4 in which the individual radicals, in each case independently of one another and identically or differently on each occurrence, have the following meaning $R^{a-d}$ straight-chain or branched alkyl having 1 to 10 C atoms, preferably having 1 to 6 C atoms, particularly preferably having 1 to 4 C atoms, very particularly preferably methyl, $X^S$ H, $CH_3$, OH or O*, $A^S$ straight-chain, branched or cyclic alkylene having 1 to 20 C atoms, which is optionally substituted, n an integer from 1 to 6, preferably 3.

Particularly preferred stabilisers of the formula S3 are selected from formula S3A

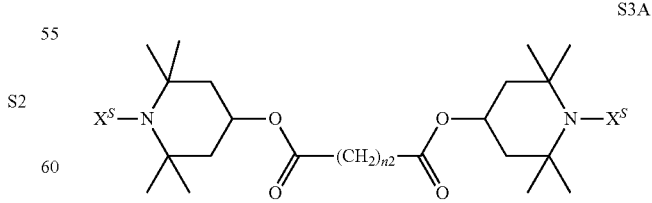

S3A in which n2 denotes an integer from 1 to 12, and in which one or more H atoms in the group $(CH_2)_{n2}$ are optionally replaced by methyl, ethyl, propyl, butyl, pentyl or hexyl.

Very particularly preferred stabilisers are selected from the group consisting of the following formulae
S1-1
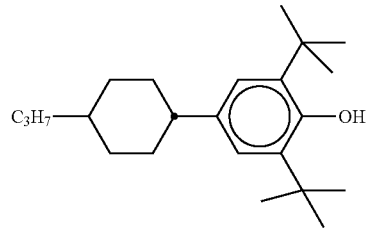
S2-1
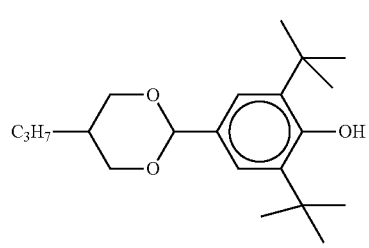
S3-1
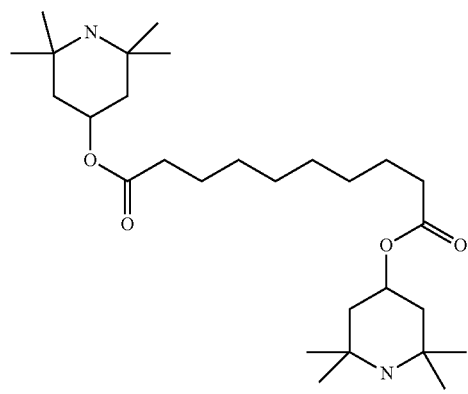
S3-2
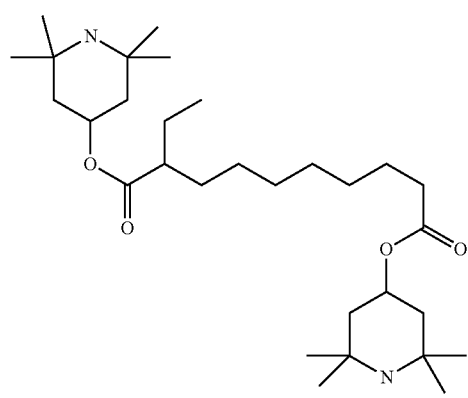
S3-3
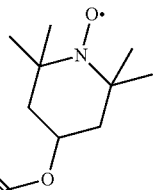
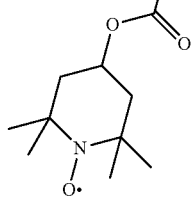
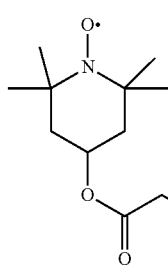
S3-4
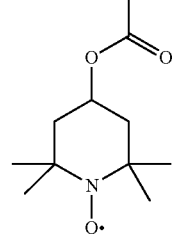
S3-5
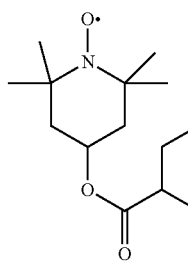
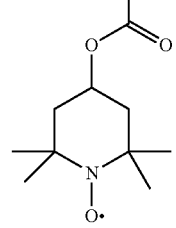

-continued

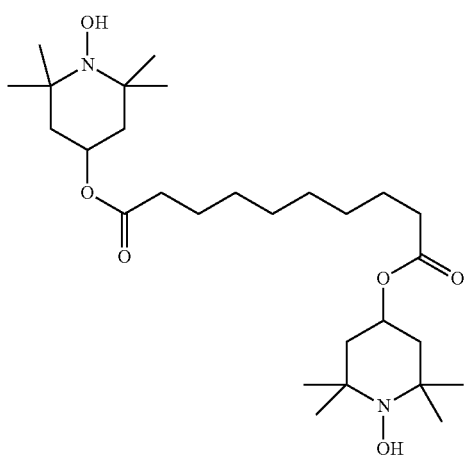

S3-6

S3-7

S4-1

In a particularly preferred embodiment, the LC medium according to the invention comprises one or more stabilisers selected from the group consisting of formula S1-1, S2-1, S3-1, S3-1, S3-3 and S4-1.

In a further preferred embodiment, the LC medium according to the invention comprises one or more stabilisers selected from Table D below.

The concentration of the stabilisers, in particular those of the formula S1-S3 and sub-formulae thereof and those from Table D, in the LC medium according to the invention is preferably 10 to 500 ppm, particularly preferably 20 to 100 ppm.

Further preferred embodiments for the LC media according to the invention are indicated below:

The LC medium additionally comprises one or more compounds selected from the following formulae:

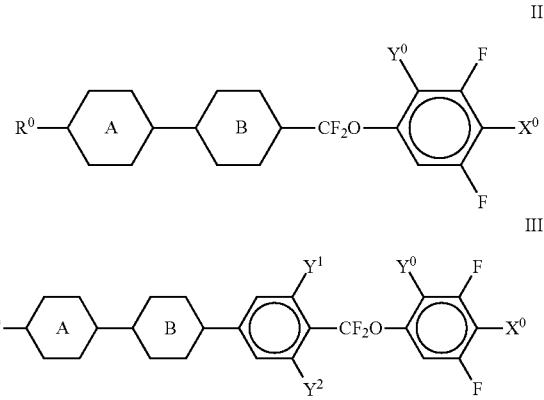

in which the individual radicals, in each case independently of one another and identically or differently on each occurrence, have the following meaning

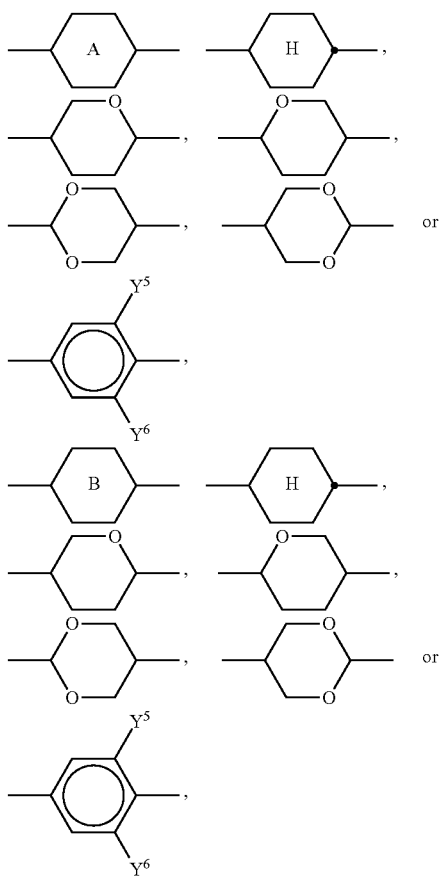

$R^0$ unsubstituted or halogenated alkyl or alkoxy having 1 to 15 C atoms, where, in addition, one or more $CH_2$ groups in these radicals may in each case be replaced, independently of one another, by —$CF_2O$—,

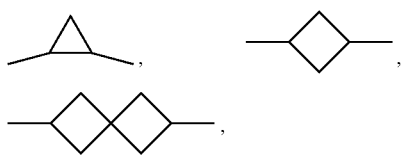

—O—, —CO—O— or —O—CO— in such a way that O atoms are not linked directly to one another, $X^0$ F, Cl, halogenated alkyl, halogenated alkoxy or halogenated alkenyloxy, each having up to 6 C atoms.

$Y^{1-6}$ H or F, $Y^0$ H or $CH_3$.

Preferred compounds of the formula II and III are those in which $Y^0$ denotes H.

Further preferred compounds of the formula II and III are those in which $R^0$ denotes alkyl having 1 to 6 C atoms, preferably ethyl or propyl, and $X^0$ denotes F or $OCF_3$, preferably F.

The LC medium additionally comprises one or more compounds selected from the following formulae:

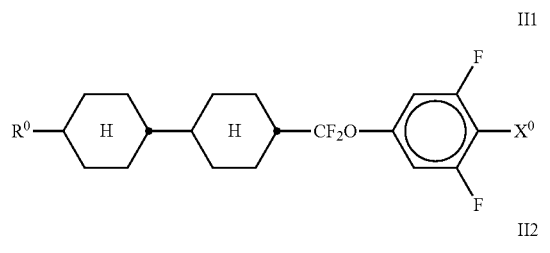

II1

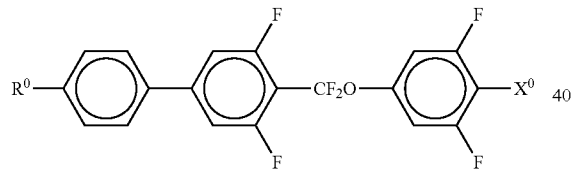

II2

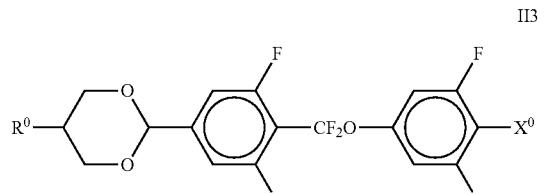

II3

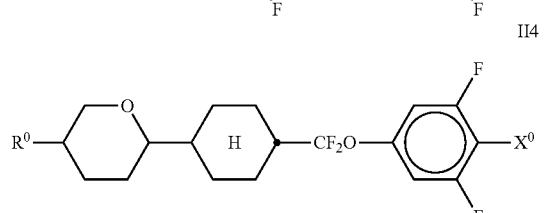

II4

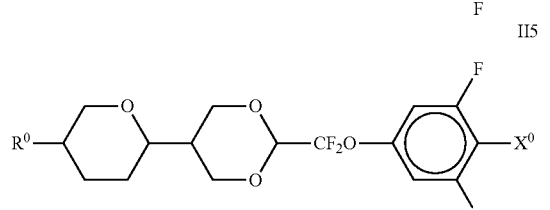

II5

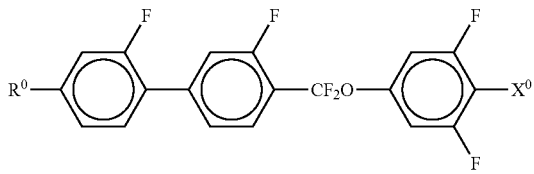

II6

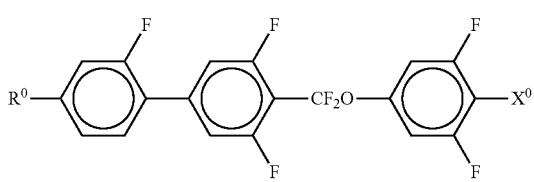

II7 in which $R^0$ and $X^0$ have the meaning indicated in formula II or one of the preferred meanings indicated above and below.

Preferred compounds of those of the formula II1, II2 and II3, particularly preferably those of the formula II1 and II2.

In the compounds of formulae II1 to II7, $R^0$ preferably denotes alkyl having 1 to 6 C atoms, particularly preferably ethyl or propyl, and $X^0$ preferably denotes F or $OCF_3$, particularly preferably F.

The LC medium comprises one or more compounds of the formula II or sub-formulae thereof in which $Y^0$ denotes $CH_3$. The LC medium preferably comprises one or more compounds of the formula II selected from the following sub-formulae:

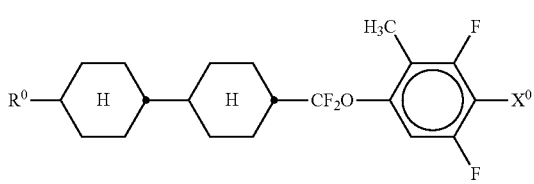

IIA1

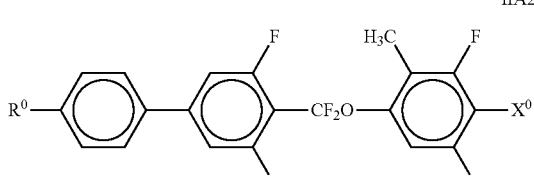

IIA2

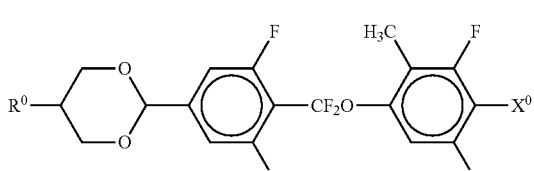

IIA3

-continued

IIA4
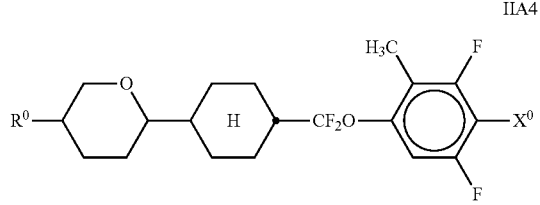

IIA5

IIA6
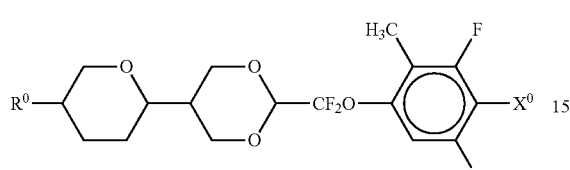

IIA7
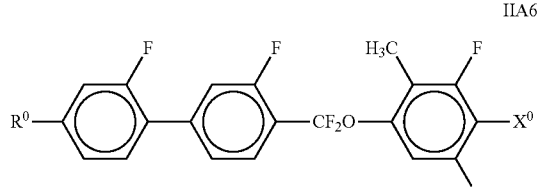

in which R⁰ and X⁰ have the meaning indicated in formula II or one of the preferred meanings indicated above and below.

Preferred compounds are those of the formula IIA1, IIA2 and IIA3, those of the formula IIA1 and IIA2 are particularly preferred.

In the compounds of the formulae IIA1 to IIA7, $R^0$ preferably denotes alkyl having 1 to 6 C atoms, particularly preferably ethyl or propyl, and $X^0$ preferably denotes F or $OCF_3$, particularly preferably F.

The LC medium comprises one or more compounds of the formula III selected from the following sub-formulae:

III1
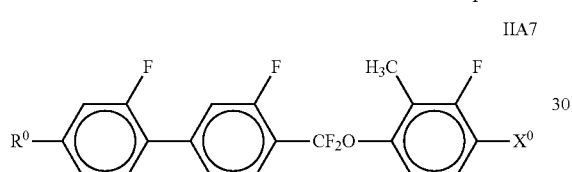

III2

-continued

III3

III4

III5

III6
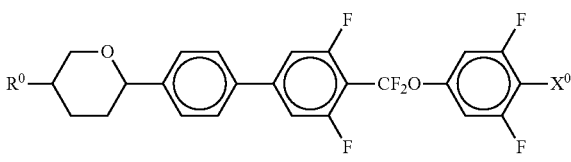

III7

III8

III9

III10
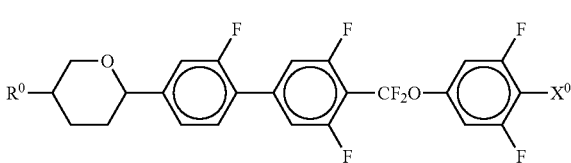

III11

III12
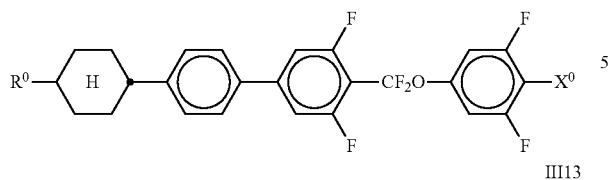

III13
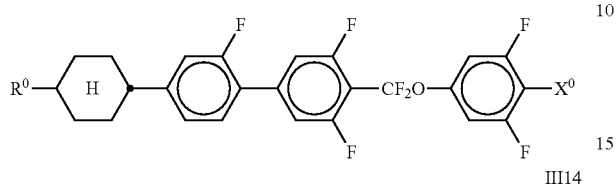

III14
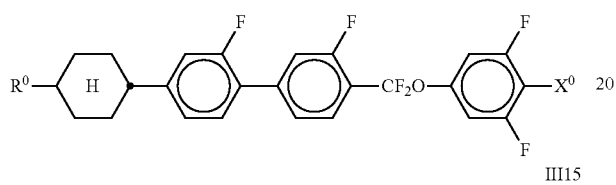

III15
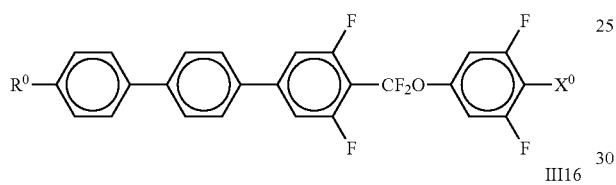

III16
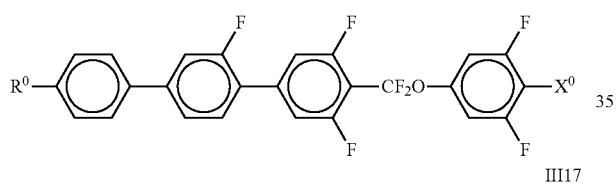

III17
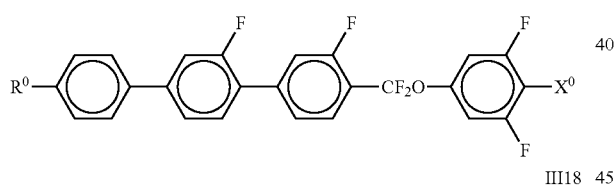

III18
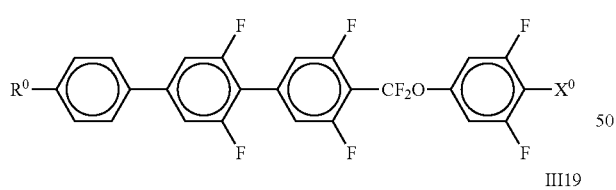

III19
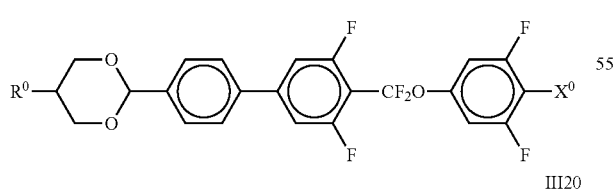

III20

III21
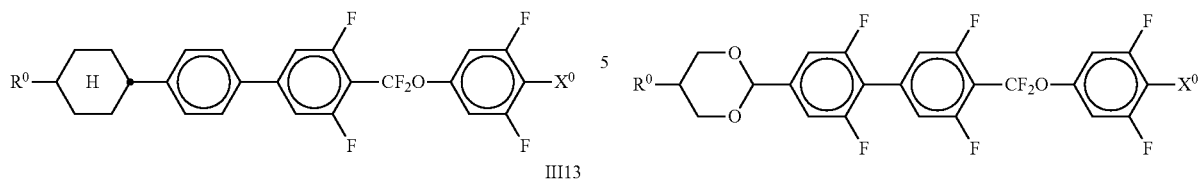

in which $R^0$ and $X^0$ have the meaning indicated in formula II or one of the preferred meanings indicated above and below.

Preferred compounds are those of the formula III1, III4, III6, III6, III9 and III20.

In the compounds of the formulae III1 to III21, $R^0$ preferably denotes alkyl having 1 to 6 C atoms, particularly preferably ethyl or propyl, $X^0$ preferably denotes F or $OCF_3$, particularly preferably F, and $Y^2$ preferably denotes F.

The LC medium comprises one or more compounds of the formula III or sub-formulae thereof as described above and below in which $Y^0$ denotes $CH_3$. The LC medium preferably comprises one or more compounds of the formula III selected from the following sub-formulae:

IIIA1
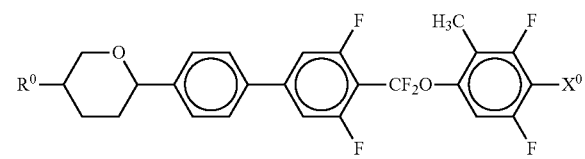

IIIA2
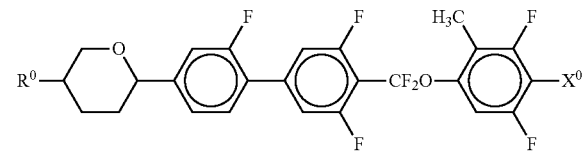

IIIA3
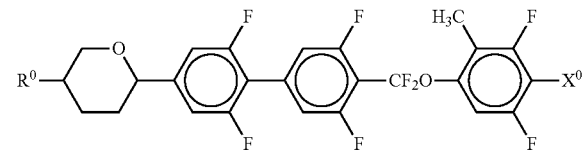

IIIA4
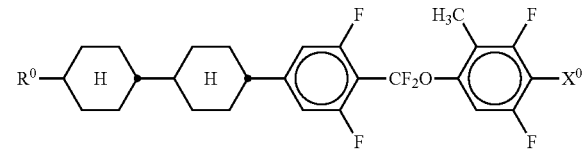

IIIA5
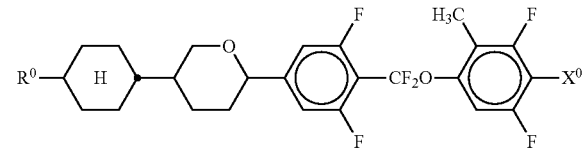

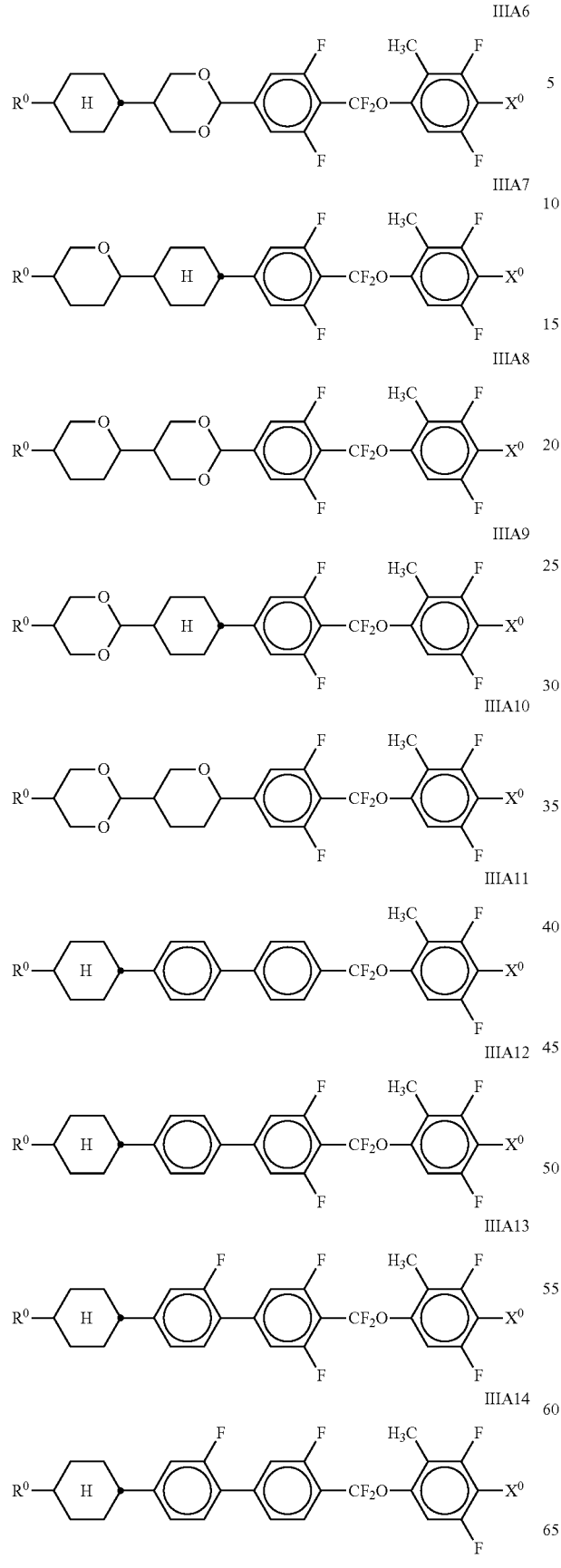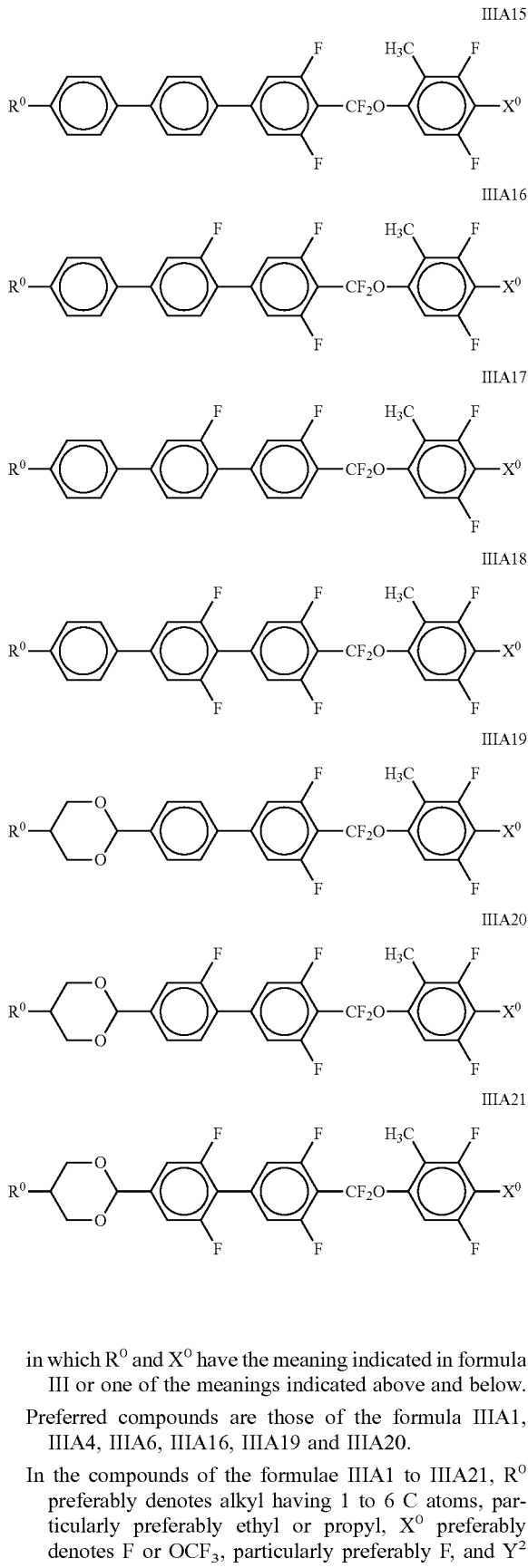

in which $R^0$ and $X^0$ have the meaning indicated in formula III or one of the meanings indicated above and below.

Preferred compounds are those of the formula IIIA1, IIIA4, IIIA6, IIIA16, IIIA19 and IIIA20.

In the compounds of the formulae IIIA1 to IIIA21, $R^0$ preferably denotes alkyl having 1 to 6 C atoms, particularly preferably ethyl or propyl, $X^0$ preferably denotes F or $OCF_3$, particularly preferably F, and $Y^2$ preferably denotes F.

The LC medium additionally comprises one or more compounds selected from the following formulae:

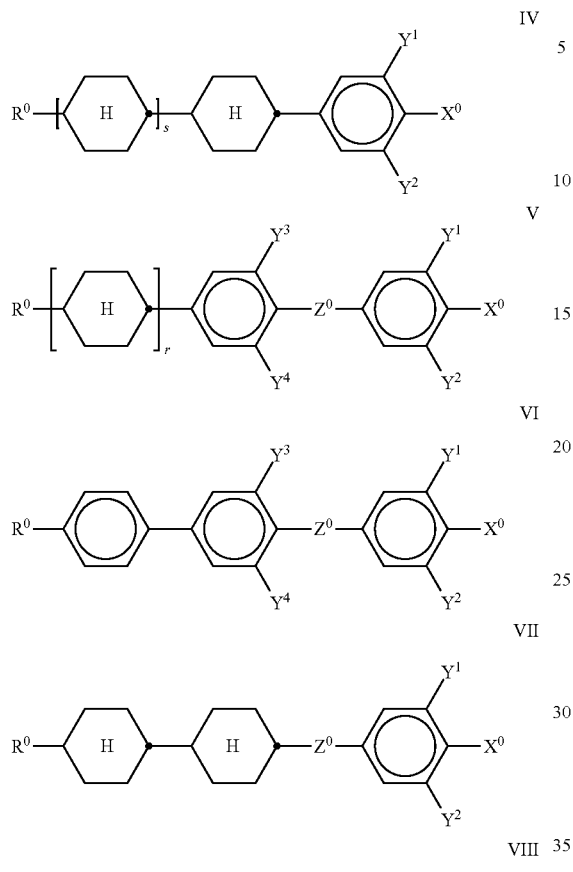

IV

V

VI

VII

VIII in which $R^0$, $X^0$ and $Y^{1-4}$ have the meanings indicated above, and $Z^0$ denotes —$C_2H_4$—, —$(CH_2)_4$—, —CH=CH—, —CF=CF—, —$C_2F_4$—, —$CH_2CF_2$—, —$CF_2CH_2$—, —$CH_2O$—, —$OCH_2$—, —COO— or —$OCF_2$—, in formulae V and VI also a single bond, in formulae V and VIII also —$CF_2O$—, r denotes 0 or 1, and s denotes 0 or 1;

The compounds of the formula IV are preferably selected from the following formulae:

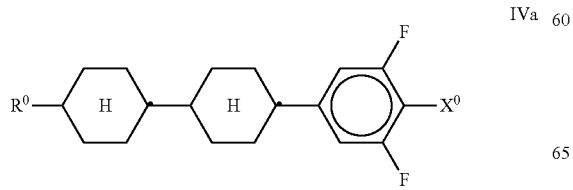

IVa

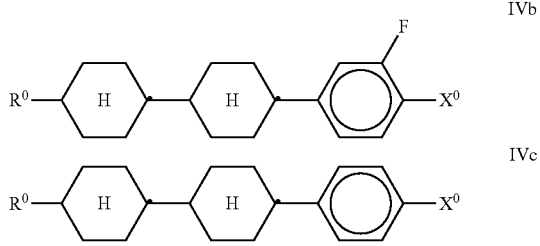

IVb

IVc in which $R^0$ and $X^0$ have the meanings indicated above. $R^0$ preferably denotes alkyl having 1 to 6 C atoms. $X^0$ preferably denotes F or $OCF_3$, furthermore $OCF=CF_2$ or Cl;

The compounds of the formula IVa are preferably selected from the following sub-formula:

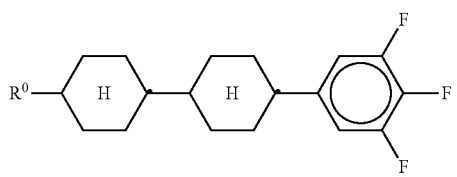

IVa1 in which $R^0$ has the meaning indicated above and preferably denotes propyl or pentyl.

The compounds of the formula IVc are preferably selected from the following sub-formula:

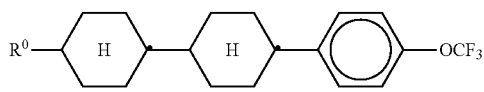

IVc1 in which $R^0$ has the meaning indicated above and preferably denotes pentyl or pentyl.

The compound(s) of the formula IVc, in particular of the formula IVc1, is (are) preferably present in the LC medium according to the invention in a concentration of 1-20% by weight, particularly preferably 2-15% by weight.

The compounds of the formula V are preferably selected from the following sub-formulae:

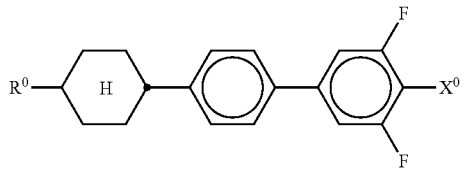

Va

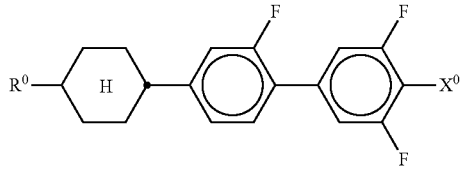

Vb

-continued

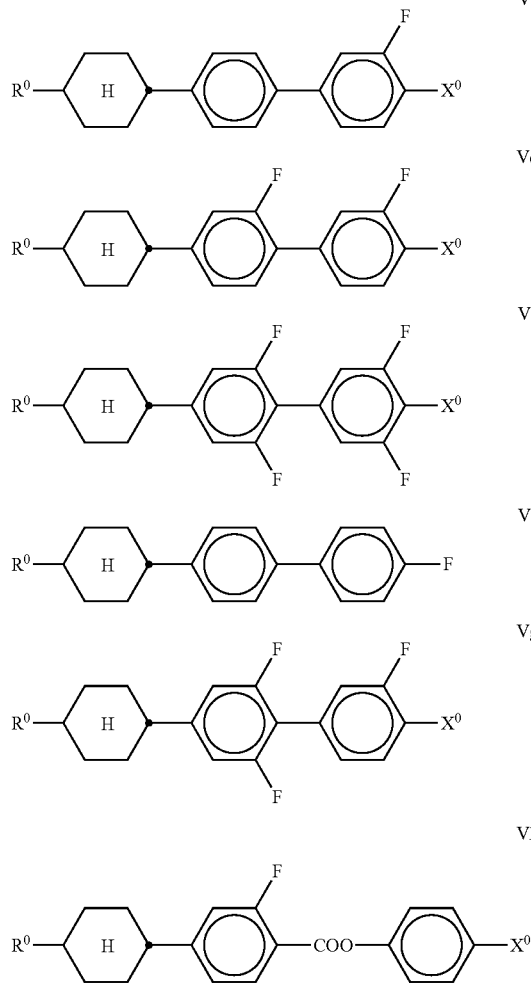

in which R⁰ and X⁰ have the meanings indicated above.

R⁰ preferably denotes alkyl having 1 to 6 C atoms. X⁰ preferably denotes F or OCF$_3$, furthermore OCHF$_2$, CF$_3$, OCF=CF$_2$ or OCH=CF$_2$.

The LC medium according to the invention particularly preferably comprises one or more compounds of the formula Va1,

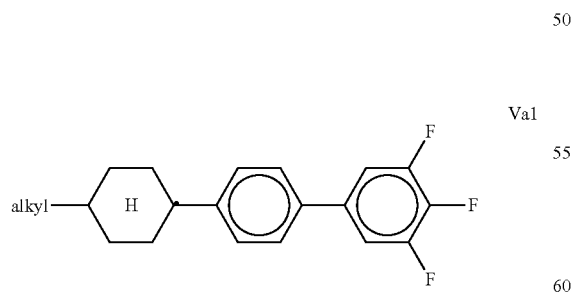

in which "alkyl" has the meaning indicated in formula IA1 and preferably denotes ethyl, propyl or pentyl, very particularly preferably propyl.

The compounds of the formula VI are preferably selected from the following sub-formulae:

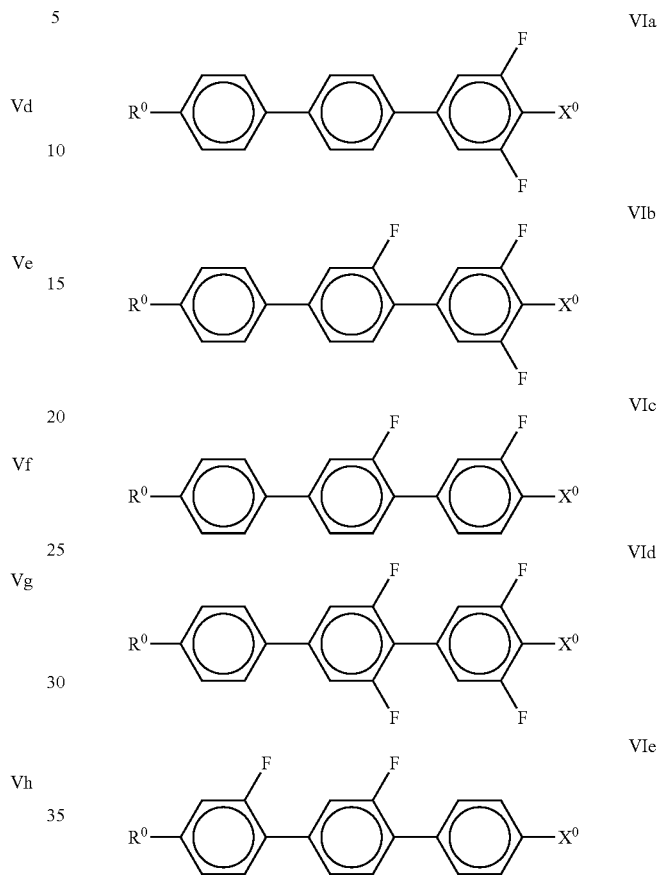

in which R⁰ and X⁰ have the meanings indicated above.

R⁰ preferably denotes alkyl having 1 to 6 C atoms. X⁰ preferably denotes F, furthermore OCF$_3$, CF$_3$, CF=CF$_2$, OCHF$_2$ or OCH=CF$_2$.

The LC medium according to the invention particularly preferably comprises one or more compounds of the formula VIb1 and/or VIe1,

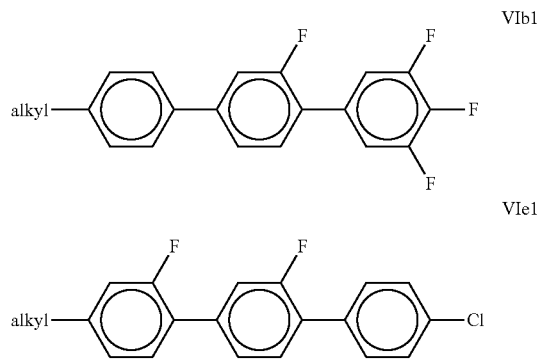

in which "alkyl" has the meaning indicated in formula IA1 and preferably denotes ethyl, propyl or pentyl, very particularly preferably propyl.

The compounds of the formula VII are preferably selected from the following sub-formulae:

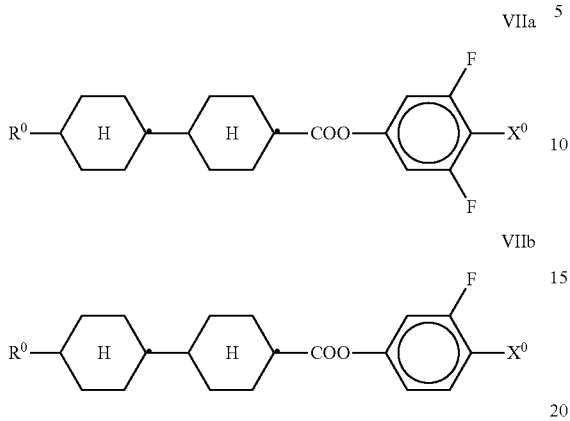

in which $R^0$ and $X^0$ have the meanings indicated above.

$R^0$ preferably denotes alkyl having 1 to 6 C atoms. $X^0$ preferably denotes F, furthermore $OCF_3$, $OCHF_2$ or $OCH=CF_2$.

The LC medium additionally comprises one or more compounds of the following formula:

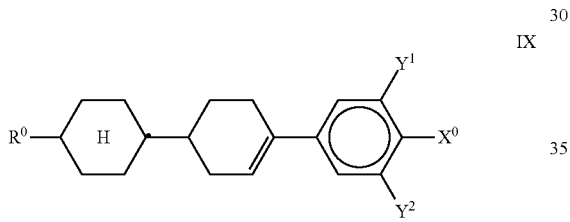

in which $R^0$, $X^0$ and $Y^{1-4}$ in each case, independently of one another, have one of the meanings indicated above. $X^0$ preferably denotes F, Cl, $CF_3$, $OCF_3$ or $OCHF_2$. $R^0$ preferably denotes alkyl, alkoxy, oxaalkyl or fluoroalkyl, in each case having 1 to 6 C atoms.

The LC medium according to the invention particularly preferably comprises one or more compounds of the formula IXa,

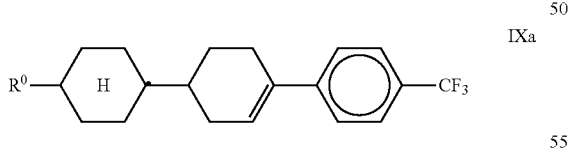

in which $R^0$ has the meaning indicated above. $R^0$ preferably denotes straight-chain alkyl, in particular ethyl, n-propyl, n-butyl or n-pentyl, particularly preferably n-propyl.

The compound(s) of the formula IX, in particular of the formula IXa, is (are) preferably present in the LC medium according to the invention in a concentration of 1-15% by weight, particularly preferably 2-10% by weight.

The LC medium additionally comprises one or more compounds of the formula X:

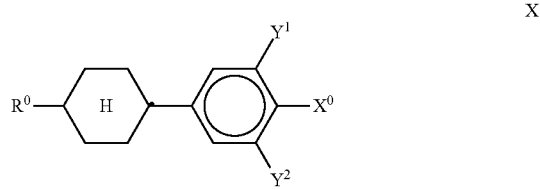

in which $R^0$, $X^0$, $Y^1$ and $Y^2$ have the meanings indicated above, and $R^0$ preferably denotes alkyl having 1 to 6 C atoms.

The LC medium according to the invention particularly preferably comprises one or more compounds of the formula Xa,

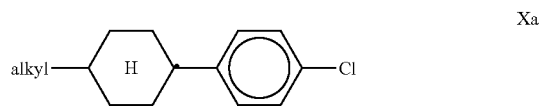

in which "alkyl" has the meaning indicated in formula IA1 and preferably denotes ethyl, propyl or pentyl, very particularly preferably propyl.

The compound(s) of the formula X, in particular of the formula Xa, is (are) preferably present in the LC medium according to the invention in a concentration of 0.5-10% by weight, particularly preferably 1-5% by weight enthalten.

The LC medium additionally comprises one or more compounds of the following formula:

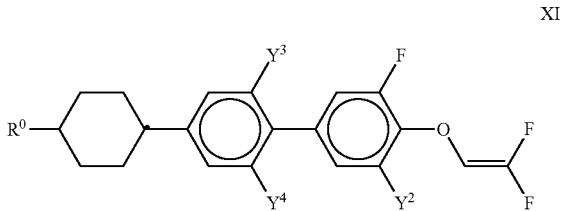

in which $R^0$ and $Y^{2-4}$ in each case, independently of one another, have one of the meanings indicated above. $R^0$ preferably denotes alkyl, alkoxy, oxaalkyl or fluoroalkyl, in each case having up to 6 C atoms.

The LC medium according to the invention particularly preferably comprises one or more compounds of the formula XIa,

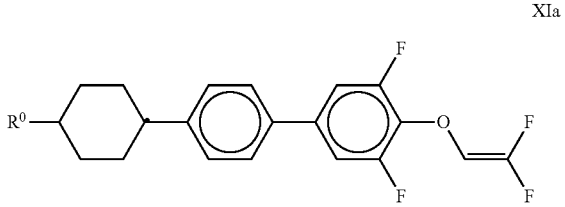

in which $R^0$ has the meaning indicated above. $R^0$ preferably denotes straight-chain alkyl, in particular ethyl, n-propyl, n-butyl or n-pentyl, particularly preferably n-propyl.

The compound(s) of the formula XI, in particular of the formula XIa, is (are) preferably present in the LC medium according to the invention in a concentration of 1-30% by weight, particularly preferably 2-25% by weight, very particularly preferably 2-15% by weight.

The LC medium additionally comprises one or more compounds of the formula XII:

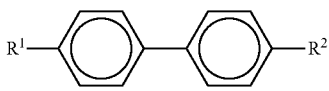

XII in which $R^1$ and $R^2$ have the meanings indicated in formula IA and preferably denote alkyl having 1 to 6 C atoms.

The LC medium additionally comprises one or more compounds selected from the following formulae:

XIII

XIV

XV in which $R^1$ and $R^2$ have the meanings indicated in formula IA and L denotes H or F. $R^1$ and $R^2$ preferably in each case, independently of one another, denote alkyl or alkoxy having 1 to 6 C atoms.

The LC medium according to the invention particularly preferably comprises one or more compounds of the formula XIVa

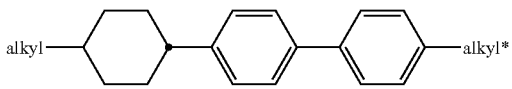

XIVa in which "alkyl" and "alkyl*" in each case, independently of one another, have the meaning indicated in formula IA1 and preferably denote ethyl, propyl or pentyl, very particularly preferably ethyl or propyl.

The LC medium additionally comprises one or more compounds of the formula XVI,

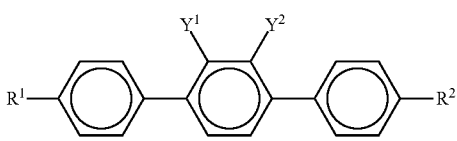

XVI in which $Y^1$, $Y^2$, $R^1$ and $R^2$ have the meanings indicated above.

Particularly preferred compounds of the formula XVI are those selected from the group of the following sub-formulae:

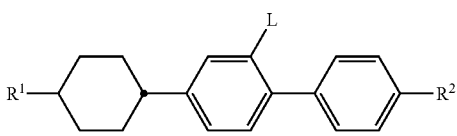

XVIa

XVIb

XVIc in which "alkyl" and "alkyl*" have the meaning indicated in formula IA1 and preferably denote ethyl, propyl or pentyl.

Preference is given to the compounds of the formulae XVIb. Particular preference is given to the compounds selected from the following sub-formulae

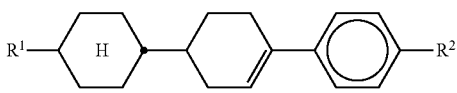

XVIb1

XVIb2

XVIb3

XVIc1

XVIc2

Particular preference is given to compounds of the formula XVIb1, XVIb2 and XVIb3.

The compound(s) of the formula XVI, in particular of the formula XVIb, is (are) preferably present in the LC medium according to the invention in a concentration of 2-30% by weight, particularly preferably 2-25% by weight.

The LC medium comprises one or more compounds selected from the following formulae:

XVII1

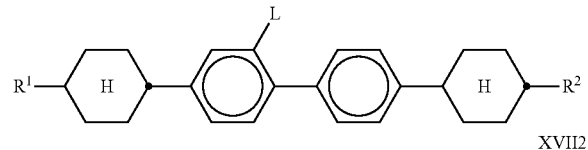

XVII2

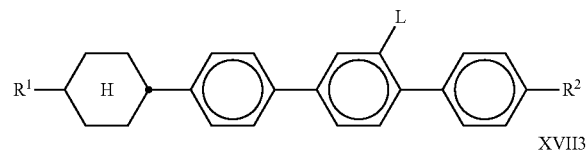

XVII3

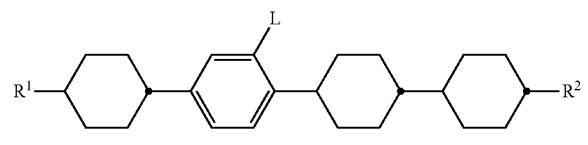

in which L, $R^1$ and $R^2$ have the meanings indicated above and $R^1$ and $R^2$ in each case, independently of one another, preferably denote alkyl having 1 to 6 C atoms. Particular preference is given to compounds of the formula XVIII in which L is F. Particular preference is given to compounds of the formula XVII2 in which L is F.

The LC medium additionally comprises one or more compounds selected from the following formulae:

XVIII

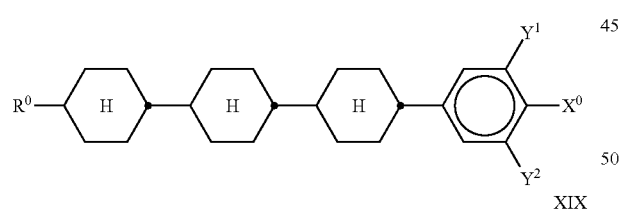

XIX

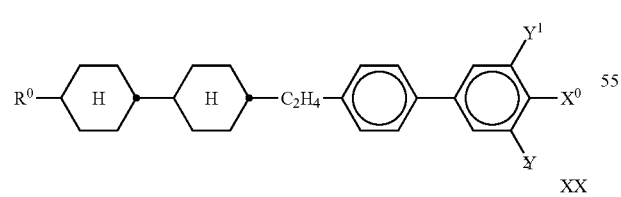

XX

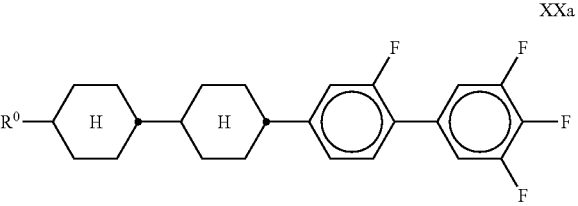

XXI

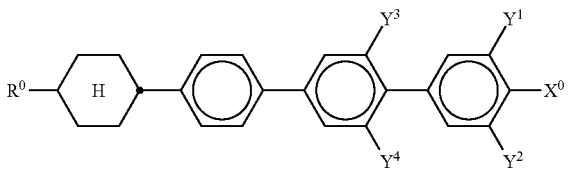

XXII

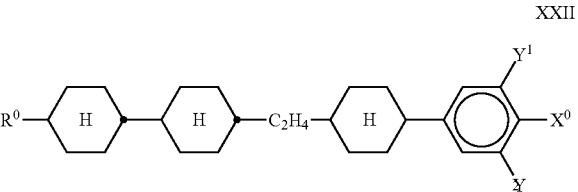

XXIII

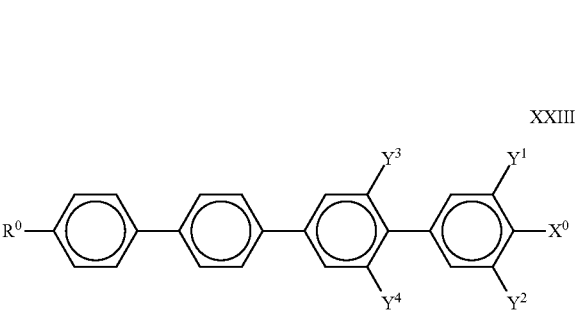

in which $R^0$ and $X^0$ in each case, independently of one another, have one of the meanings indicated above and $Y^{1-4}$ in each case, independently of one another, denote H or F. $X^0$ preferably denotes F, Cl, $CF_3$, $OCF_3$ or $OCHF_2$. $R^0$ preferably denotes alkyl, alkoxy, oxaalkyl or fluoroalkyl, in each case having 1 to 6 C atoms.

The LC medium particularly preferably comprises one or more compounds of the formula XXa, XXa

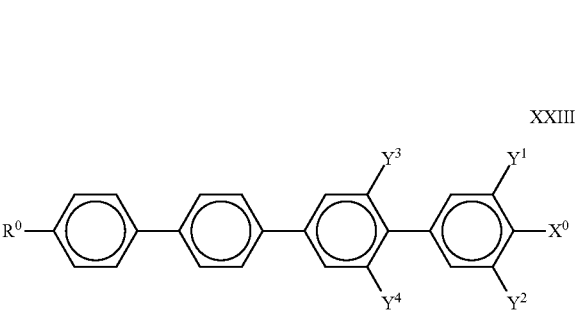

in which $R^0$ has the meaning indicated above. $R^0$ preferably denotes straight-chain alkyl, in particular ethyl, n-propyl, n-butyl or n-pentyl, particularly preferably n-propyl.

The compound(s) of the formula XX, in particular of the formula XXa, is (are) preferably present in the LC medium according to the invention in a concentration of 1-15% by weight, particularly preferably 2-10% by weight.

The LC medium according to the invention particularly preferably comprises one or more compounds of the formula XXIa, XXIa

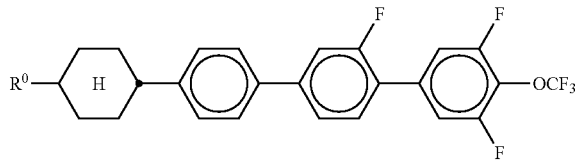

in which R⁰ has the meaning indicated above. R⁰ preferably denotes straight-chain alkyl, in particular ethyl, n-propyl, n-butyl or n-pentyl, particularly preferably n-propyl.

The compound(s) of the formula XXI, in particular of the formula XXIa, is (are) preferably present in the media according to the invention in a concentration of 1-15% by weight, particularly preferably 2-10% by weight.

The LC medium according to the invention particularly preferably comprises one or more compounds of the formula XXIIIa, XXIIIa

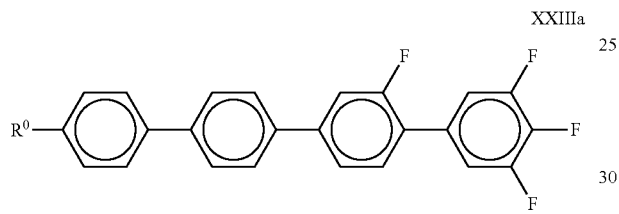

in which R⁰ has the meaning indicated above. R⁰ preferably denotes straight-chain alkyl, in particular ethyl, n-propyl, n-butyl or n-pentyl, particularly preferably n-propyl.

The compound(s) of the formula XXIII, in particular of the formula XXIIIa, is (are) preferably present in the LC medium according to the invention in a concentration of 0.5-5% by weight, particularly preferably 0.5-2% by weight.

The LC medium additionally comprises one or more compounds of the formula XXIV,

XXIV

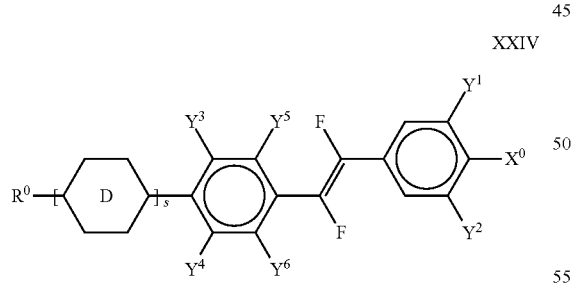

in which R⁰ and $Y^{1-6}$ have the meanings indicated above, s denotes 0 or 1, X⁰ has the meaning indicated above or denotes alkyl or alkoxy, preferably straight-chain, having 1-6 C atoms, and

denotes

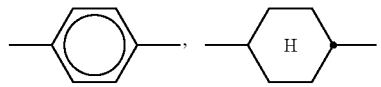

oder

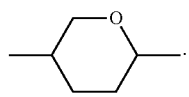

R⁰ preferably denotes alkyl having 1 to 6 C atoms. X⁰ preferably denotes F;

The compounds of the formula XXIV are preferably selected from the following sub-formulae:

XXIVa

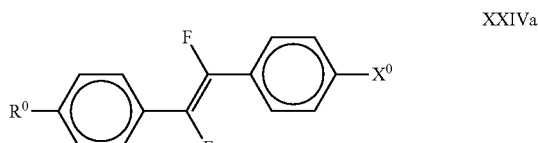

XXIVb

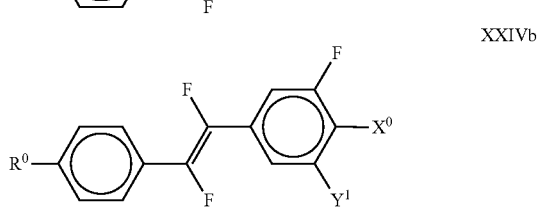

XXIVc

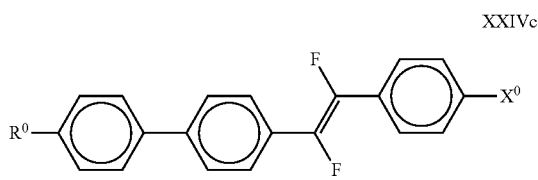

XXIVd

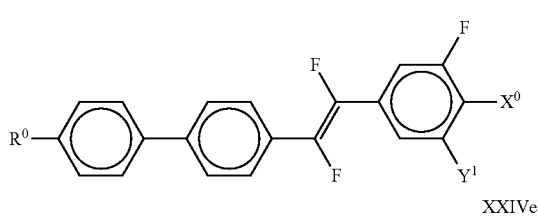

XXIVe

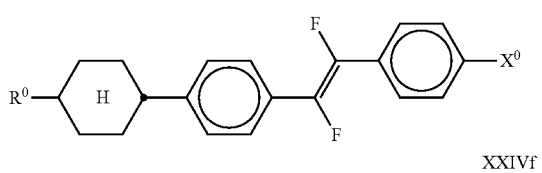

XXIVf

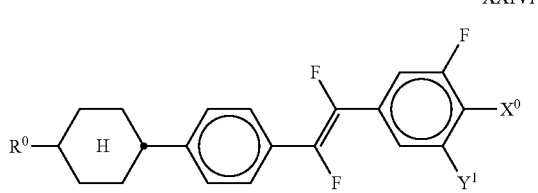

-continued

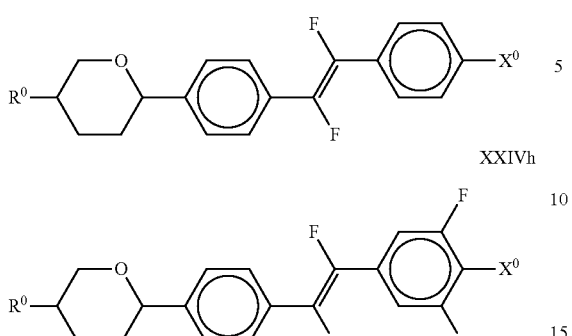

in which R⁰, X⁰ and Y¹ have the meanings indicated above. R⁰ preferably denotes alkyl having 1 to 6 C atoms. X⁰ preferably denotes F, and Y¹ preferably denotes F;

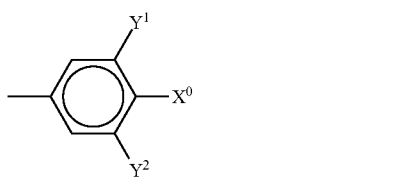

is preferably

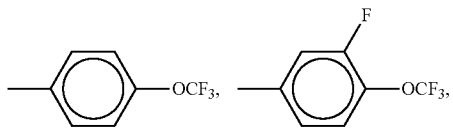

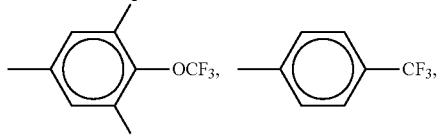

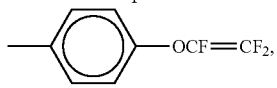

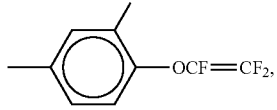

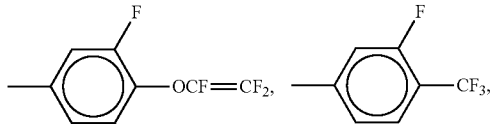

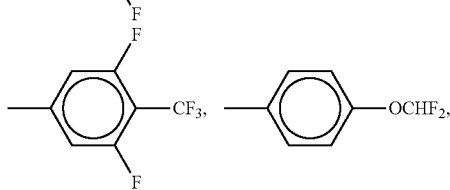

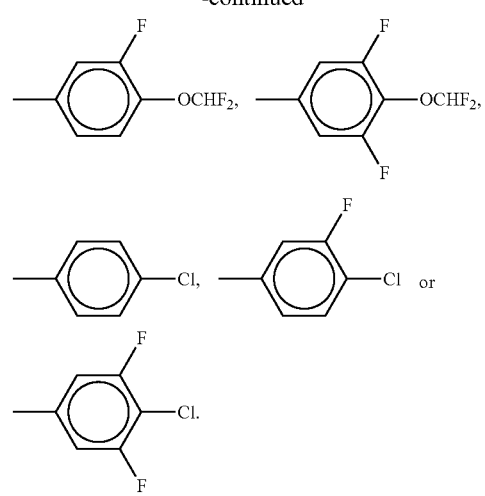

$R^O$ is straight-chain alkyl or alkenyl having 2 to 6 C atoms;

The LC medium additionally comprises one or more compounds selected from the following formulae:

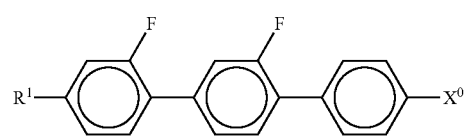

XXV

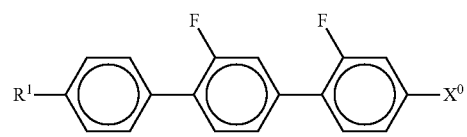

XXVI in which $R^1$ and $X^0$ have the meanings indicated above. $R^1$ preferably denotes alkyl having 1 to 6 C atoms. $X^0$ preferably denotes F or Cl. In [lacuna] of the formula XXIV, $X^0$ preferably denotes Cl.

The LC medium additionally comprises one or more compounds selected from the following formulae:

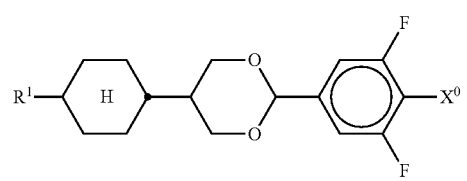

XXVII

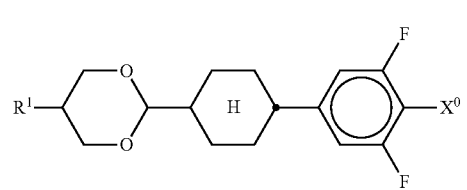

XXVIII

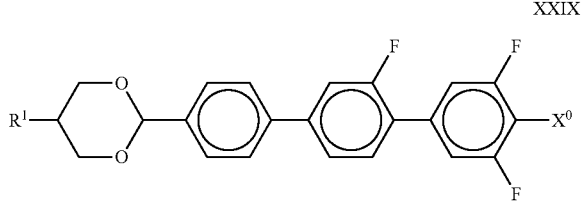

in which R¹ and X⁰ have the meanings indicated above. R¹ preferably denotes alkyl having 1 to 6 C atoms. X⁰ preferably denotes F.

The LC medium preferably comprises one or more compounds of the formula XXIX in which X⁰ denotes F.

The compounds of the formulae XXVI-XXIX are preferably present in the LC medium according to the invention in a concentration of 1-20% by weight, particularly preferably 1-15% by weight.

The LC medium preferably comprises at least one compound of the formula XXIX.

The LC medium according to the invention particularly preferably comprises one or more compounds of the formula XXIXa,

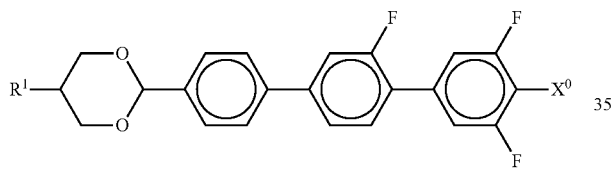

in which R¹ has the meaning indicated above. R¹ preferably denotes straight-chain alkyl, in particular ethyl, n-propyl, n-butyl or n-pentyl, particularly preferably n-propyl.

The compound(s) of the formula XXIX, in particular of the formula XXIXa, is (are) preferably present in the LC medium according to the invention in a concentration of 1-15% by weight, particularly preferably 2-10% by weight.

The LC medium additionally comprises one or more compounds selected from the following formulae

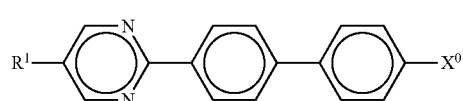

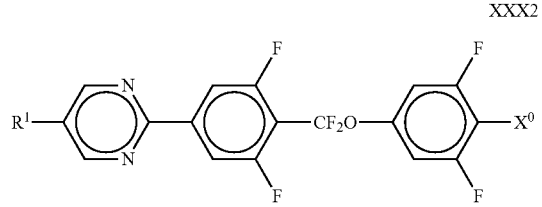

in which R¹ and X⁰ have the meanings indicated above. R¹ preferably denotes alkyl having 1 to 6 C atoms. X⁰ preferably denotes F.

The LC medium preferably comprises one or more compounds of the formula XXX1 in which X⁰ denotes F.

The compound(s) of the formulae XXX1-XXX3 is (are) preferably present in the LC medium according to the invention in a concentration of 1-20% by weight, particularly preferably 1-15% by weight.

The LC medium according to the invention comprises no compounds of the formula IA or IB in which R¹ and/or R² denotes alkenyl, alkenyloxy, oxaalkenyl or fluoroalkenyl having 1 to 8 C atoms. The LC medium according to the invention preferably comprises no compounds of the formula IA or IB in which R¹ and/or R² denotes an optionally fluorinated alkyl, alkoxy or oxaalkyl radical containing a C=C double bond.

In a particularly preferred embodiment, the LC medium according to the invention comprises no compounds selected from the group consisting of the following formulae, in which L, R¹ and R² have the meanings indicated above and in which at least one of the radicals R¹ and R² contains a C=C double bond

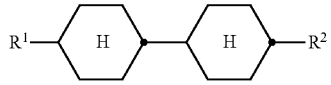

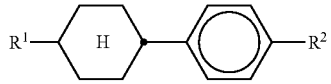

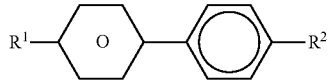

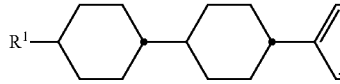

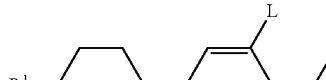

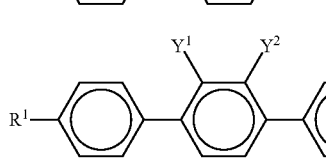

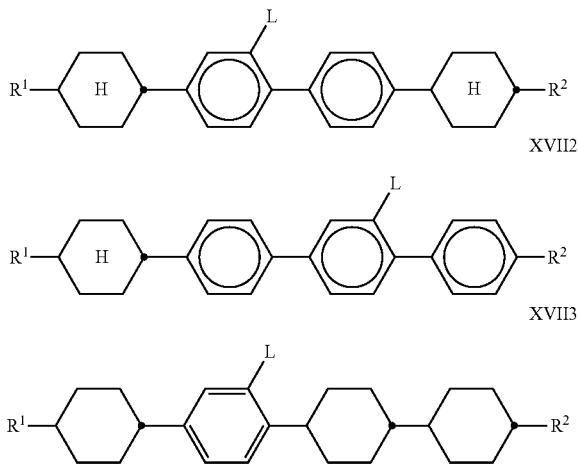

Further preferred media are selected from the following preferred embodiments, including all sub-combinations thereof:

The LC medium comprises one or more compounds of the formula II, preferably selected from the group consisting of the formula II1, II2 and II3, particularly preferably of formula II1 and II2. The individual concentration of each of these compounds is preferably 2 to 15% by weight. The total concentration of these compounds is preferably 5 to 45% by weight.

The LC medium comprises one or more compounds of the formula III, preferably selected from the group consisting of the formula III1, III4, III6, III16, III19 and III20, particularly preferably from the group consisting of the formula III1, III6, III16 and III20. The individual concentration of each of these compounds is preferably 2 to 15% by weight. The total concentration of these compounds is preferably from 5 to 30% by weight.

The LC medium comprises one or more compounds of the formula IV, preferably selected from formula IVa or IVc, particularly preferably from formula IVa1 or IVc1, very particularly preferably of the formula IVc1. The individual concentration of each of these compounds is preferably 2 to 15% by weight. The total concentration of these compounds is preferably 5 to 20% by weight.

The LC medium comprises one or more compounds of the formula V, particularly preferably of the formula Va, very particularly preferably of the formula Va1. The individual concentration of each of these compounds is preferably 1 to 20% by weight. The total concentration of these compounds is preferably 5 to 20% by weight.

The LC medium comprises one or more compounds of the formula VI, particularly preferably selected from the formulae VIb and VIe, very particularly preferably from the formulae VIb1 and VIe1. The individual concentration of each of these compounds is preferably 1 to 20% by weight. The total concentration of these compounds is preferably 5 to 20% by weight.

The LC medium comprises one or more compounds of the formula XIII, particularly preferably of the formula XIIIa. The total concentration of these compounds is preferably 1 to 20% by weight.

The LC medium comprises one or more compounds of the formula XIV, particularly preferably of the formula XIVa. The individual concentration of each of these compounds is preferably 2 to 15% by weight. The total concentration of these compounds is preferably 5 to 20% by weight.

The LC medium comprises one or more compounds of the formula X, particularly preferably of the formula Xa. The individual concentration of each of these compounds is preferably 1 to 10% by weight. The total concentration of these compounds is preferably 2 to 15% by weight.

The LC medium comprises one or more compounds of the formula XI, particularly preferably of the formula XIa. The individual concentration of each of these compounds is preferably 5 to 25% by weight. The total concentration of these compounds is preferably 10 to 35% by weight.

The LC medium comprises one or more compounds of the formula XVIb, particularly preferably selected from the formulae XVIb1, XVIb2 and XVIb3. The individual concentration of each of these compounds is preferably 2 to 15% by weight. The total concentration of these compounds is preferably 10 to 35% by weight.

The LC medium comprises one or more compounds of the formula XVII, particularly preferably selected from the formulae XVIc1, XVIc2 and XVIc3. The individual concentration of each of these compounds is preferably 2 to 10% by weight. The total concentration of these compounds is preferably 5 to 20% by weight.

The LC medium comprises one or more compounds selected from the group consisting of the formulae XVII1, XVII2 and XVII3, particularly preferably of the formula XVIII in which L is F and/or of the formula XVII2 in which L is F. The individual concentration of each of these compounds is preferably 1 to 8% by weight. The total concentration of these compounds is preferably 2 to 10% by weight.

The LC medium comprises one or more compounds of the formula XX, particularly preferably of the formula XXa. The individual concentration of each of these compounds is preferably 2 to 10% by weight. The total concentration of these compounds is preferably 2 to 20% by weight.

The LC medium comprises one or more compounds of the formula XXI, particularly preferably of the formula XXIa. The individual concentration of each of these compounds is preferably 2 to 10% by weight. The total concentration of these compounds is preferably 3 to 15% by weight.

The LC medium comprises one or more compounds of the formula XXIII, particularly preferably of the formula XXIIIa. The concentration of these compounds is preferably 0.5 to 5% by weight.

The LC medium comprises one or more compounds of the formula XXIX, particularly preferably of the formula XXIXa. The concentration of these compounds is preferably 2 to 10% by weight.

The LC medium comprises one or more compounds of the formula IA, one or more compounds of the formula IB, one or more compounds selected from the group consisting of the formulae II and III or sub-formulae thereof, preferably selected from the group consisting of the formulae II1, II2, II3, III1, III4, III6, III16, III19 and III20, one or more compounds selected from the group consisting of the formulae IV to XI and XVIII to XXX3, preferably selected from the group consisting of the formulae IV, V, VI, VII, X, XI, XX, XXI and XXIII or sub-formulae thereof. and one or more compounds selected from the group consisting of the formulae XII to XVII3, preferably selected from the group consisting of the formulae XIII, XIV, XVI, XVIII and XVII2 or sub-formulae thereof.

The concentration of the compounds of the formulae II-XI and XVIII-XXX3 in the LC medium according to the invention is 30 to 60% by weight.

The concentration of the compounds of the formulae XII-XVII3 in the LC medium according to the invention is 2 to 30% by weight.

It has been found that the use of LC media according to the invention which comprise one or more compounds of the formulae IA and IB in a mixture with conventional liquid-crystal materials, but in particular with one or more compounds of the formulae II to XXX3, and comprise no alkenyl compounds leads to a significant increase in the light stability and to relatively high values for the birefringence, with broad nematic phases with low smectic-nematic transition temperatures being observed at the same time, causing an improvement in the storage stability. At the same time, the mixtures exhibit very low threshold voltages and very good values for the VHR on UV exposure and very high clearing points.

The compounds of the formulae IA to XXX3 have a broad range of applications. Depending on the choice of substituents, they can serve as base materials of which liquid-crystalline media are predominantly composed; however, it is also possible to add further liquid-crystalline base materials from other classes of compound to the compounds of the formulae IA to XXX3 in order, for example, to influence the dielectric and/or optical anisotropy of a dielectric of this type and/or to optimise its threshold voltage and/or its viscosity.

Through a suitable choice of the meanings of $R^o$ and $X^o$, it is possible to modify the addressing times, the threshold voltage, the steepness of the transmission characteristic lines, etc., in the desired manner. The mixtures according to the invention are distinguished, in particular, by high Δε values and thus have significantly faster response times than the mixtures from the prior art.

In a particularly preferred embodiment, the media according to the invention comprise compounds of the formula II to VIII (preferably II, III, V and VI) in which $X^o$ denotes F, $OCF_3$, $OCHF_2$, $OCH=CF_2$, $OCF=CF_2$ or $OCF_2-CF_2H$, particularly preferably F or $OCF_3$.

The compounds of the formulae IA to XXX3 have relatively low melting points, exhibit good phase of behaviour, are colourless in the pure state and form liquid-crystalline mesophases in a temperature range which is favourably located for electro-optical use. They are stable chemically, thermally and to light.

The optimum mixing ratio of the compounds of the above-mentioned formulae depends substantially on the desired properties, on the choice of the components of the above-mentioned formulae and the choice of any further components present.

Suitable mixing ratios within the range indicated above can easily be determined from case to case.

The total amount of compounds of the above-mentioned formulae in the mixtures according to the invention is not crucial. The mixtures can therefore comprise one or more further components in order to optimise various properties. The observed effect on the desired improvement in the properties of the mixture is, however, generally greater, the higher the total concentration of compounds of the above-mentioned formulae.

The individual compounds of the above-mentioned formulae and sub-formulae thereof which can be used in the media according to the invention are either known, or they can be prepared analogously to the known compounds by methods known per se, as described in the literature (for example in the standard works, such as Houben-Weyl, Methoden der Organischen Chemie [Methods of Organic Chemistry], Georg-Thieme-Verlag, Stuttgart), to be precise under reaction conditions which are known and suitable for the said reactions. Use can also be made here of variants known per se which are not mentioned in greater detail here.

Furthermore, polymerisable compounds, so-called reactive mesogens (RMs), for example as disclosed in U.S. Pat. No. 6,861,107, can be added to the mixtures according to the invention in concentrations of preferably 0.12-5% by weight, particularly preferably 0.2-2%, based on the mixture. These compounds may optionally also comprise a polymerisation initiator, as described, for example, in U.S. Pat. No. 6,781,665. The polymerisation initiator, for example Irgacure®651 (BASF), is preferably added to the mixture comprising polymerisable compounds in amounts of 0 to 1%. Mixtures of this type can be used for so-called polymer stabilized (PS) modes, in which polymerisation of the reactive mesogens is intended to take place in the liquid-crystalline mixture, for example for PS-IPS, PS-FFS, PS-TN, PS-VA-IPS. The prerequisite for this is that the liquid-crystal mixture itself comprises no polymerisable components.

In a preferred embodiment of the invention, the polymerisable compounds are selected from the compounds of the formula M

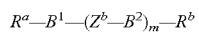

$$R^a-B^1-(Z^b-B^2)_m-R^b \qquad M$$

in which the individual radicals, in each case independently of one another and identically or differently on each occurrence, have the following meaning:

$R^a$ and $R^b$ P, P-Sp-, H, F, Cl, Br, I, —CN, —$NO_2$, —NCO, —NCS, —OCN, —SCN, $SF_5$ or straight-chain or branched alkyl having 1 to 25 C atoms, in which, in addition, one or more non-adjacent $CH_2$ groups may in each case be replaced, independently of one another, by —C($R^o$)=C($R^{oo}$)—, —C≡C—, —N($R^{oo}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN, P or P-Sp-, and in which, if $B^1$ and/or $B^2$ contain a saturated C atom, $R^a$ and/or $R^b$ may also denote a radical which can be connected to this saturated C atom via a spiro link, in which at least one of the radicals $R^a$ and $R^b$ denotes or contains a group P or P-Sp-, P a polymerisable group, Sp a spacer group or a single bond, $B^1$ and $B^2$ an aromatic, heteroaromatic, alicyclic or heterocyclic group, preferably having 4 to 25 ring atoms, preferably C atoms, which may also comprise or contain fused rings, and which may optionally be mono- or polysubstituted by L, L P, P-Sp-, OH, $CH_2OH$, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxy-carbonyloxy having 1 to 25 C atoms or alkenyl or alkynyl having 2 to 25 C atoms, in which, in addition, one or more H atoms may be replaced by F, Cl, P or P-Sp-, preferably P, P-Sp-, H, OH, CH$_2$OH, halogen, SF$_5$, NO$_2$, an alkyl, alkenyl or alkynyl group, Y$^1$ halogen, preferably F, Z$^b$ —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—, —COO—, —OCO—CH=CH—, CR$^0$R$^{00}$ or a single bond, R$^0$ and R$^{00}$ in each case, independently of one another, H or alkyl having 1 to 12 C atoms, R$^x$ P, P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that 0 and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms, m 0, 1, 2, 3 or 4, n1 1, 2, 3 or 4.

Preferred compounds of the formula M are those in which B$^1$ and B$^2$, in each case independently of one another, are selected from the group consisting of 1,4-phenylene, naphthalene-1,4-diyl, naphthalene-2,6-diyl, phenanthrene-2,7-diyl, anthracene-2,7-diyl, fluorene-2,7-diyl, coumarin, flavone, where, in addition, one or more CH groups in these groups may be replaced by N, cyclohexane-1,4-diyl, in which, in addition, one or more non-adjacent CH$_2$ groups may be replaced by 0 and/or S, 1,4-cyclohexenylene, bicyclo[1.1.1]-pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydro-naphthalene-2,6-diyl, indane-2,5-diyl or octahydro-4,7-methanoindane-2,5-diyl, where all these groups may be unsubstituted or mono- or polysubstituted by L Particularly preferred compounds of the formula M are those in which B$^1$ and B$^2$ in each case, independently of one another, denote 1,4-phenylene, 1,3-phenylene, naphthalene-1,4-diyl or naphthalene-2,6-diyl.

Further particularly preferred compounds of the formula M are those in which one or both radicals R$^a$ and R$^b$ denote P or P-Sp-.

Particularly preferred compounds of the formula M are selected from the following formulae:

M1

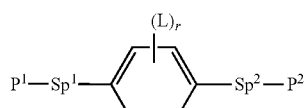

M2

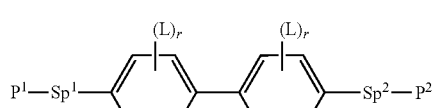

M3

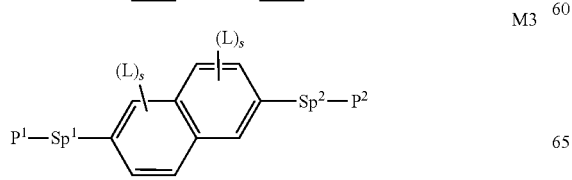

M4

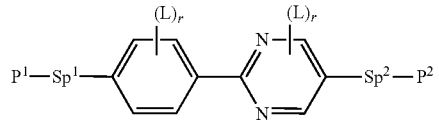

M5

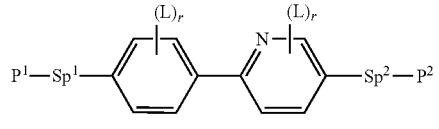

M6

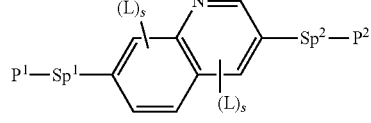

M7

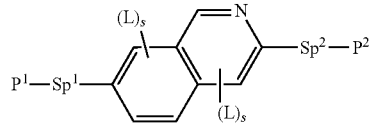

M8

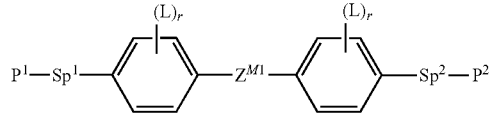

M9

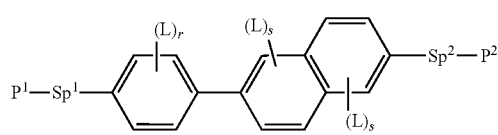

M10

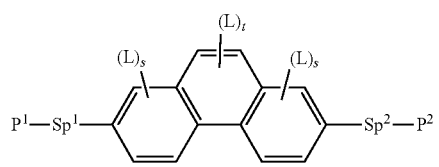

M11

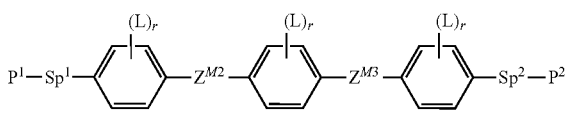

M12

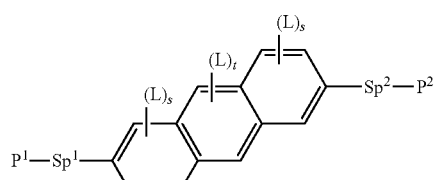

M13

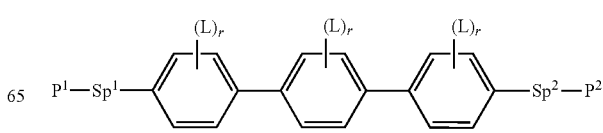

M14
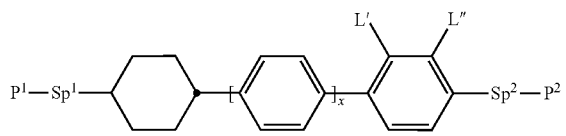
M15
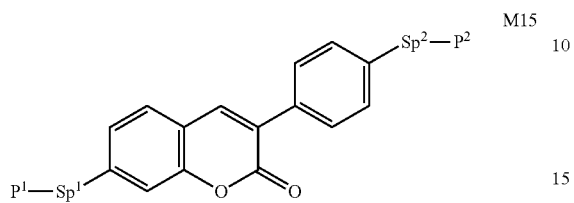
M16
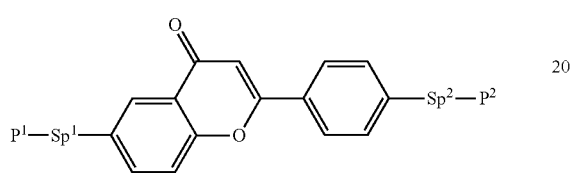
M17
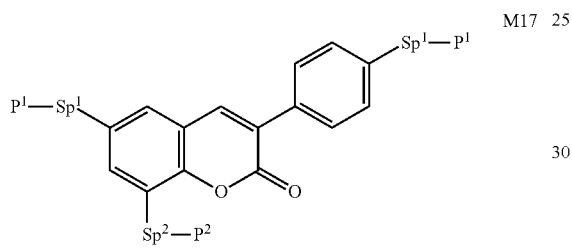
M18
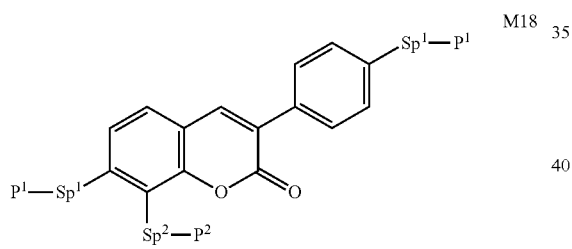
M19
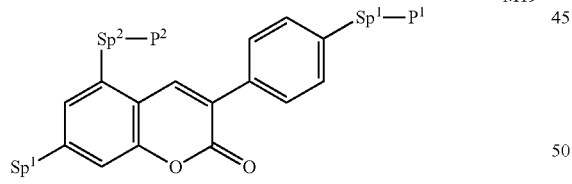
M20
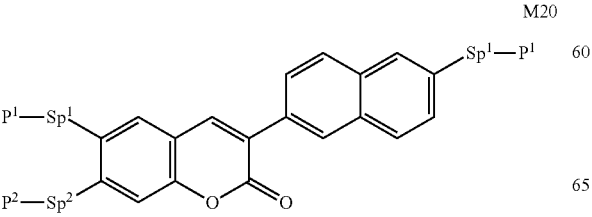
M21
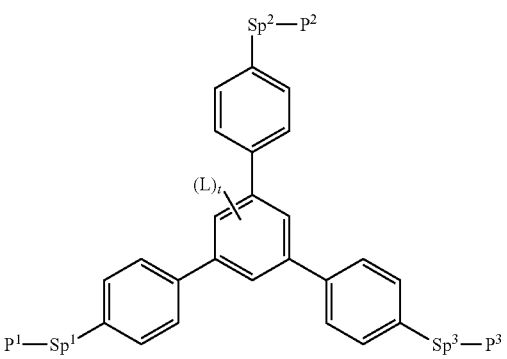
M22
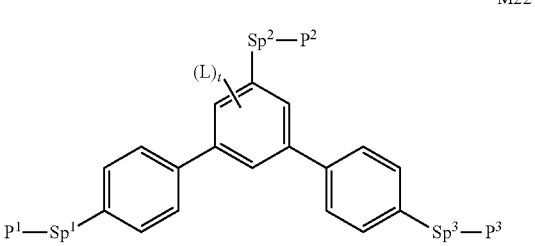
M23
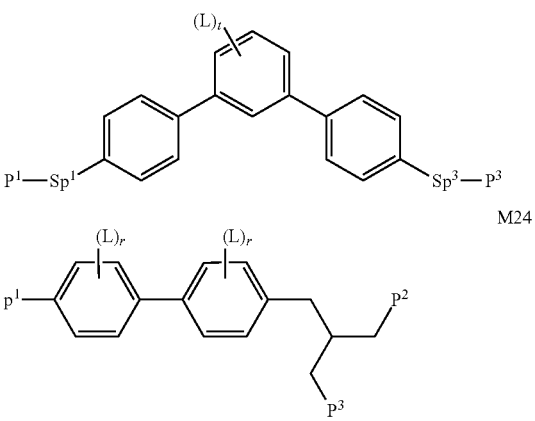
M24
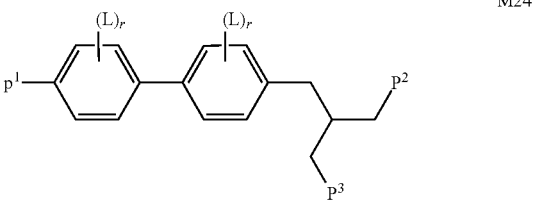
M25
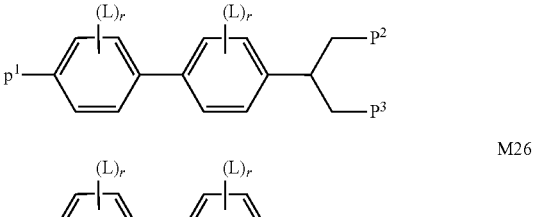
M26
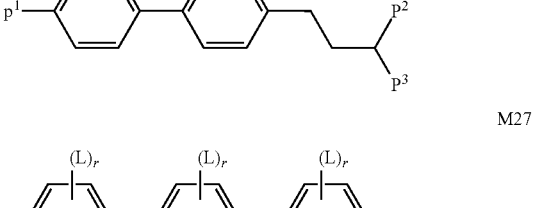
M27
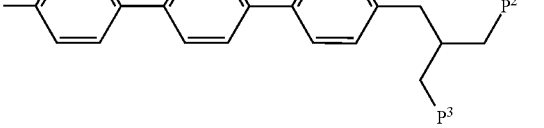

-continued

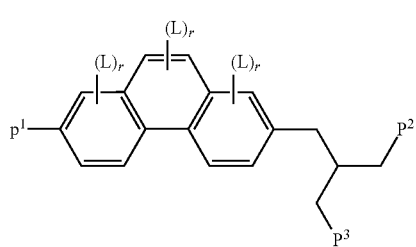
M28

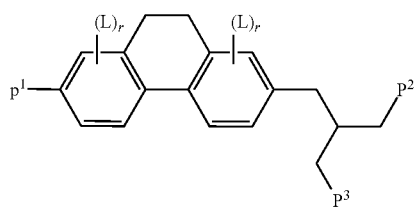
M29

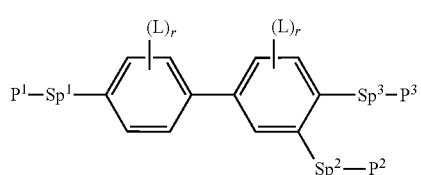
M30

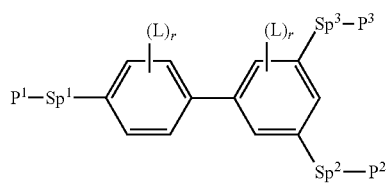
M31 in which the individual radicals have the following meaning:

$P^1$ to $P^3$ in each case, independently of one another, a polymerisable group, preferably having one of the meanings indicated above and below for P, particularly preferably an acrylate, methacrylate, fluoroacrylate, oxetane vinyloxy or epoxy group, $Sp^1$ to $Sp^3$ in each case, independently of one another, a single bond or a spacer group, preferably having one of the meanings indicated above and below for Sp, and particularly preferably denote —$(CH_2)_{p1}$—, —$(CH_2)_{p1}$—O—, —$(CH_2)_{p1}$—CO—O— or —$(CH_2)_{p1}$—O—CO—O—, in which p1 is an integer from 1 to 12, and where in the last-mentioned groups the link to the adjacent ring takes place via the 0 atom, where one of the radicals $P^1$-$Sp^1$, $P^2$-$Sp^2$- and $P^3$-$Sp^3$- may also denote $R^{aa}$, $R^{aa}$ H, F, Cl, CN or straight-chain or branched alkyl having 1 to 25 C atoms, in which, in addition, one or more non-adjacent $CH_2$ groups may in each case be replaced, independently of one another, by $C(R^0)$=$C(R^{00})$—, —C≡C—, —$N(R^0)$—, —O—, —S—, —CO—, —CO—O—, —O—CO—, —O—CO—O— in such a way that 0 and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated, alkyl, alkoxy, alkenyl, alkynyl, alkylcarbonyl, alkoxycarbonyl or alkylcarbonyloxy having 1 to 12 C atoms (where the alkenyl and alkynyl radicals have at least two and the branched radicals at least three C atoms), $R^0$ and $R^{00}$ in each case, independently of one another and identically or differently on each occurrence, H or alkyl having 1 to 12 C atoms, $R^y$ and $R^z$ in each case, independently of one another, H, F, $CH_3$ or $CF_3$, $Z^1$ —O—, —CO—, —$C(R^y R^z)$— or —$CF_2CF_2$—, $Z^2$ and $Z^3$ in each case, independently of one another, —CO—O—, —O—CO—, —$CH_2$O—, —O$CH_2$—, —$CF_2$O—, —O$CF_2$— or —$(CH_2)_n$—, where n is 2, 3 or 4, L is identical or different on each occurrence and has the meaning given above under formula M and preferably denotes F, Cl, CN, or straight-chain or branched, optional mono- or polyfluorinated, alkyl, alkoxy, alkenyl, alkynyl, alkylcarbonyl, alkoxycarbonyl or alkylcarbonyloxy having 1 to 12 C atoms, preferably F, L' and L" in each case, independently of one another, H, F or Cl, $X^1$ to $X^3$ in each case, independently of one another, —CO—O—, —O—CO— or a single bond, r 0, 1, 2, 3 or 4, s 0, 1, 2 or 3, t 0, 1 or 2, and x 0 or 1.

Preference is given to the polymerisable compounds of the formulae M2, M13, M17, M22, M23, M24 and M30. Particular preference is given to compounds of the formulae M2 and M13.

Preference is furthermore given to trireactive compounds of the formulae M15 to M31, in particular M17, M18, M19, M22, M23, M24, M25, M30 and M31.

Further suitable and preferred polymerisable compounds are listed, for example, in Table E.

In the compounds of the formulae M1 to M31, the group

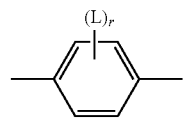

preferably denotes

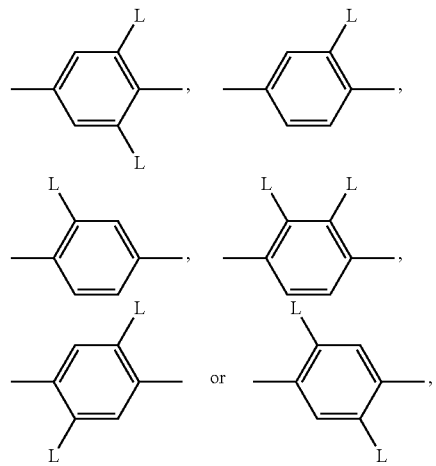

in which L, identically or differently on each occurrence, has one of the meanings indicated above and below, and preferably denotes F, Cl, CN, $NO_2$, $CH_3$, $C_2H_5$, $C(CH_3)_3$, CH(CH$_3$)$_2$, CH$_2$CH(CH$_3$)C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$ or P-Sp-, particularly preferably F, Cl, CN, CH$_3$, C$_2$H$_5$, OCH$_3$, COCH$_3$, OCF$_3$ or P-Sp-, very particularly preferably F, Cl, CH$_3$, OCH$_3$, COCH$_3$ or OCF$_3$, in particular F or CH$_3$.

Preferred compounds of the formulae M1 to M31 are those in which P$^1$, P$^2$ and P$^3$ denote an acrylate, methacrylate, oxetane or epoxy group, particularly preferably an acrylate or methacrylate group.

Further preferred compounds of the formulae M1 to M31 are those in which Sp$^1$, Sp$^2$ and Sp$^3$ denote a single bond.

Further preferred compounds of the formulae M1 to M31 are those in which at least one of the radicals Sp$^1$, Sp$^2$ and Sp$^3$ denotes a single bond and at least one of the radicals Sp$^1$, Sp$^2$ and Sp$^3$ is different from a single bond.

Further preferred compounds of the formulae M1 to M31 are those in which the radicals Sp$^1$, Sp$^2$ and Sp$^3$ that are different from a single bond denote —(CH$_2$)$_{s1}$—X''—, in which s1 denotes an integer from 1 to 6, preferably 2, 3, 4 or 5, and X'' represents the link to the adjacent benzene ring and denotes —O—, —O—CO—, —CO—O—, —O—CO—O— or a single bond.

The LC medium preferably comprises one, two or three polymerisable compounds of the formula M, preferably selected from the formulae M1 to M31, particularly preferably selected from Table E.

The liquid-crystalline media in accordance with the present application preferably comprise in total 0.01 to 3%, preferably 0.1 to 1.0%, particularly preferably 0.1 to 0.5%, of polymerisable compounds.

It has been observed that the addition of one or more polymerisable compounds, as selected, for example, from formula M or Table E, to the LC medium according to the invention leads to advantageous properties, such as, for example, faster response times. An LC medium according to the invention which comprises one or more polymerisable compounds of this type is particularly suitable for use in PSA displays, in which it may lead to advantageous properties, such as reduced image sticking, faster and more complete polymerisation, faster tilt-angle generation, increased tilt stability after UV exposure, high reliability, high VHR values after UV exposure, and high birefringence. In addition, the UV absorption can be shifted to longer wavelengths by appropriate choice of the polymerisable compounds, enabling polymerisation at longer UV wavelengths, which is advantageous for the process for the production of the displays according to the invention.

The polymerisable group P is a group which is suitable for a polymerisation reaction, such as, for example, free-radical or ionic chain polymerisation, polyaddition or polycondensation, or for a polymer-analogous reaction, for example addition or condensation onto a polymer main chain. Particular preference is given to groups for chain polymerisation, in particular those containing a C=C double bond or —C≡C— triple bond, and groups which are suitable for polymerisation with ring opening, such as, for example, oxetane or epoxy groups.

Preferred groups P are selected from CH$_2$=CW$^1$—CO—O—, CH$_2$=CW$^1$—CO—,

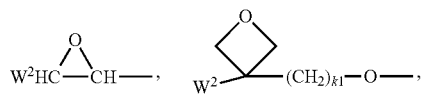

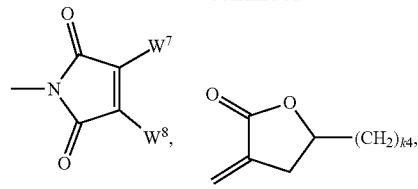

CH$_2$=CW$^2$—(O)$_{k3}$—, CW$^1$=CH—CO—(O)$_{k3}$—, CW$^1$=CH—CO—NH—, CH$_2$=CW$^1$—CO—NH—, CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HO—CW$^2$W$^3$—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, HOOC—, OCN— and W$^4$W$^5$W$^6$Si—, in which W$^1$ denotes H, F, Cl, CN, CF$_3$, phenyl or alkyl having 1 to 5 C atoms, in particular H, F, Cl or CH$_3$, W$^2$ and W$^3$ in each case, independently of one another, denote H or alkyl having 1 to 5 C atoms, in particular H, methyl, ethyl or n-propyl, W$^4$, W$^5$ and W$^6$ in each case, independently of one another, denote Cl, oxaalkyl or oxacarbonylalkyl having 1 to 5 C atoms, W$^7$ and W$^8$ in each case, independently of one another, denote H, Cl or alkyl having 1 to 5 C atoms, Phe denotes 1,4-phenylene, which is optionally substituted by one or more radicals L as defined above, which are different from P-Sp-, k$_1$, k$_2$ and k$_3$ in each case, independently of one another, denote 0 or 1, k$_3$ preferably denotes 1, and k$_4$ denotes an integer from 1 to 10.

Particularly preferred groups P are CH$_2$=CW$^1$—COO—, in particular CH$_2$=CH—COO—, CH$_2$=C(CH$_3$)—COO— and CH$_2$=CF—COO—, furthermore CH$_2$=CH—O—, (CH$_2$=CH)$_2$CH—OCO—, (CH$_2$=CH)$_2$CH—O—,

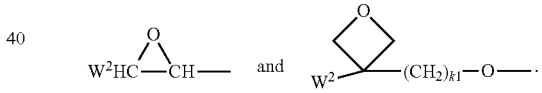

Very particularly preferred groups P are vinyloxy, acrylate, methacrylate, fluoroacrylate, chloroacrylate, oxetane and epoxy, in particular acrylate and methacrylate.

If Sp is different from a single bond, it is preferably selected from the formula Sp'-X', so that the radical P-Sp- corresponds to the formula P-Sp'-X'—, where Sp' denotes alkylene having 1 to 20, preferably 1 to 12 C atoms, which is optionally mono- or polysubstituted by F, Cl, Br, I or CN, and in which, in addition, one or more non-adjacent CH$_2$ groups may in each case be replaced, independently of one another, by —O—, —S—, —NH—, —NR$^0$—, —SiR$^{00}$R$^{000}$—, —CO—, —COO—, —OCO—, —OCO—O—, —S—CO—, —CO—S—, —NR$^{00}$—CO—O—, —O—CO—NR$^{00}$—, —NR$^{00}$—CO—NR$^{00}$—, —CH=CH— or —C≡C— in such a way that O and/or S atoms are not linked directly to one another, X' denotes —O—, —S—, —CO—, —COO—, —OCO—, —O—COO—, —CO—NR$^{00}$—, —NR$^{00}$—CO—, —NR$^{00}$—CO—NR$^{00}$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—COO—, —OCO—CH=CH— or or a single bond, $R^{00}$ and $R^{000}$ in each case, independently of one another, denote H or alkyl having 1 to 12 C atoms, and $Y^2$ and $Y^3$ in each case, independently of one another, denote H, F, Cl or CN.

X' is preferably —O—, —S—CO—, —COO—, —OCO—, —O—COO—, —CO—NR$^0$—, —NR$^0$—CO—, —NR$^0$—CO—NR$^0$— or a single bond.

Typical spacer groups Sp' are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^{00}$R$^{000}$—O)$_{p1}$, in which p1 is an integer from 1 to 12, q1 is an integer from 1 to 3, and $R^{00}$ and $R^{000}$ have the meanings indicated above.

Particularly preferred groups Sp and -Sp"-X"— are —(CH$_2$)$_{p1}$—, —(CH$_2$)$_{p1}$—O—, —(CH$_2$)$_{p1}$—O—CO—, —(CH$_2$)$_{p1}$—CO—O—, —(CH$_2$)$_{p1}$—O—CO—O—, in which p1 and q1 have the meanings indicated above.

Particularly preferred groups Sp' are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

In a further preferred embodiment of the invention, P-Sp- denotes a radical having two or more polymerisable groups (multifunctional polymerisable radicals). Suitable radicals of this type, and polymerisable compounds containing them, and the preparation thereof, are described, for example, in U.S. Pat. No. 7,060,200 B1 or US 2006/0172090 A1. Particular preference is given to multifunctional polymerisable radicals P-Sp- selected from the following formulae —X-alkyl-$CHP^1$—$CH_2$—$CH_2P^2$        I*a —X-alkyl-$C(CH_2P^1)(CH_2P^2)$—$CH_2P^3$        I*b —X-alkyl-$CHP^1CHP^2$—$CH_2P^3$        I*c —X-alkyl-$C(CH_2P^1)(CH_2P^2)$—$C_{aa}H_{2aa+1}$        I*d —X-alkyl-$CHP^1$—$CH_2P^2$        I*e —X-alkyl-$CHP^1P^2$        I*f —X-alkyl-$CP^1P^2$—$C_{aa}H_{2aa+1}$        I*g —X-alkyl-$C(CH_2P^1)(CH_2P^2)$—$CH_2OCH_2$—$C(CH_2P^3)(CH_2P^4)CH_2P^5$        I*h —X-alkyl-$CH((CH_2)_{aa}P^1)((CH_2)_{bb}P^2)$        I*i —X-alkyl-$CHP^1CHP^2$—$C_{aa}H_{2aa+1}$        I*k —X'-alkyl-$C(CH_3)(CH_2P^1)(CH_2P^2)$        I*m in which alkyl denotes a single bond or straight-chain or branched alkylene having 1 to 12 C atoms, in which one or more non-adjacent CH$_2$ groups may in each case be replaced, independently of one another, by —C(R$^{00}$)=C(R$^{000}$)—, —C≡C—, —N(R$^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl or CN, where $R^{00}$ and $R^{000}$ have the meaning indicated above, aa and bb in each case, independently of one another, denote 0, 1, 2, 3, 4, 5 or 6, X has one of the meanings indicated for X', and $P^{1-5}$ in each case, independently of one another, have one of the meanings indicated for P.

The polymerisable compounds and RMs can be prepared analogously to the process known to the person skilled in the art and described in standard works of organic chemistry, such as, for example, in Houben-Weyl, Methoden der organischen Chemie [Methods of Organic Chemistry], Thieme-Verlag, Stuttgart. Further synthetic processes are found in the documents cited above and below. In the simplest case, the synthesis of such RMs is carried out, for example, by esterification or etherification of 2,6-dihydroxynaphthalene or 4,4'-dihydroxybiphenyl using corresponding acids, acid derivatives, or halogenated compounds containing a group P, such as, for example, (meth)acryloyl chloride or (meth)acrylic acid, in the presence of a dehydrating reagent, such as, for example, DCC (dicyclohexylcarbodiimide).

For the production of PSA displays according to the invention, the polymerisable compounds present in the LC medium according to the invention are polymerised or crosslinked, preferably in situ in the display, with a voltage optionally being applied to the electrodes of the display.

The structure of the LC displays according to the invention corresponds to the usual geometry for PSA displays, as described in the prior art cited in the introduction. Geometries without protrusions are preferred, in particular those in which, in addition, the electrode on the colour filter side is unstructured and only the electrode on the TFT side has slots. Particularly suitable and preferred electrode structures for PS-VA displays are described, for example, in US 2006/0066793 A1.

The LC mixtures and LC media according to the invention are in principle suitable for any type of PS of PSA display, in particular those based on LC media having negative dielectric anisotropy, particularly preferably for PSA-VA, PSA-IPS or PS-FFS displays. However, the person skilled in the art will be able, without inventive step, also to employ suitable LC mixtures and LC media according to the invention in other displays of the PS or PSA type, for example in PS-TN or PS-OCB displays, which differ from the above-mentioned displays, for example, through their basic structure or through the type, arrangement or structure of the individual components used, such as, for example, the substrates, alignment layers, electrodes, driving elements, backlighting, polarisers, colour filters, any compensation films present, etc.

In a further preferred embodiment, the LC medium according to the invention comprises one or more chiral dopants, preferably in a concentration of 0.01 to 1% by weight, particularly preferably 0.05 to 0.5% by weight. The chiral dopants are preferably selected from the group consisting of the compounds from Table B below, particularly preferably from the group consisting of R- or S-1011, R- or S-2011, R- or S-3011, R- or S-4011, and R- or S-5011.

In a further preferred embodiment, the LC medium according to the invention comprises a racemate of one or more chiral dopants, preferably selected from the preferred chiral dopants mentioned above.

In a further preferred embodiment, the LC medium according to the invention comprises a "self-alignment" (SA) additive, preferably in a concentration of 0.1 to 2.5% by weight. Media of this type are particularly suitable for use in SA-FFS or SA-HB-FFS displays, which may also be polymer-stabilised.

In a preferred embodiment, the SA-FFS or SA-HB-FFS display contains no alignment layers, in particular polyimide alignment layers.

Preferred SA additives are selected from compounds containing a mesogenic group and a straight-chain or branched alkyl side chain which contains a terminal polar anchor group, which is preferably selected from the group consisting of hydroxyl, carboxyl, amino and thiol.

In addition to the polar anchor group, further preferred SA additives contain one or more polymerisable groups which are linked to the mesogenic group, optionally via spacer groups. These polymerisable SA additives can be polymerised in the LC medium under the same or similar conditions as the above-mentioned polymerisable compounds or RMs.

Suitable and preferred SA additives are disclosed, for example, in US 2013/0182202 A1, US 2014/0838581 A1, US 2015/0166890 A1 and US 2015/0252265 A1.

Further suitable and preferred SA additives are selected from Table F below.

The present invention also relates to the use of the mixtures according to the invention in electro-optical displays and to the use of the mixtures according to the invention in LC windows, shutter spectacles, in particular for 3D applications, and in TN, PS-TN, STN, TN-TFT, OCB, IPS, PS-IPS, FFS, PS-FFS, positive-VA and PS-positive-VA displays.

The invention furthermore relates to an electro-optical display, an LC window, shutter spectacles for 3D applications, and an LC display of the TN, PS-TN, STN, TN-TFT, OCB, IPS, PS-IPS, FFS, PS-FFS, positive-VA or positive-PS-VA type, containing an LC medium according to the invention.

The invention also relates to electro-optical displays, such as, for example, STN or MLC displays, having two plane-parallel outer plates, which, together with a frame, form a cell, integrated non-linear elements for switching individual pixels on the outer plates, and a nematic liquid-crystal mixture having positive dielectric anisotropy and high specific resistance located in the cell, which contain media of this type, and to the use of these media for electro-optical purposes.

The liquid-crystal mixtures according to the invention enable a significant broadening of the available parameter latitude. The achievable combinations of clearing point, viscosity at low temperature, thermal and UV stability and high optical anisotropy are far superior to previous materials from the prior art.

The mixtures according to the invention are suitable, in particular, for mobile applications and TFT applications, such as, for example, mobile telephones and PDAs. The mixtures according to the invention can furthermore be used in FFS, IPS, OCB and IPS displays.

The liquid-crystal mixtures according to the invention, while retaining the nematic phase to −20° C. and preferably to −30° C., particularly preferably to −40° C., and the clearing point ≥70° C., preferably ≥72° C., at the same time make it possible to achieve rotational viscosities $\gamma_1$ of ≤110 mPa·s, particularly preferably ≤100 mPa·s, enabling excellent MLC displays having fast response times to be obtained. The rotational viscosities are determined at 20° C.

The dielectric anisotropy of the liquid-crystal mixtures according to the invention $\Delta\varepsilon$ at 20° C. is preferably ≥+7, particularly preferably ≥+8, especially preferably ≥10. In addition, the mixtures are characterised by low operating voltages. The threshold voltage of the liquid-crystal mixtures according to the invention is preferably ≤2.0 V. The birefringence $\Delta n$ of the liquid-crystal mixtures according to the invention at 20° C. is preferably ≥0.09, particularly preferably ≥0.10.

The nematic phase range of the liquid-crystal mixtures according to the invention preferably has a width of at least 90°, in particular at least 100°. This range preferably extends at least from −25° to +70° C.

It goes without saying that, through a suitable choice of the components of the mixtures according to the invention, it is also possible for higher clearing points (for example above 100° C.) to be achieved at higher threshold voltages or lower clearing points to be achieved at lower threshold voltages with retention of the other advantageous properties. At viscosities correspondingly increased only slightly, it is likewise possible to obtain mixtures having a greater $\Delta\varepsilon$ and thus low thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (German patent 30 22 818), lower dielectric anisotropy is sufficient at the same threshold voltage as in an analogous display at the second minimum. This enables significantly higher specific resistances to be achieved at the first minimum using the mixtures according to the invention than in the case of mixtures comprising cyano compounds. Through a suitable choice of the individual components and their proportions by weight, the person skilled in the art is able to set the birefringence necessary for a pre-specified layer thickness of the MLC display using simple routine methods.

Measurements of the voltage holding ratio (HR) [S. Matsumoto et al., Liquid Crystals 5, 1320 (1989); K. Niwa et al., Proc. SID Conference, San Francis-co, June 1984, p. 304 (1984); G. Weber et al., Liquid Crystals 5, 1381 (1989)] have shown that mixtures according to the invention comprising one or more compounds of the formula 1 and one or more compounds of the formula 2 and one or more compounds of the formulae 3 to 5 and one or more compounds of the formulae 6 and/or 7 have a significantly smaller decrease in the HR on UV exposure than analogous mixtures comprising cyanophenylcyclohexanes of the formula

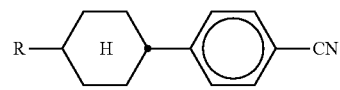

or esters of the formula

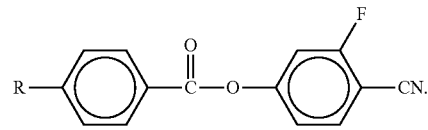

The light stability and UV stability of the mixtures according to the invention are considerably better, i.e. they exhibit a significantly smaller decrease in the HR on exposure to light or UV.

The construction of the MLC display according to the invention from polarisers, electrode base plates and surface-treated electrodes corresponds to the usual design for displays of this type. The term usual design is broadly drawn here and also encompasses all derivatives and modifications of the MLC display, in particular also matrix display elements based on poly-Si TFT or MIM.

An essential difference between the displays according to the invention and the hitherto conventional displays based on the twisted nematic cell consists, however, in the choice of the liquid-crystal parameters of the liquid-crystal layer.

The liquid-crystal mixtures which can be used in accordance with the invention are prepared in a manner conventional per se, for example by mixing one or more compounds of the formula 1 and one or more compounds of the formula 2 with one or more compounds of the formulae 3 to 5 and one or more compounds of the formula 6 and/or 7 and optionally one or more compounds of the formulae II-XXIII or with further liquid-crystalline compounds and/or additives. In general, the desired amount of the components used in lesser amount is dissolved in the components making up the principal constituent, where necessary at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature, such as, for example, UV stabilisers, such as Tinuvin®, for example Tinuvin® 770, from Ciba Chemicals, antioxidants, for example TEMPOL, microparticles, free-radical scavengers, nanoparticles, etc. For example, 0 to 15% of pleochroic dyes or chiral dopants can be added. Suitable stabilisers and dopants are indicated below in Tables C and D.

In the present application and in the following examples, the structures of the liquid-crystal compounds are indicated by means of acronyms, the trans-formation into chemical formulae taking place in accordance with Table A. All radicals $C_nH_{2n+1}$ and $C_mH_{2m+1}$ are straight-chain alkyl radicals having n and m C atoms respectively; n and m are integers and preferably denote 0, 1, 2, 3, 4, 5, 6, 7, 8, 9, 10, 11 or 12 particularly preferably 1, 2, 3, 4, 5, 6 or 7. The coding in Table B is self-evident. In Table A, only the acronym for the basic structure is indicated. In individual cases, the acronym for the parent structure is followed, separated by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO•m | $OC_nH_{2n+1}$ | $C_mH_{2m+1}$ | H | H |
| n | $C_nH_{2n+1}$ | CN | H | H |
| nN•F | $C_nH_{2n+1}$ | CN | F | H |
| nN•F•F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF•F | $C_nH_{2n+1}$ | F | F | H |
| nF•F•F | $C_nH_{2n+1}$ | F | F | F |
| nOCF$_3$ | $C_nH_{2n+1}$ | OCF$_3$ | H | H |
| nOCF$_3$•F | $C_nH_{2n+1}$ | OCF$_3$ | F | H |
| n-Vm | $C_nH_{2n+1}$ | —CH=CH—$C_mH_{2m+1}$ | H | H |
| nV—Vm | $C_nH_{2n+1}$—CH=CH— | —CH=CH—$C_mH_{2m+1}$ | H | H |

Preferred mixture components are shown in Tables A and B.

TABLE A

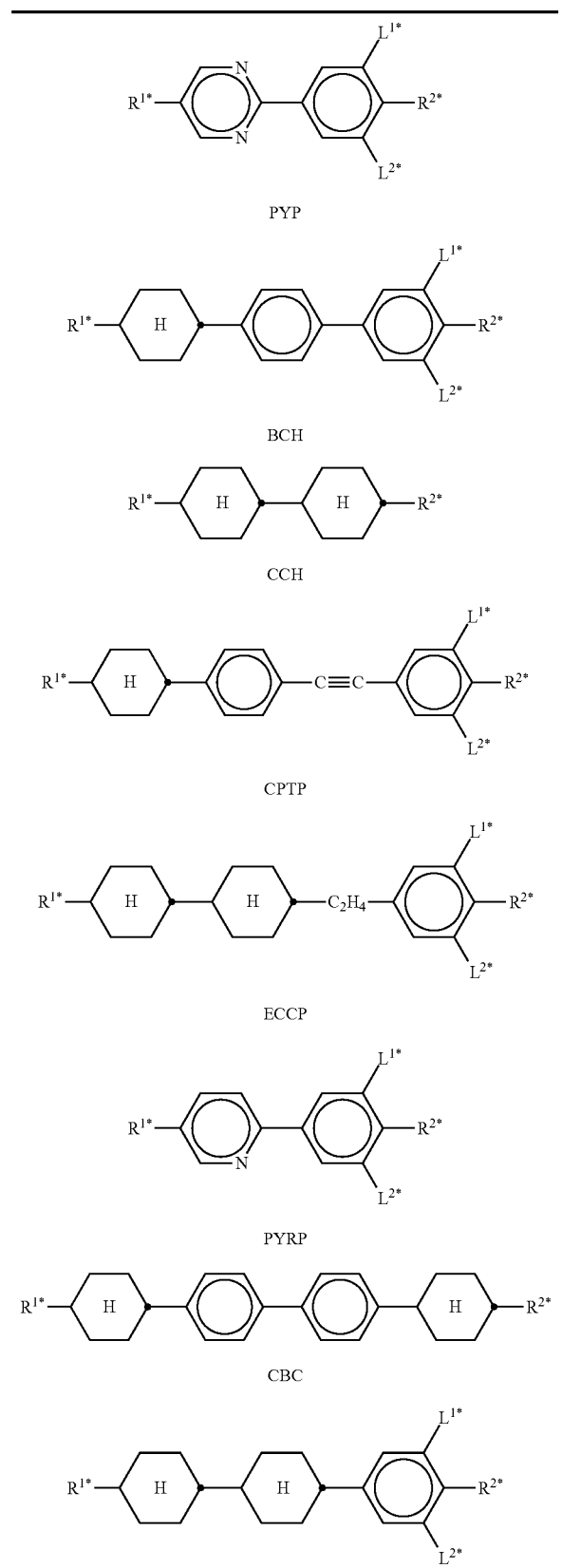

TABLE A-continued
CCP
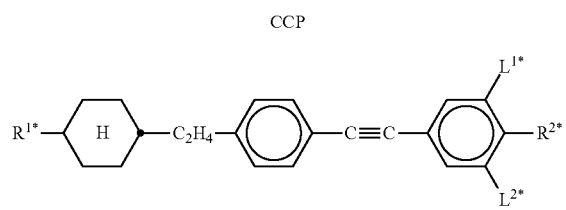
CEPTP
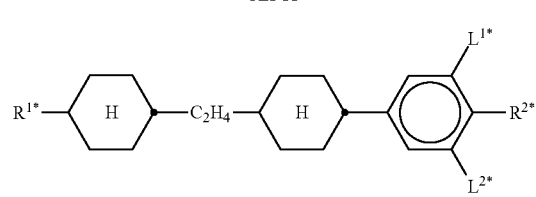
CECP
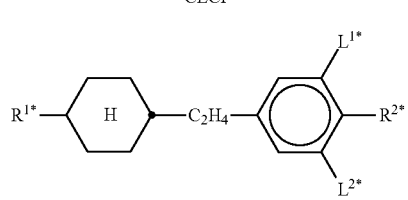
EPCH
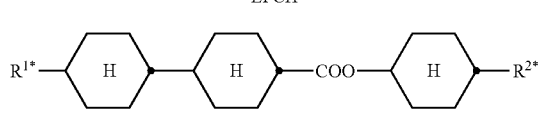
CH
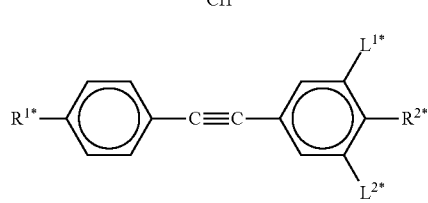
PTP
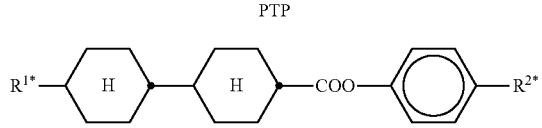
CP
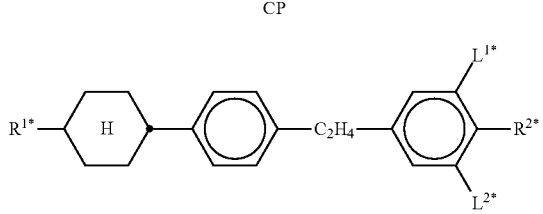
EBCH
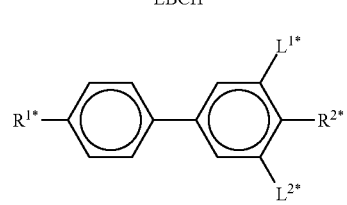
TABLE A-continued
B
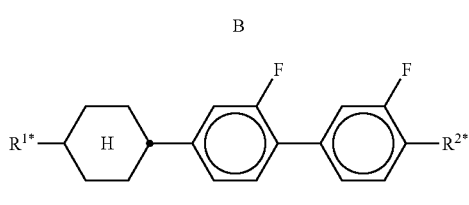
CGG
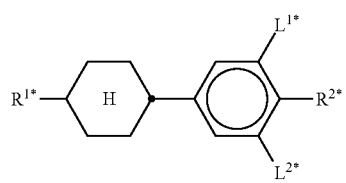
PCH
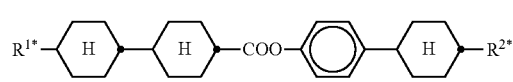
CCPC
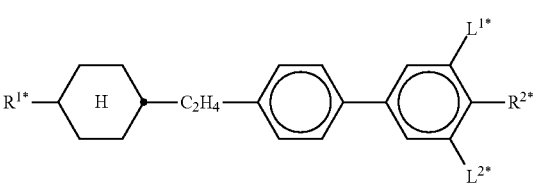
BECH
CPC
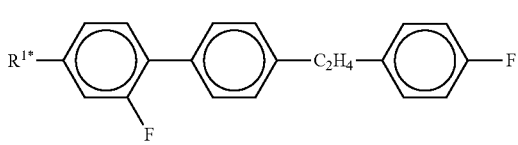
FET-nF
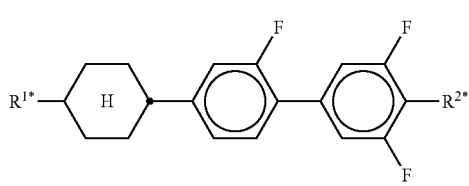
CGU
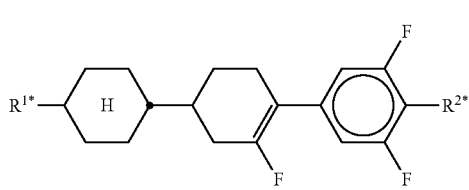
CFU TABLE B
In the following formulae, n and m in each case, independently of one another, denote 0, 1, 2, 3, 4, 5, 6, 7, 8, 9, 10, 11 or 12, in particular 2, 3, 5, furthermore 0, 4, 6, preferably not 0.
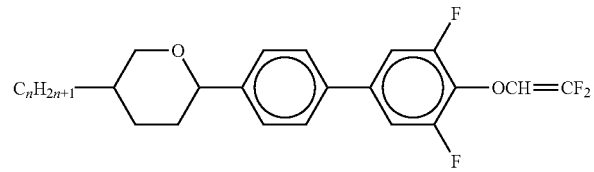
APU-n-OXF
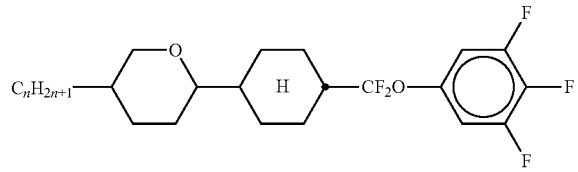
ACQU-n-F
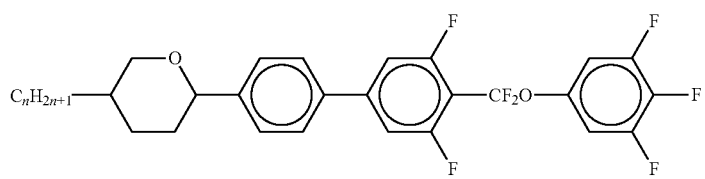
APUQU-n-F
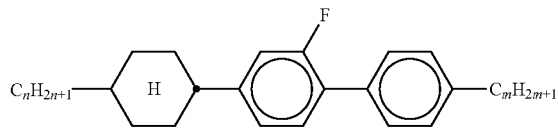
BCH-n•Fm
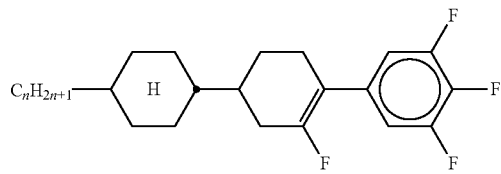
CFU-n-F
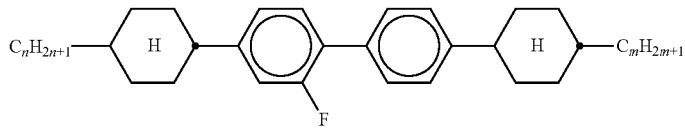
CBC-nmF
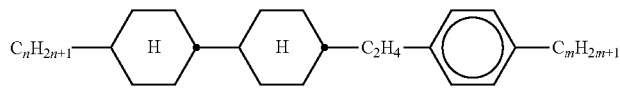
ECCP-nm TABLE B-continued
In the following formulae, n and m in each case, independently of one another, denote 0, 1, 2, 3, 4, 5, 6, 7, 8, 9, 10, 11 or 12, in particular 2, 3, 5, furthermore 0, 4, 6, preferably not 0.
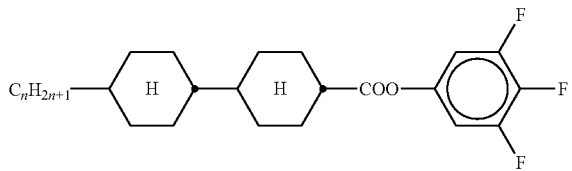
CCZU-n-F
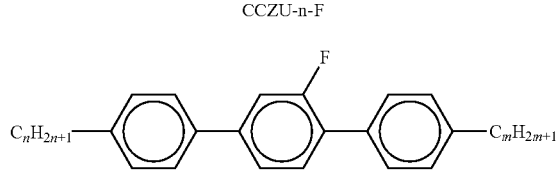
PGP-n-m
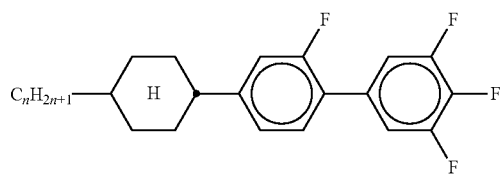
CGU-n-F
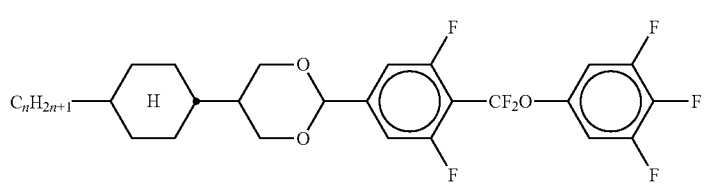
CDUQU-n-F
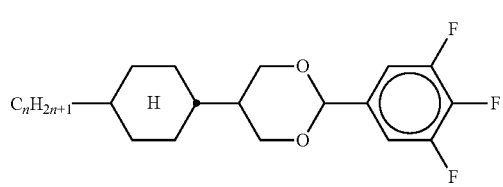
CDU-n-F
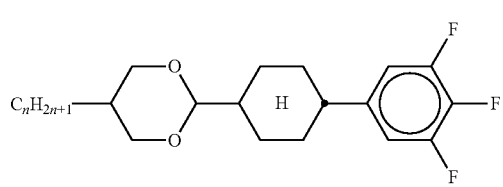
DCU-n-F
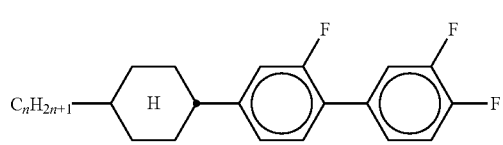
CGG-n-F TABLE B-continued
In the following formulae, n and m in each case, independently of one another, denote 0, 1, 2, 3, 4, 5, 6, 7, 8, 9, 10, 11 or 12, in particular 2, 3, 5, furthermore 0, 4, 6, preferably not 0.
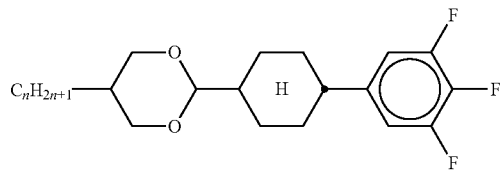
CPZG-n-OT
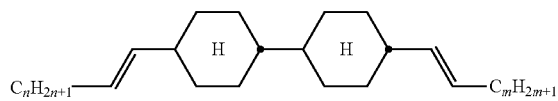
CC-nV-Vm
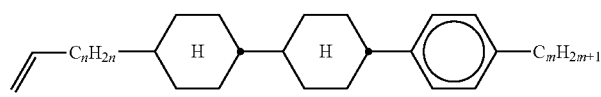
CCP-Vn-m
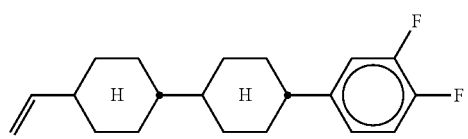
CCG-V-F
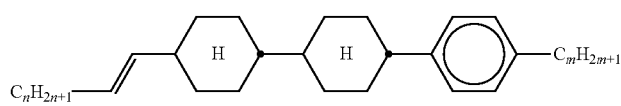
CCP-nV-m
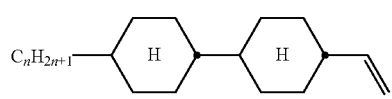
CC-n-V
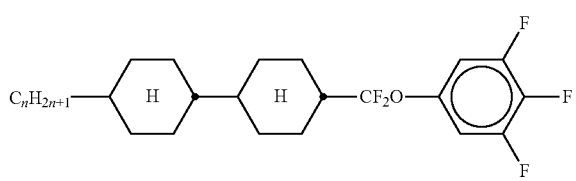
CCQU-n-F
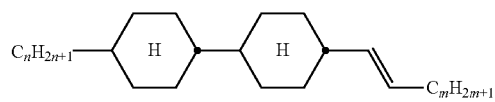
CC-n-Vm TABLE B-continued
In the following formulae, n and m in each case, independently of one another, denote 0, 1, 2, 3, 4, 5, 6, 7, 8, 9, 10, 11 or 12, in particular 2, 3, 5, furthermore 0, 4, 6, preferably not 0.
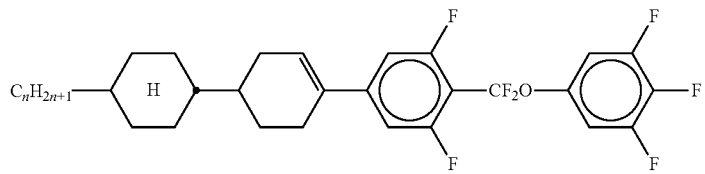
CLUQU-n-F
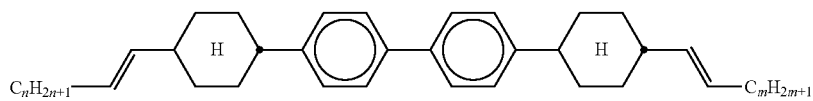
CPPC-nV-Vm
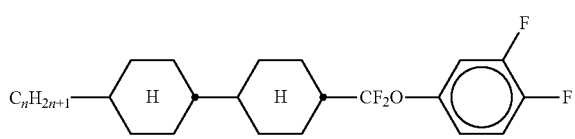
CCQG-n-F
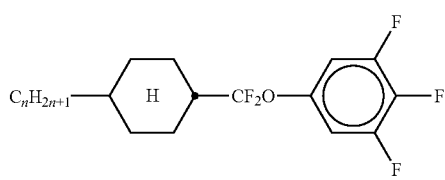
CQU-n-F
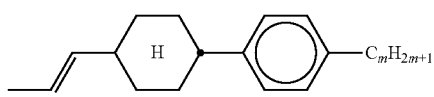
CP-1V-m
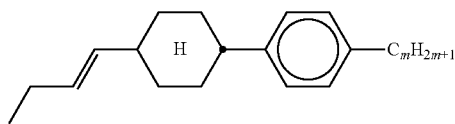
CP-2V-m
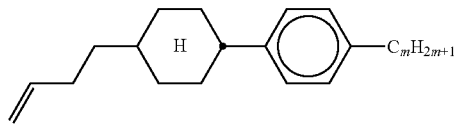
CP-V2-m
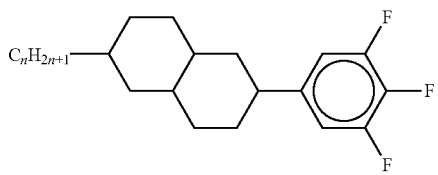
Dec-U-n-F TABLE B-continued
In the following formulae, n and m in each case, independently of one another, denote 0, 1, 2, 3, 4, 5, 6, 7, 8, 9, 10, 11 or 12, in particular 2, 3, 5, furthermore 0, 4, 6, preferably not 0.
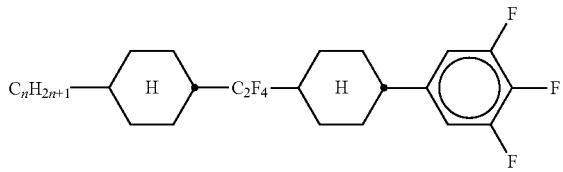
CWCU-n-F
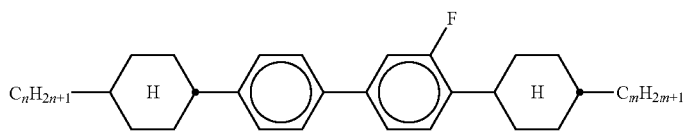
CPGP-n-m
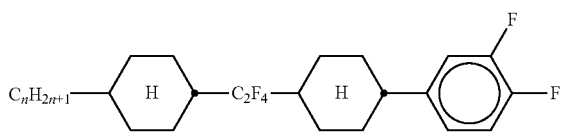
CWCG-n-F
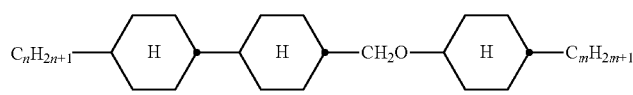
CCOC-n-m
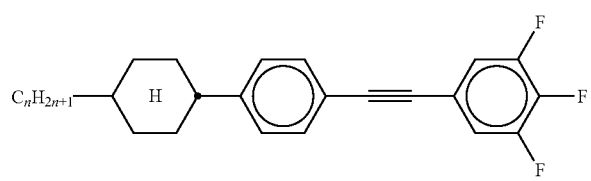
CPTU-n-F
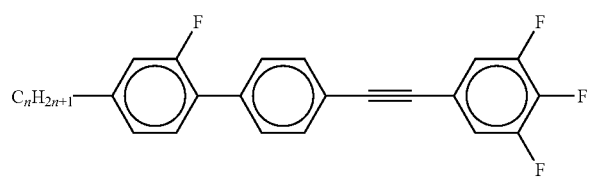
GPTU-n-F
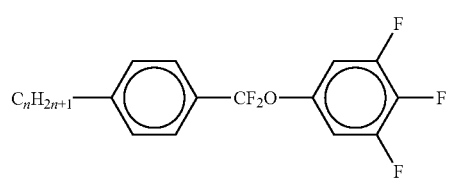
PQU-n-F TABLE B-continued
In the following formulae, n and m in each case, independently of one another, denote 0, 1, 2, 3, 4, 5, 6, 7, 8, 9, 10, 11 or 12, in particular 2, 3, 5, furthermore 0, 4, 6, preferably not 0.
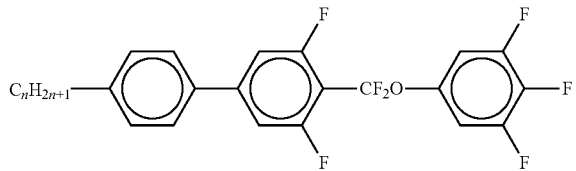
PUQU-n-F
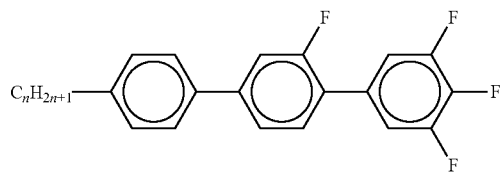
PGU-n-F
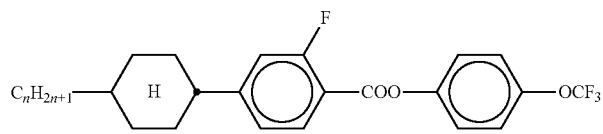
CGZP-n-OT
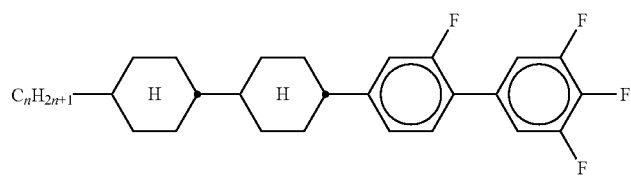
CCGU-n-F
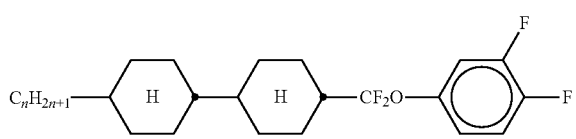
CCQG-n-F
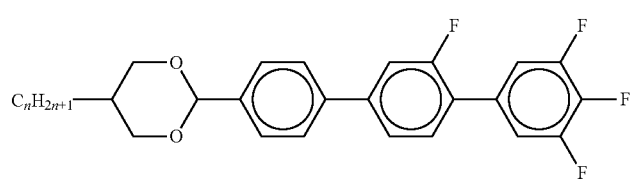
DPGU-n-F
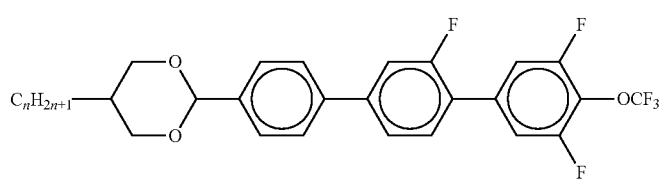
DPGU-n-OT TABLE B-continued
In the following formulae, n and m in each case, independently of one another, denote 0, 1, 2, 3, 4, 5, 6, 7, 8, 9, 10, 11 or 12, in particular 2, 3, 5, furthermore 0, 4, 6, preferably not 0.
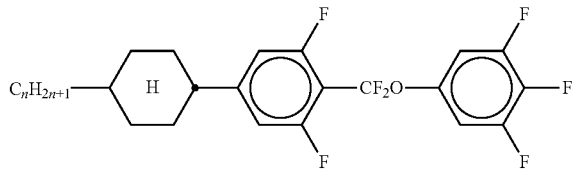
CUQU-n-F
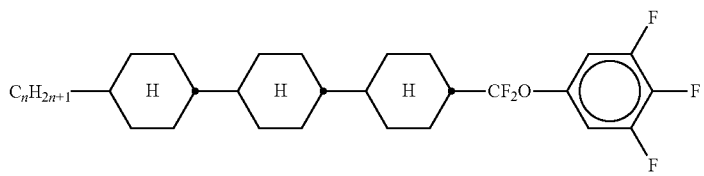
CCCQU-n-F
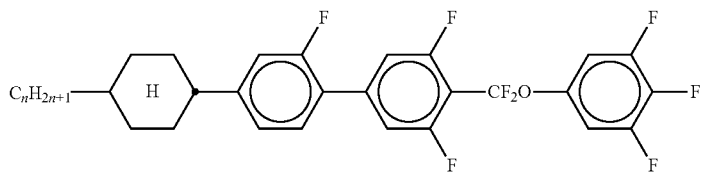
CGUQU-n-F
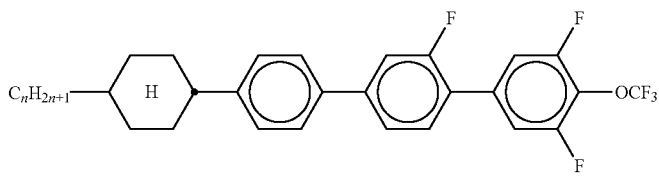
CPGU-n-OT
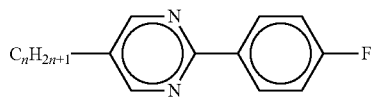
PYP-nF
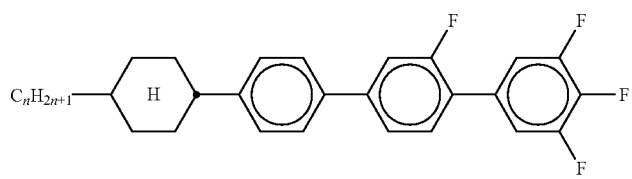
CPGU-n-F
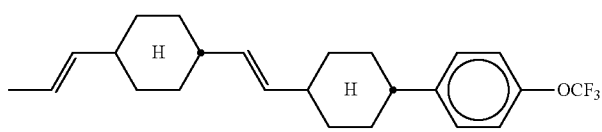
CVCP-1V-OT TABLE B-continued
In the following formulae, n and m in each case, independently of one another, denote 0, 1, 2, 3, 4, 5, 6, 7, 8, 9, 10, 11 or 12, in particular 2, 3, 5, furthermore 0, 4, 6, preferably not 0.
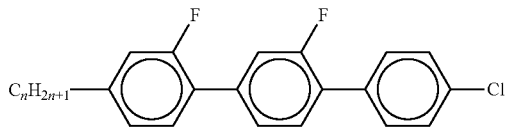
GGP-n-Cl
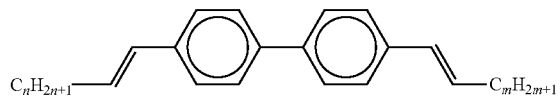
PP-nV-Vm
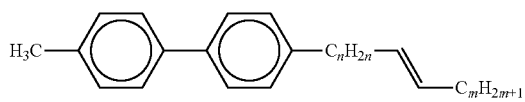
PP-1-nVm
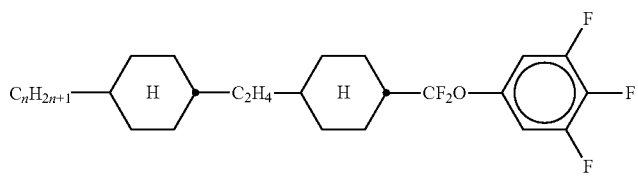
CWCQU-n-F
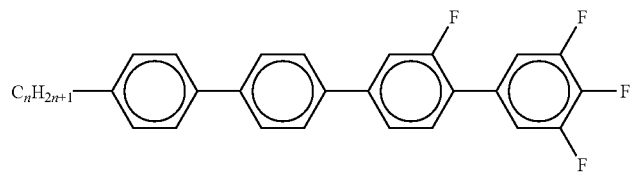
PPGU-n-F
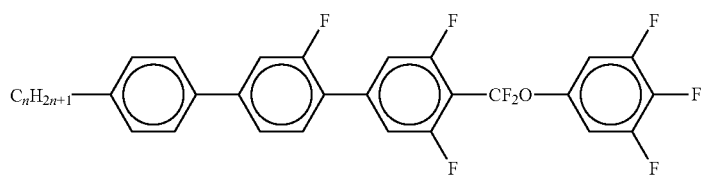
PGUQU-n-F
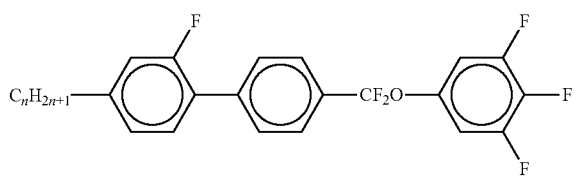
GPQU-n-F
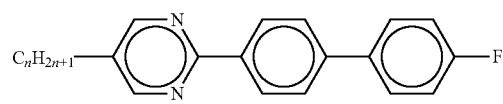
MPP-n-F TABLE B-continued
In the following formulae, n and m in each case, independently of one another, denote 0, 1, 2, 3, 4, 5, 6, 7, 8, 9, 10, 11 or 12, in particular 2, 3, 5, furthermore 0, 4, 6, preferably not 0.
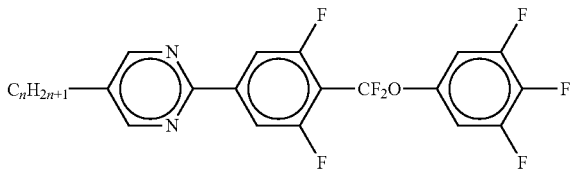
MUQU-n-F
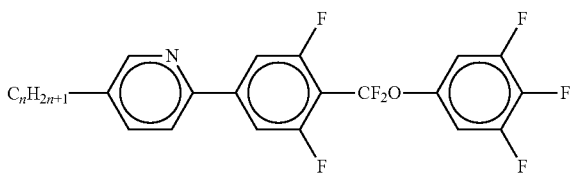
NUQU-n-F
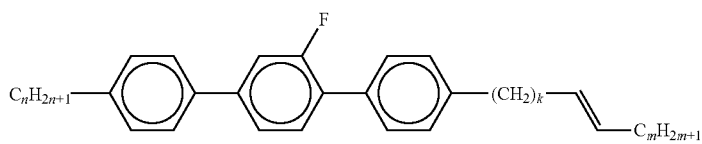
PGP-n-kVm
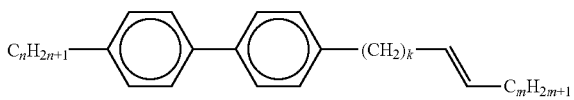
PP-n-kVm
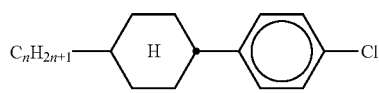
PCH-nCl
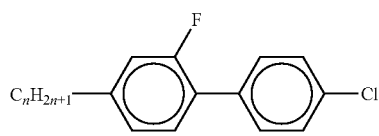
GP-n-Cl
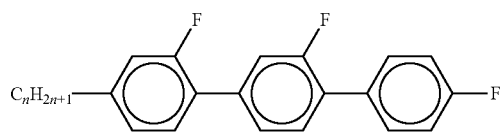
GGP-n-F
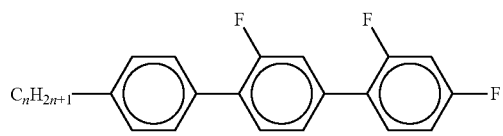
PGIGI-n-F TABLE B-continued
In the following formulae, n and m in each case, independently of one another, denote 0, 1, 2, 3, 4, 5, 6, 7, 8, 9, 10, 11 or 12, in particular 2, 3, 5, furthermore 0, 4, 6, preferably not 0.
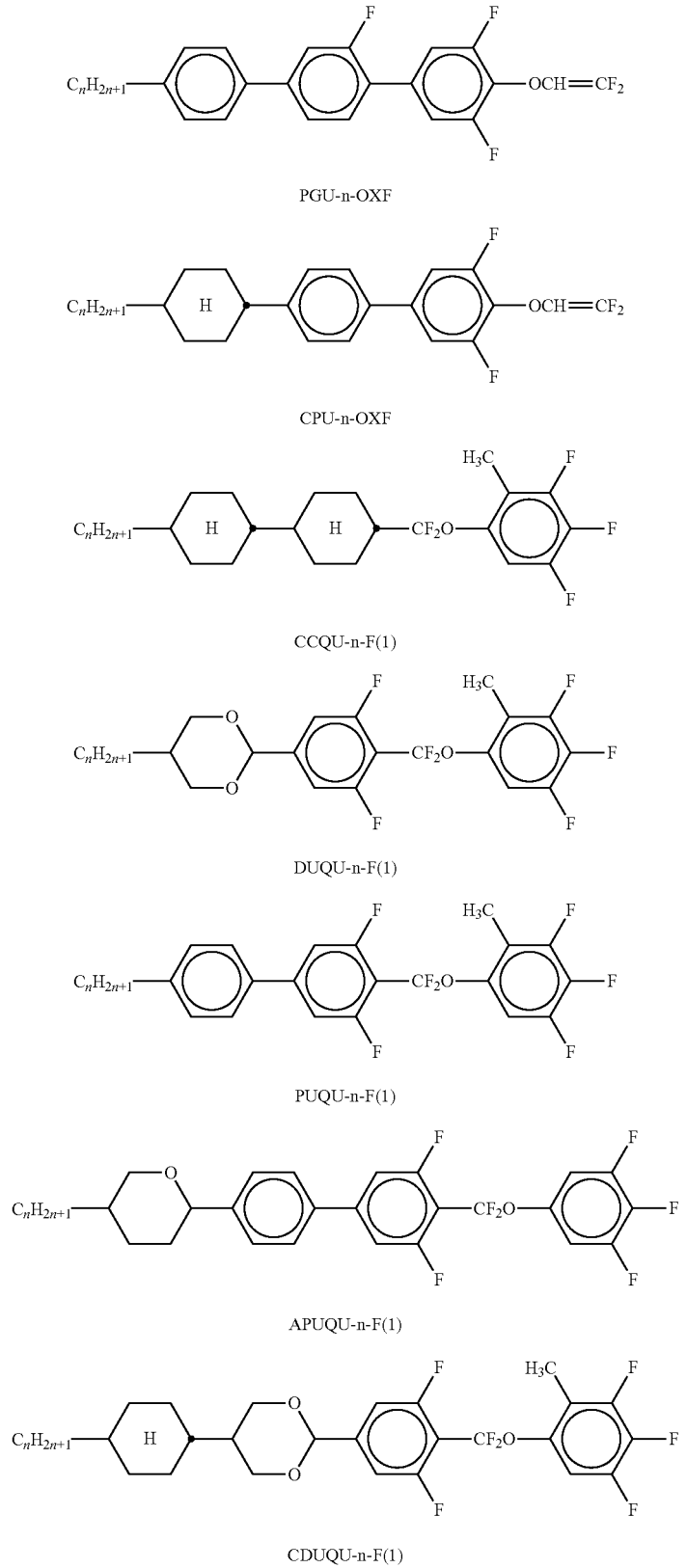
PGU-n-OXF
CPU-n-OXF
CCQU-n-F(1)
DUQU-n-F(1)
PUQU-n-F(1)
APUQU-n-F(1)
CDUQU-n-F(1)

TABLE B-continued

In the following formulae, n and m in each case, independently of one another, denote 0, 1, 2, 3, 4, 5, 6, 7, 8, 9, 10, 11 or 12, in particular 2, 3, 5, furthermore 0, 4, 6, preferably not 0.

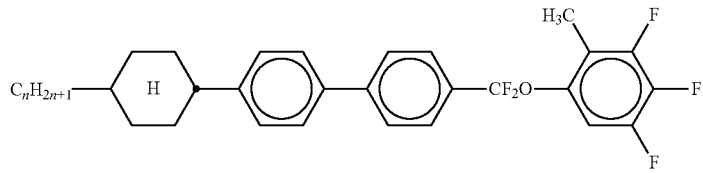

CPPQU-n-F(l)

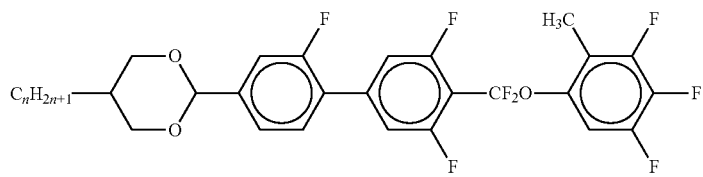

DGUQU-n-F(l)

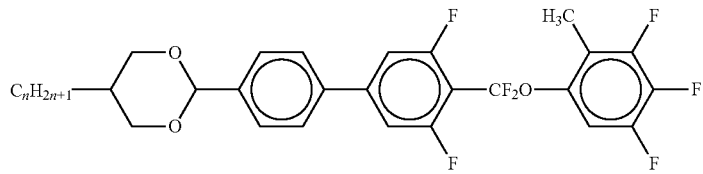

DPUQU-n-F(l)

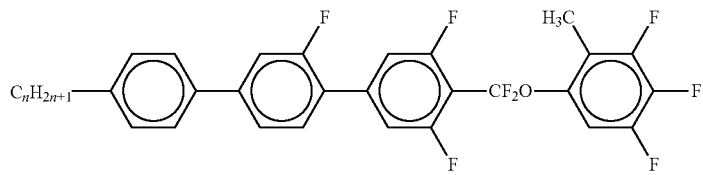

PGUQU-n-F(l)

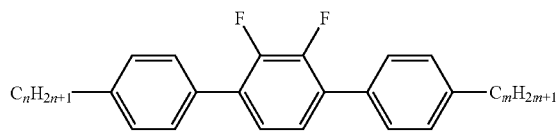

PYP-n-m

Particular preference is given to liquid-crystalline mixtures which, besides the compounds of the formulae 1 and 2 and (3 to 5) and 6 and/or 7, comprise at least one, two, three, four or more compounds from Table B.

TABLE C

Table C indicates possible dopants which are generally added to the mixtures according to the invention. The mixtures preferably comprise 0 to 10% by weight, in particular 0.01 to 5% by weight and particularly preferably 0.01 to 3% by weight of dopants.

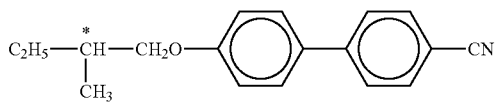

C 15

TABLE C-continued
Table C indicates possible dopants which are generally added to the mixtures according to the invention. The mixtures preferably comprise 0 to 10% by weight, in particular 0.01 to 5% by weight and particularly preferably 0.01 to 3% by weight of dopants.
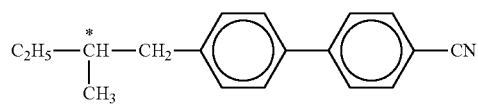
CB 15
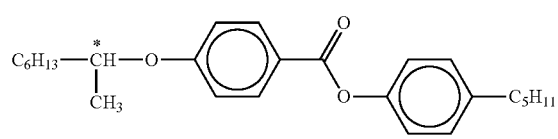
CM 21
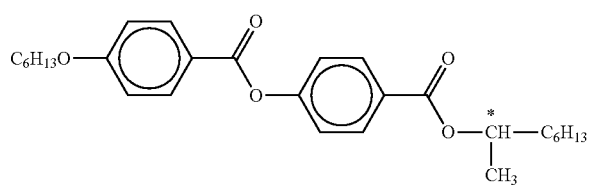
R/S-811
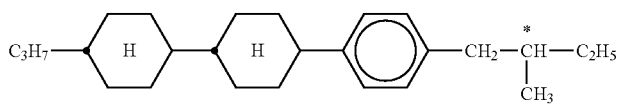
CM 44
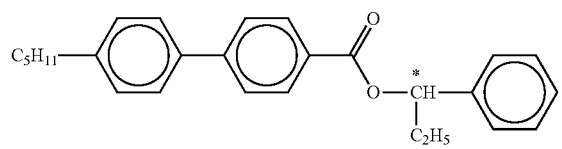
CM 45
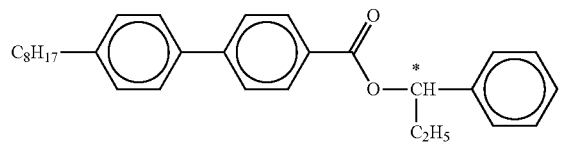
CM 47
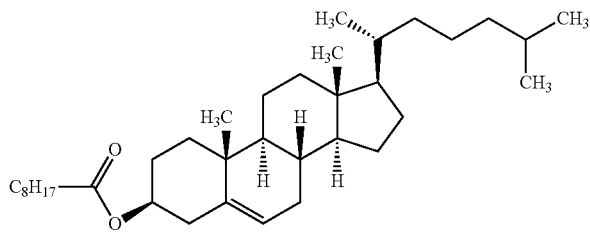
CN

TABLE C-continued

Table C indicates possible dopants which are generally added to the mixtures according to the invention. The mixtures preferably comprise 0 to 10% by weight, in particular 0.01 to 5% by weight and particularly preferably 0.01 to 3% by weight of dopants.

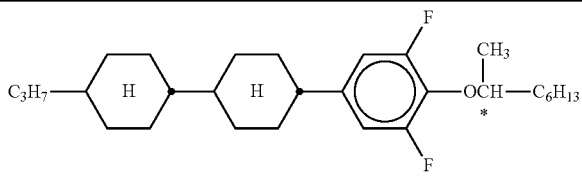

R/S-2011

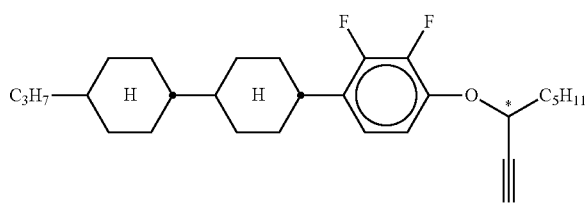

R/S-3011

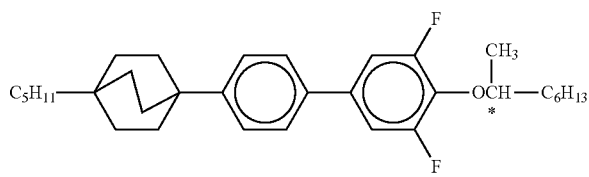

R/S-4011

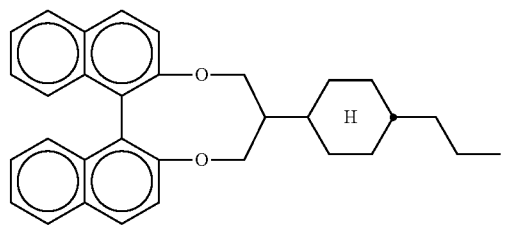

R/S-5011

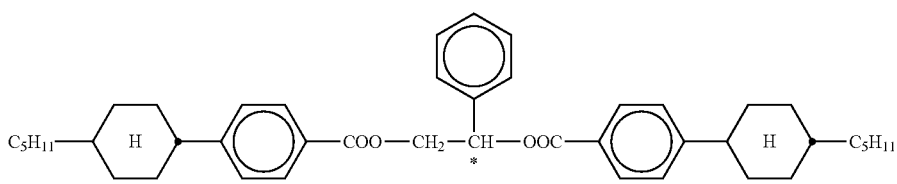

R/S-1011

TABLE D

Stabilisers which can be added, for example, to the mixtures according to the invention in amounts of 0 to 10% by weight are indicated below.

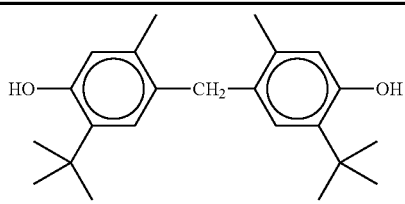

TABLE D-continued
Stabilisers which can be added, for example, to the mixtures according to the invention in amounts of 0 to 10% by weight are indicated below.
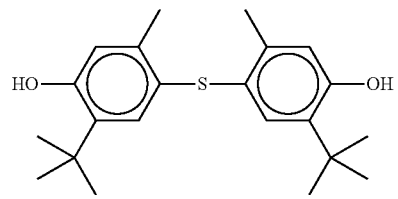
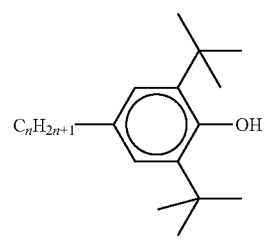
n = 1, 2, 3, 4, 5, 6 or 7
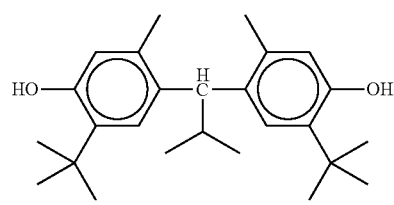
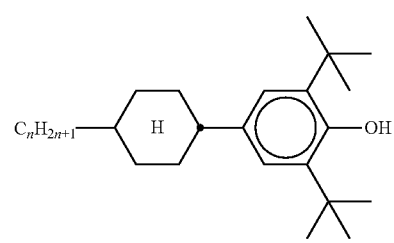
n = 1, 2, 3, 4, 5, 6 or 7
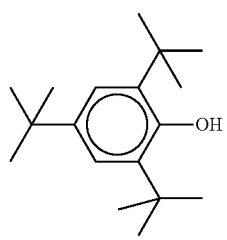
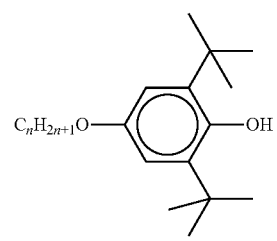
n = 1, 2, 3, 4, 5, 6 or 7

TABLE D-continued
Stabilisers which can be added, for example, to the mixtures according to the invention in amounts of 0 to 10% by weight are indicated below.
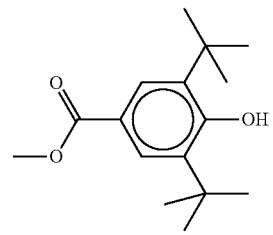
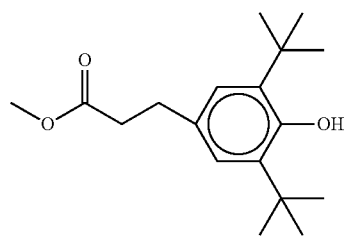
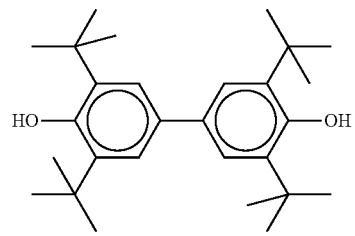
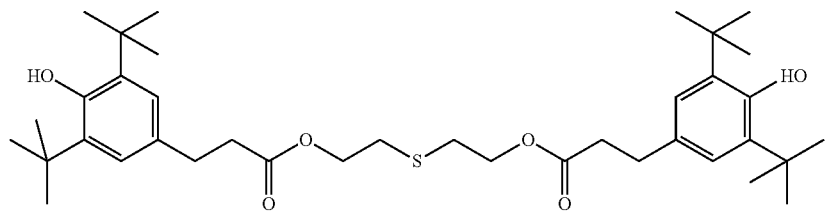 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
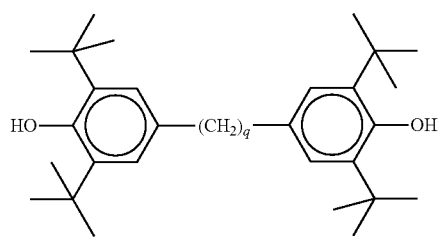
q = 1, 2, 3, 4, 5, 6 or 7
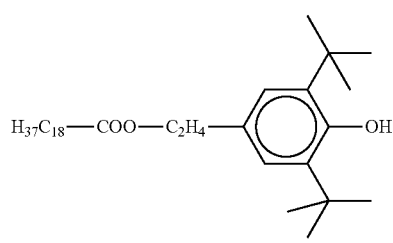

TABLE D-continued
Stabilisers which can be added, for example, to the mixtures according to the invention in amounts of 0 to 10% by weight are indicated below.
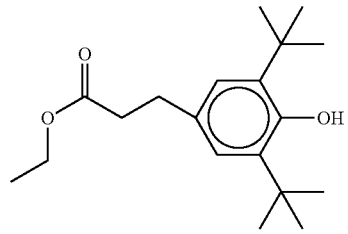
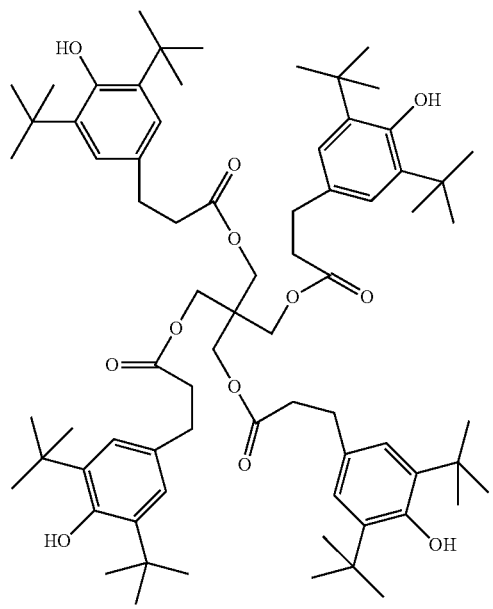 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
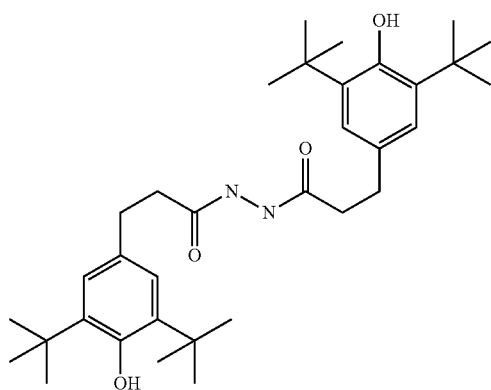 [SMILES: CC(C)(C)c1cc(CCC(=O)NNC(=O)CCc2cc(C(C)(C)C)c(O)c(C(C)(C)C)c2)cc(C(C)(C)C)c1O]
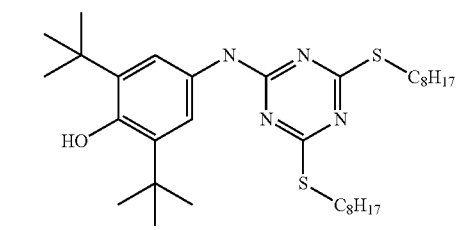

TABLE D-continued
Stabilisers which can be added, for example, to the mixtures according to the invention in amounts of 0 to 10% by weight are indicated below.
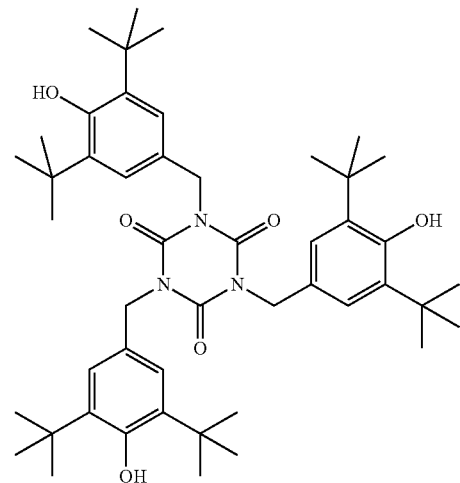 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
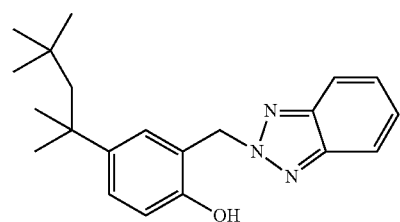 [SMILES: CC(C)(C)CC(C)(C)c1ccc(O)c(Cn2nc3ccccc3n2)c1]
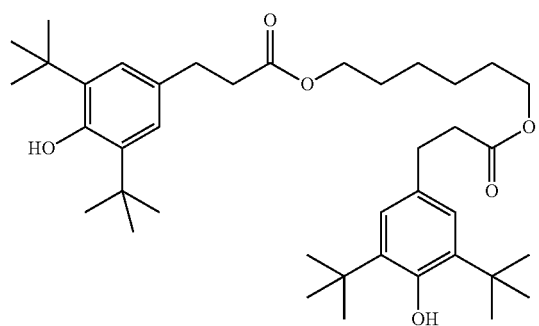 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]

TABLE D-continued
Stabilisers which can be added, for example, to the mixtures according to the invention in amounts of 0 to 10% by weight are indicated below.
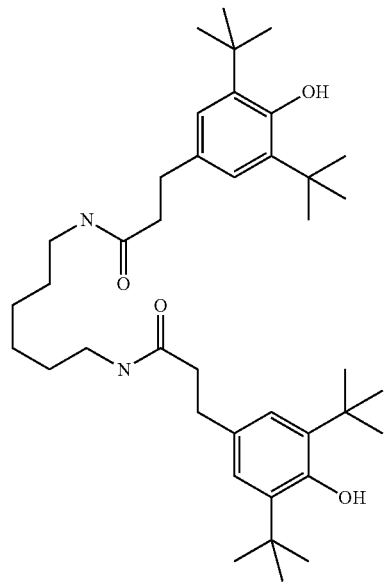 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
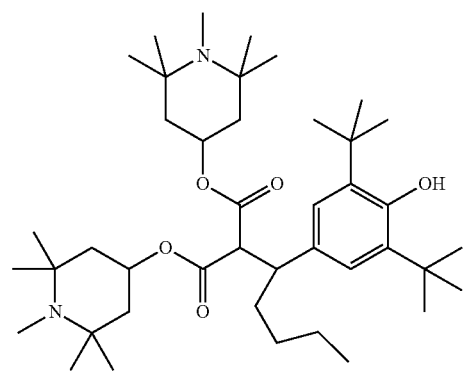 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
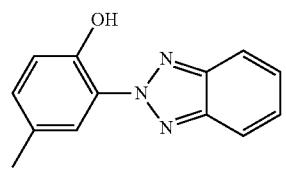 [SMILES: Cc1ccc(O)c(-n2nc3ccccc3n2)c1]
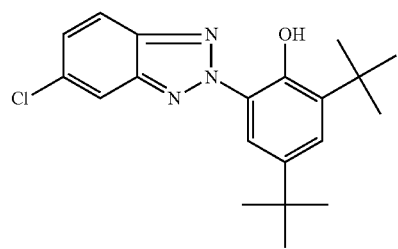 [SMILES: CC(C)(C)c1cc(-n2nc3ccc(Cl)cc3n2)c(O)c(C(C)(C)C)c1]

TABLE D-continued
Stabilisers which can be added, for example, to the mixtures according to the invention in amounts of 0 to 10% by weight are indicated below.
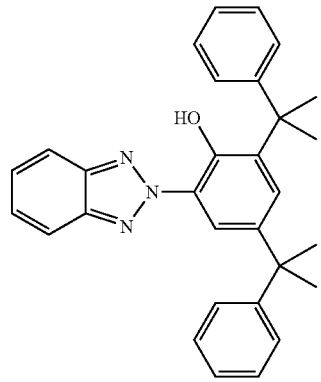 [SMILES: CC(C)(c1ccccc1)c1cc(-n2nc3ccccc3n2)c(O)c(C(C)(C)c2ccccc2)c1]
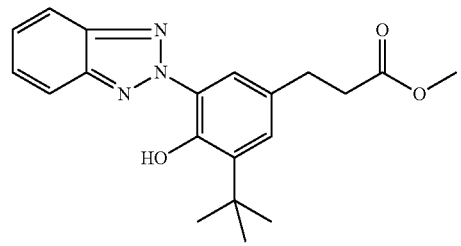 [SMILES: COC(=O)CCc1cc(-n2nc3ccccc3n2)c(O)c(C(C)(C)C)c1]
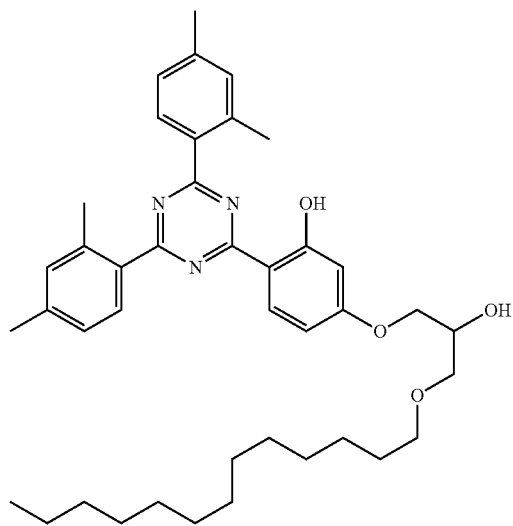 [SMILES: CCCCCCCCCCCCCOCC(O)COc1ccc(-c2nc(-c3ccc(C)cc3C)nc(-c3ccc(C)cc3C)n2)c(O)c1]
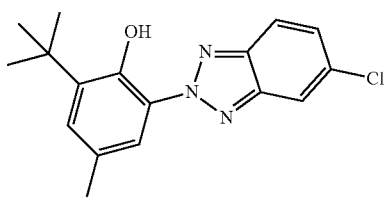 [SMILES: Cc1cc(-n2nc3ccc(Cl)cc3n2)c(O)c(C(C)(C)C)c1]

TABLE D-continued
Stabilisers which can be added, for example, to the mixtures according to the invention in amounts of 0 to 10% by weight are indicated below.
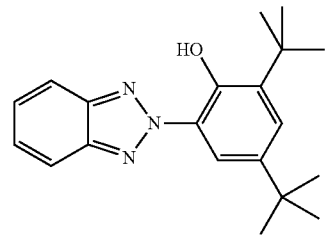 [SMILES: CC(C)(C)c1cc(-n2nc3ccccc3n2)c(O)c(C(C)(C)C)c1]
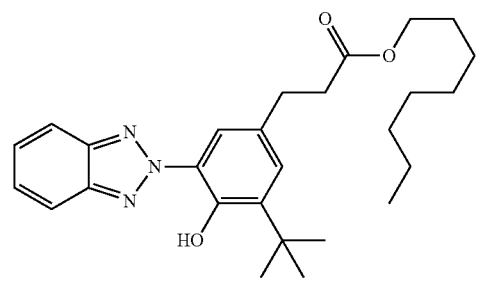 [SMILES: CCCCCCCCOC(=O)CCc1cc(-n2nc3ccccc3n2)c(O)c(C(C)(C)C)c1]
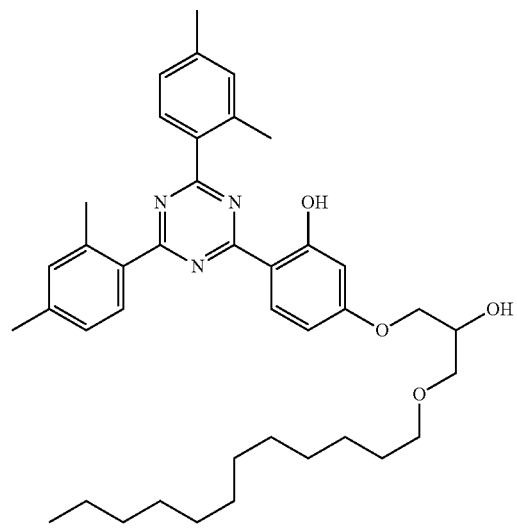 [SMILES: CCCCCCCCCCCCOCC(O)COc1ccc(-c2nc(-c3ccc(C)cc3C)nc(-c3ccc(C)cc3C)n2)c(O)c1]
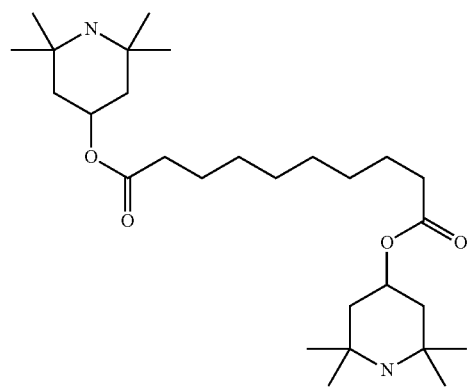

TABLE D-continued
Stabilisers which can be added, for example, to the mixtures according to the invention in amounts of 0 to 10% by weight are indicated below.
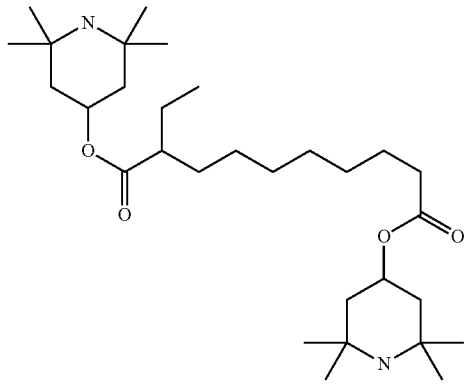
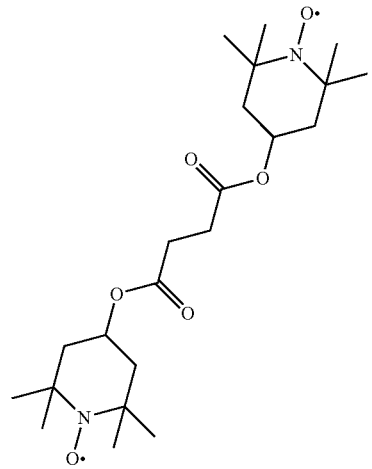
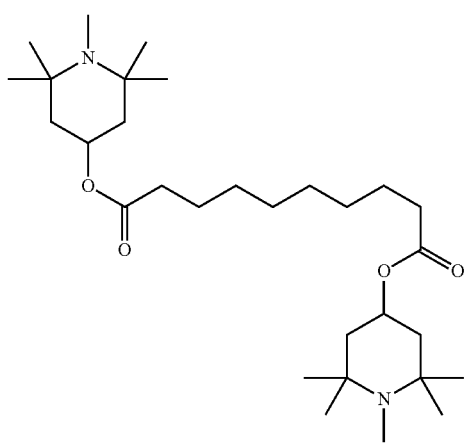

TABLE D-continued
Stabilisers which can be added, for example, to the mixtures according to the invention in amounts of 0 to 10% by weight are indicated below.
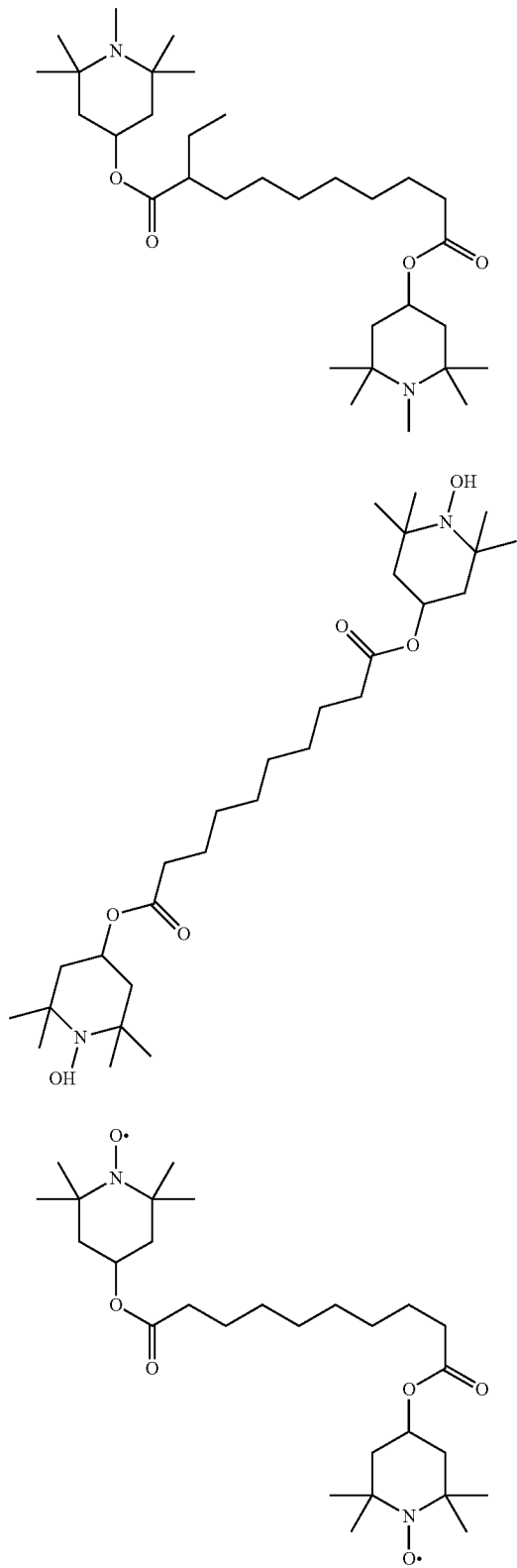

TABLE D-continued
Stabilisers which can be added, for example, to the mixtures according to the invention in amounts of 0 to 10% by weight are indicated below.
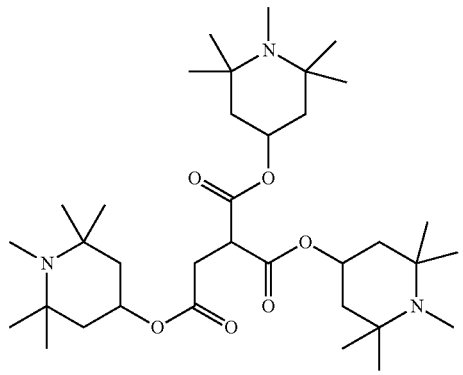
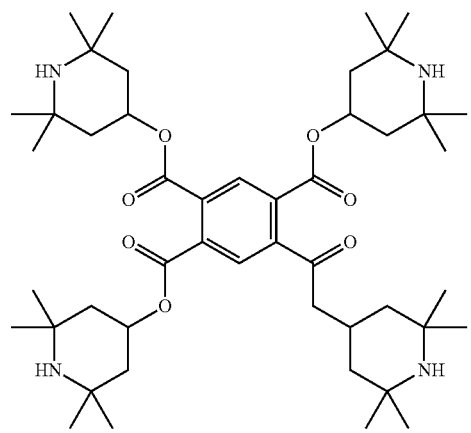
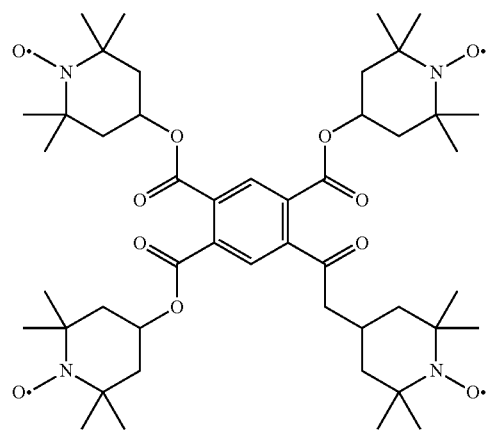

TABLE D-continued
Stabilisers which can be added, for example, to the mixtures according to the invention in amounts of 0 to 10% by weight are indicated below.
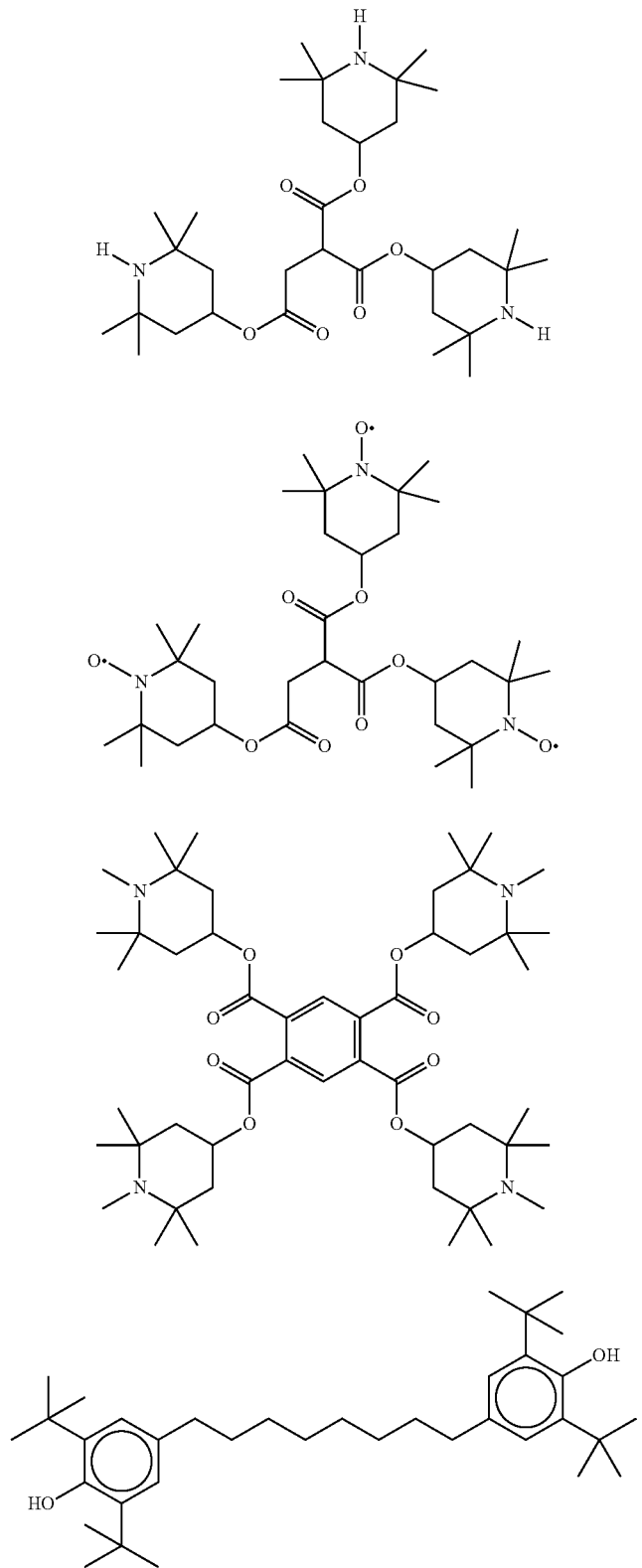

TABLE D-continued
Stabilisers which can be added, for example, to the mixtures according to the invention in amounts of 0 to 10% by weight are indicated below.
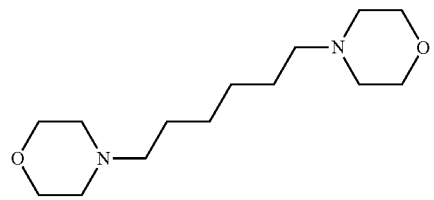 [SMILES: C(CCCN1CCOCC1)CCN1CCOCC1]
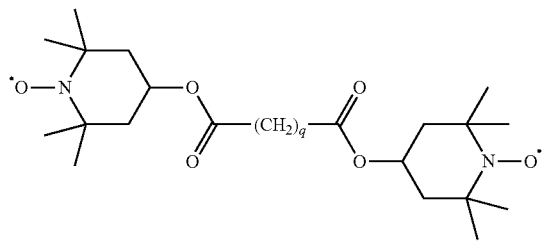
q = 1, 2, 3, 4, 5, 6, 7, 8, 9 or 10
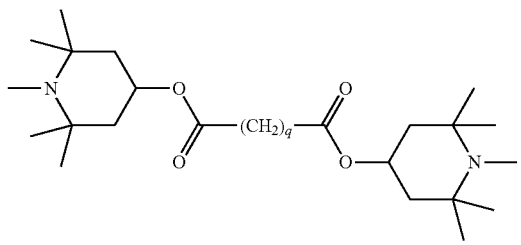
q = 1, 2, 3, 4, 5, 6, 7, 8, 9 or 10
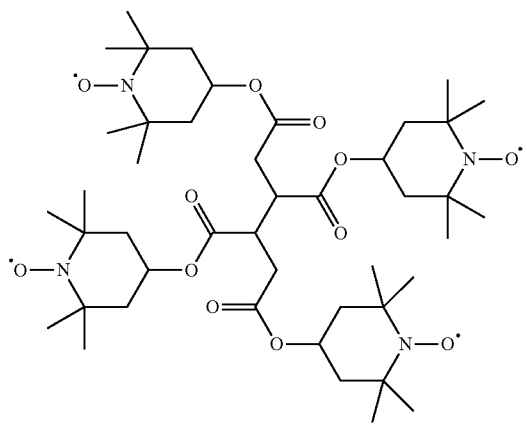
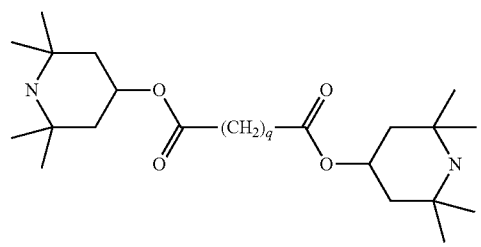
q = 1, 2, 3, 4, 5, 6, 7, 8, 9 or 10

TABLE E

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

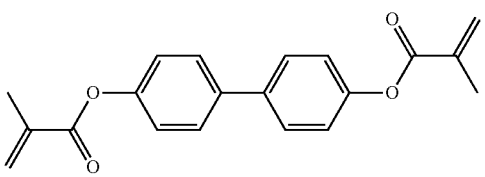

RM-1

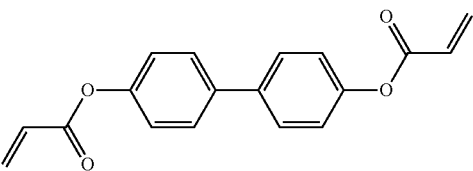 [SMILES: C=CC(=O)Oc1ccc(-c2ccc(OC(=O)C=C)cc2)cc1]

RM-2

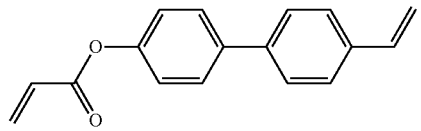

RM-3

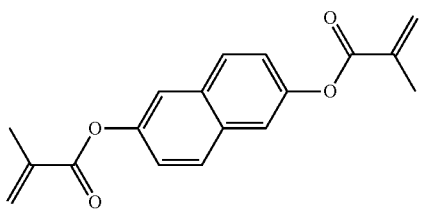 [SMILES: C=C(C)C(=O)Oc1ccc2cc(OC(=O)C(=C)C)ccc2c1]

RM-4

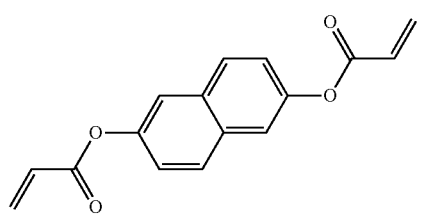 [SMILES: C=CC(=O)Oc1ccc2cc(OC(=O)C=C)ccc2c1]

RM-5

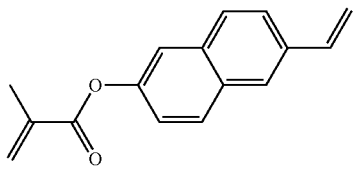 [SMILES: C=Cc1ccc2cc(OC(=O)C(=C)C)ccc2c1]

RM-6

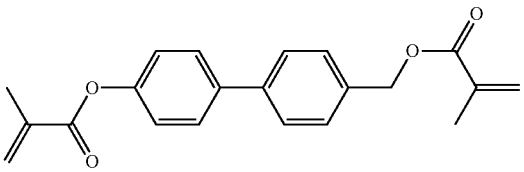 [SMILES: C=C(C)C(=O)OCc1ccc(-c2ccc(OC(=O)C(=C)C)cc2)cc1]

RM-7

TABLE E-continued

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

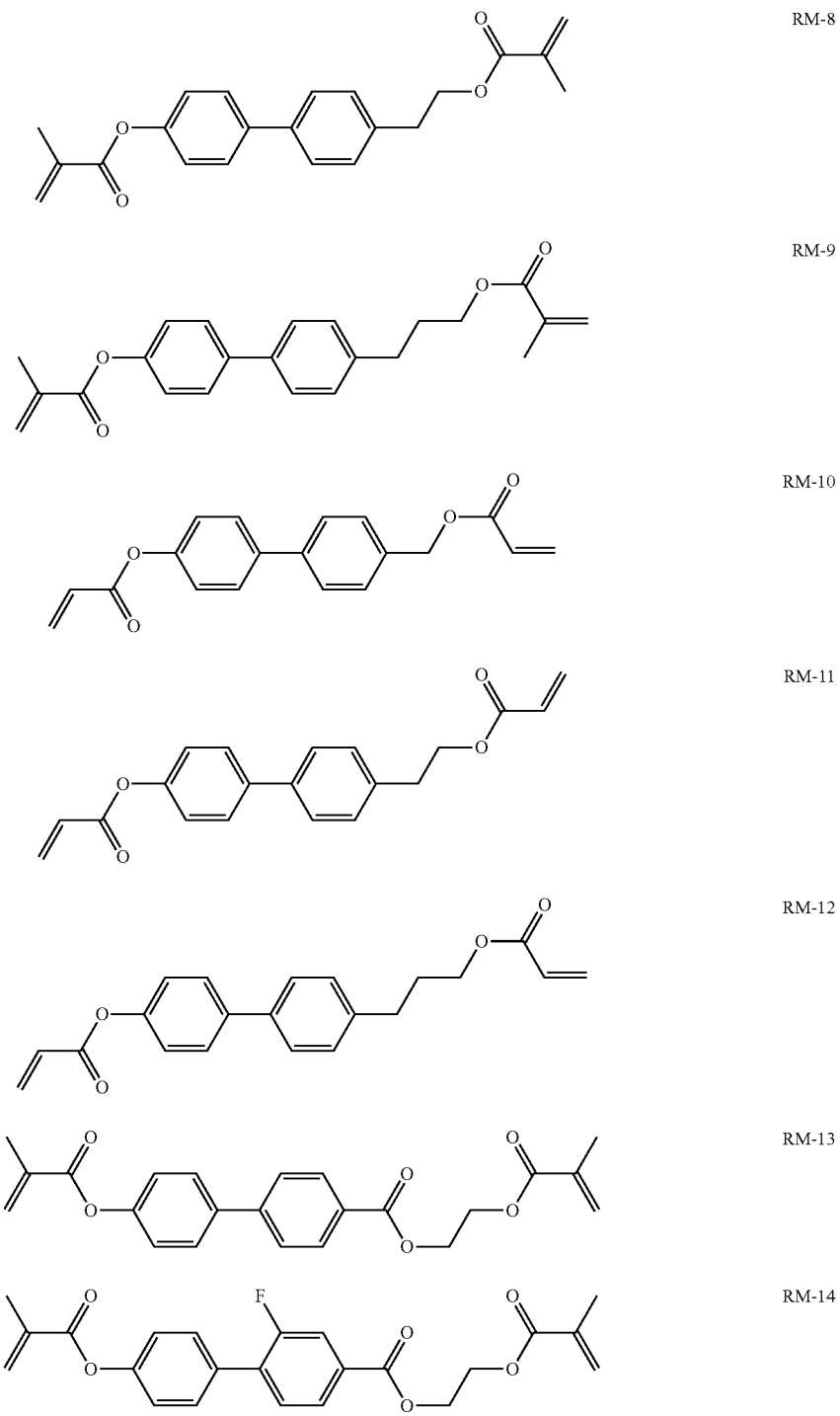

TABLE E-continued

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

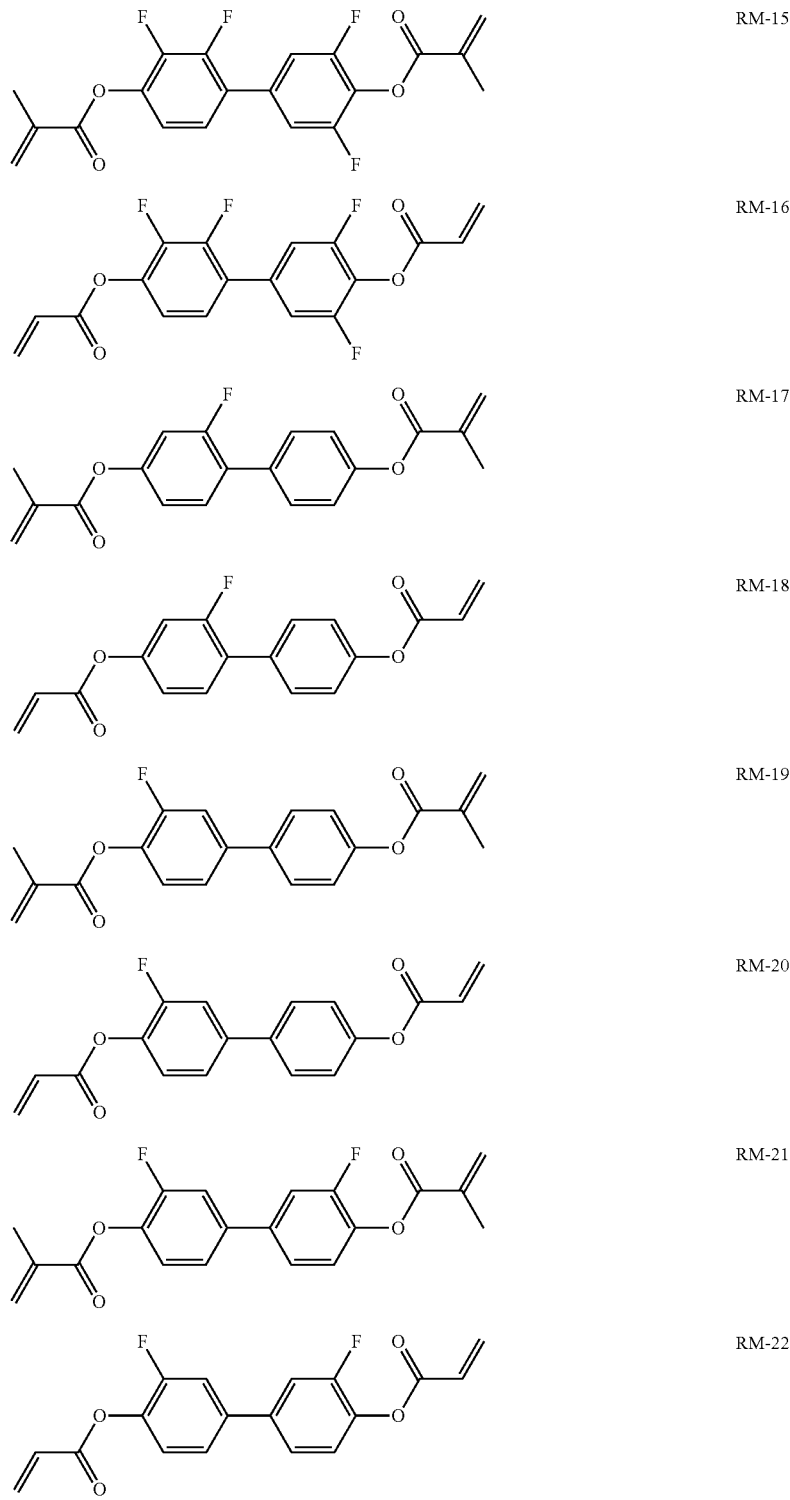

TABLE E-continued

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

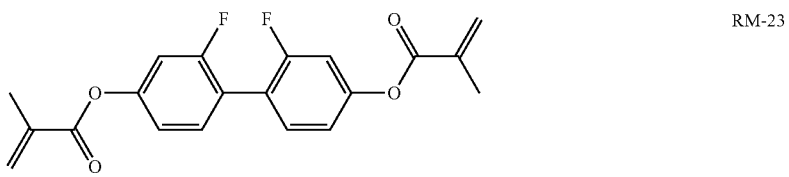

RM-23

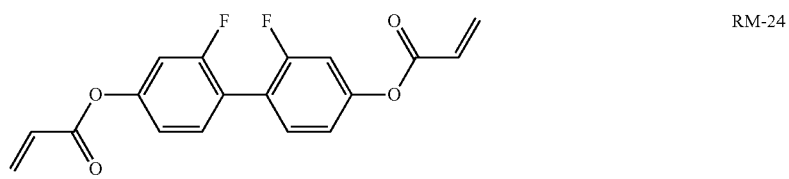

RM-24

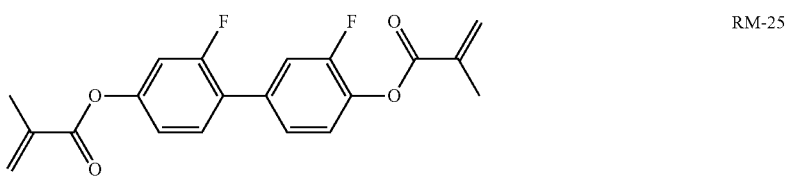

RM-25

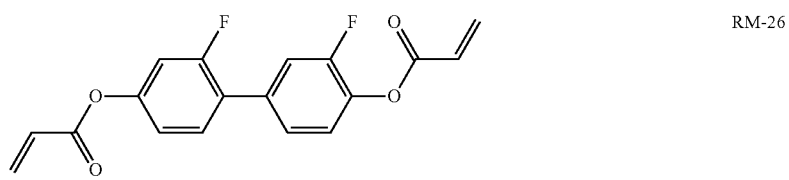

RM-26

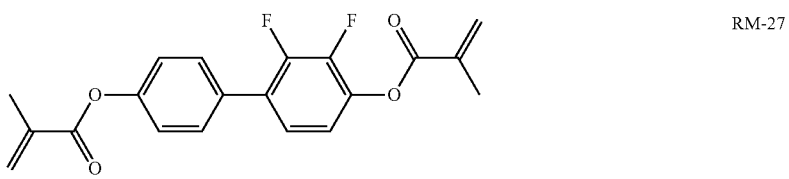

RM-27

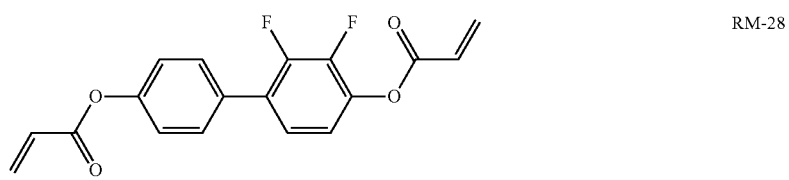

RM-28

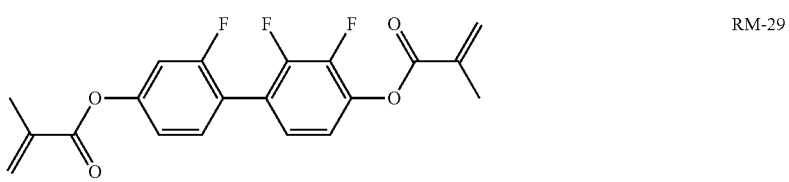

RM-29

TABLE E-continued

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

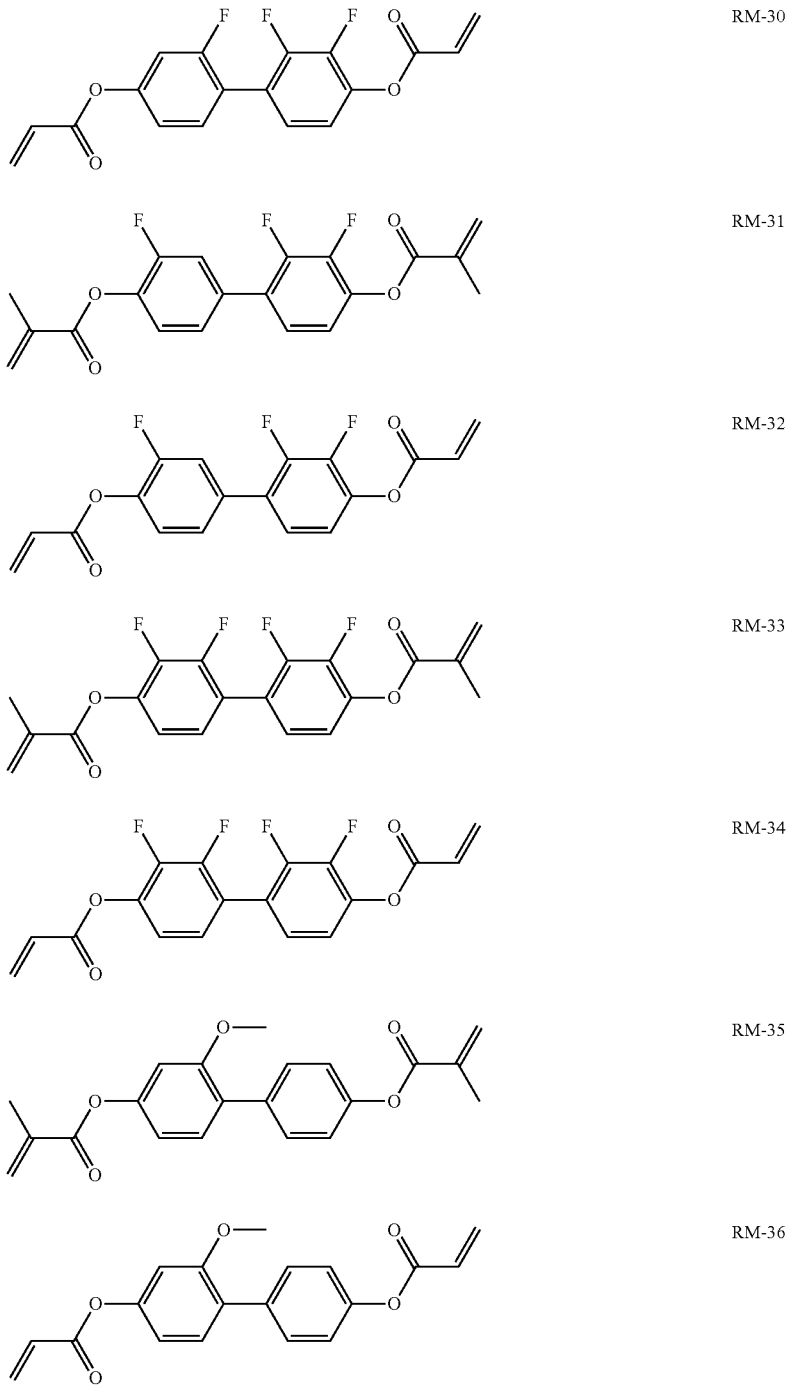

RM-30

RM-31

RM-32

RM-33

RM-34

RM-35

RM-36

TABLE E-continued

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

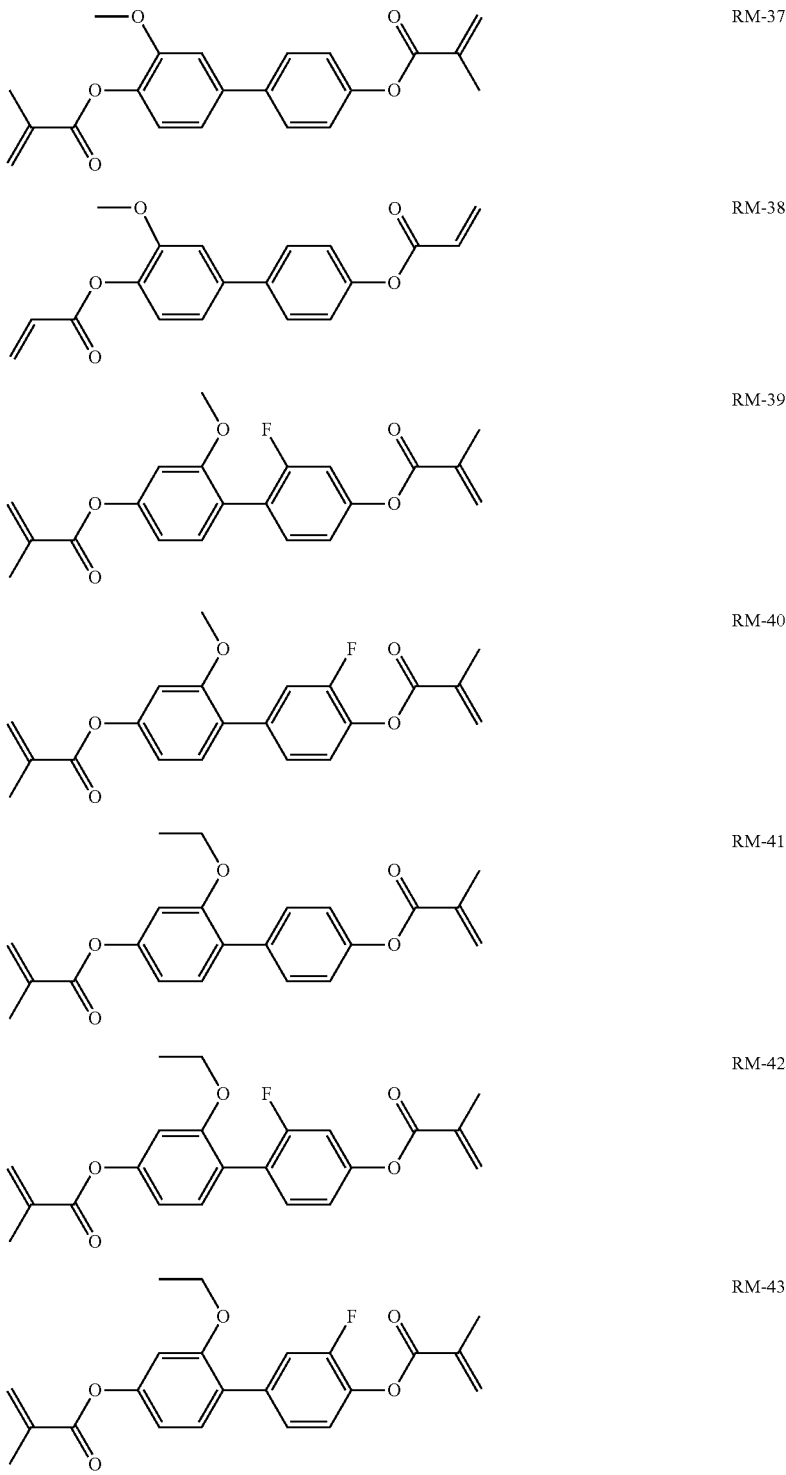

TABLE E-continued

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

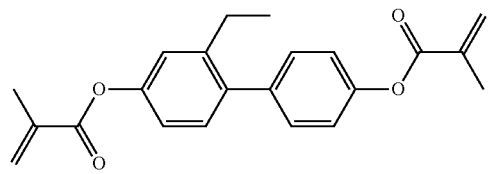 [SMILES: C=C(C)C(=O)Oc1ccc(-c2ccc(OC(=O)C(=C)C)cc2F)cc1]

RM-44

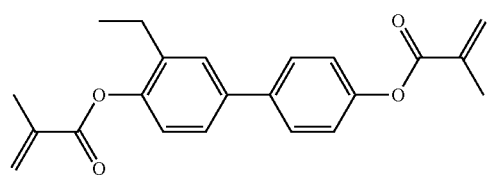 [SMILES: C=C(C)C(=O)Oc1ccc(-c2ccc(OC(=O)C(=C)C)c(OC)c2)cc1]

RM-45

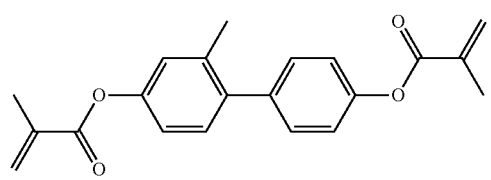

RM-46

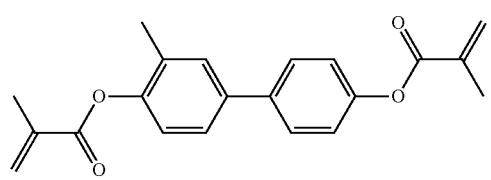 [SMILES: C=C(C)C(=O)Oc1ccc(-c2ccc(OC(=O)C(=C)C)c(C)c2)cc1]

RM-47

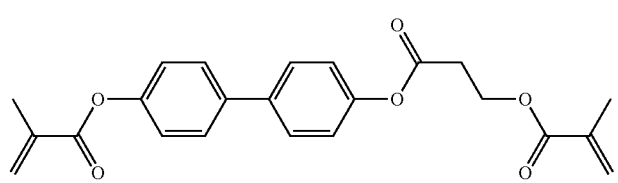 [SMILES: C=C(C)C(=O)OCCC(=O)Oc1ccc(-c2ccc(OC(=O)C(=C)C)cc2)cc1]

RM-48

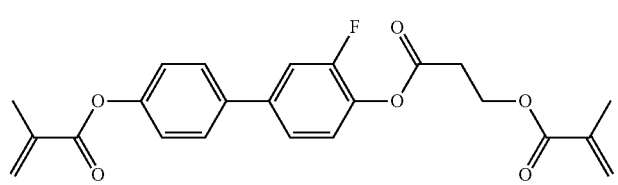

RM-49

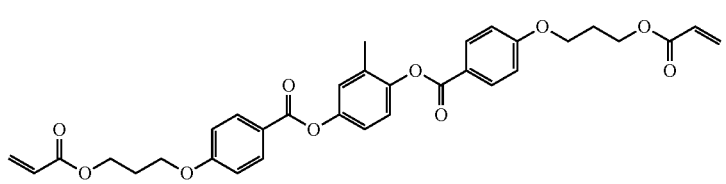 [SMILES: C=CC(=O)OCCCOc1ccc(C(=O)Oc2ccc(OC(=O)c3ccc(OCCCOC(=O)C=C)cc3)c(C)c2)cc1]

RM-50

TABLE E-continued

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

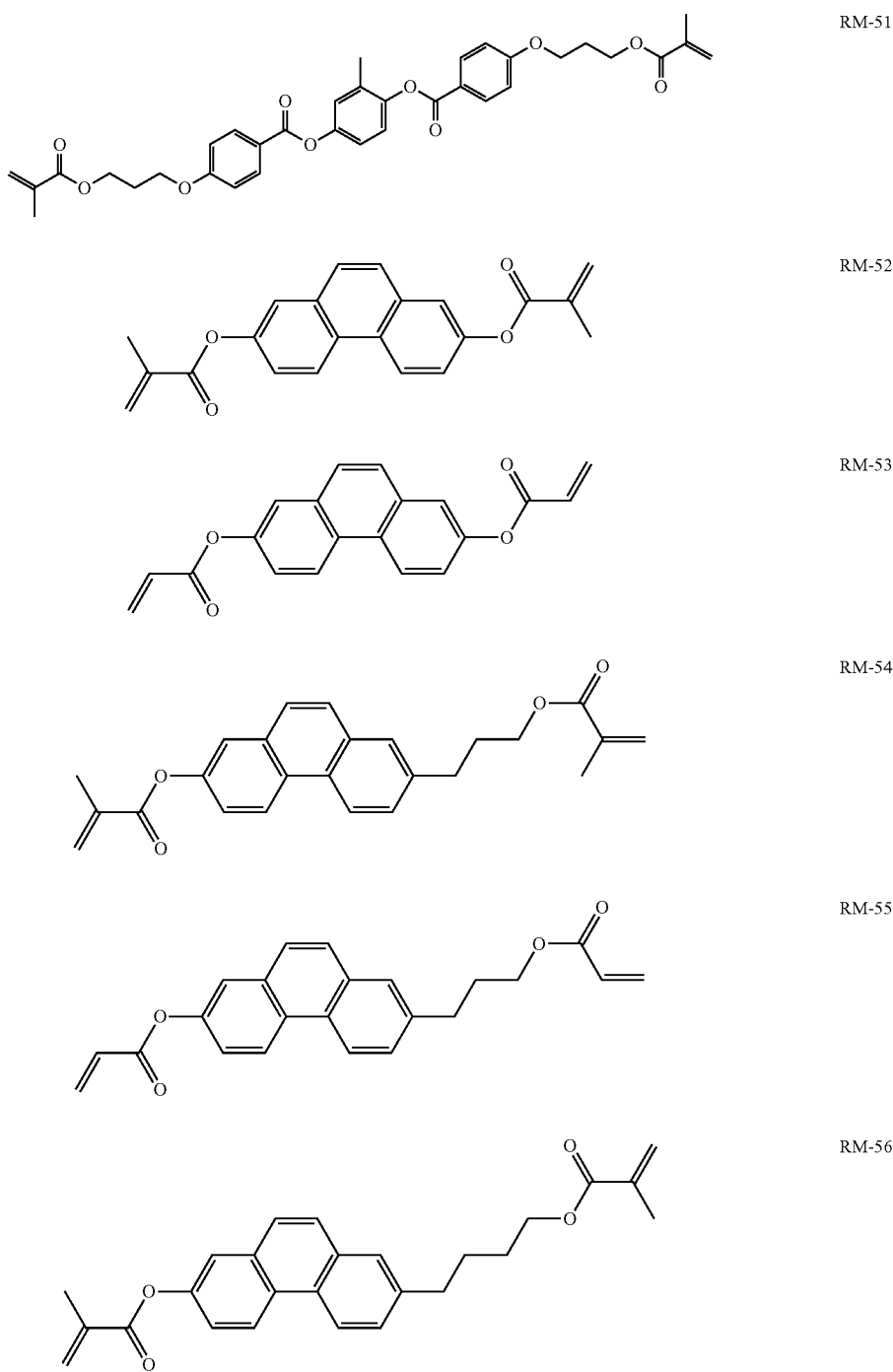

RM-51

RM-52

RM-53

RM-54

RM-55

RM-56

TABLE E-continued

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

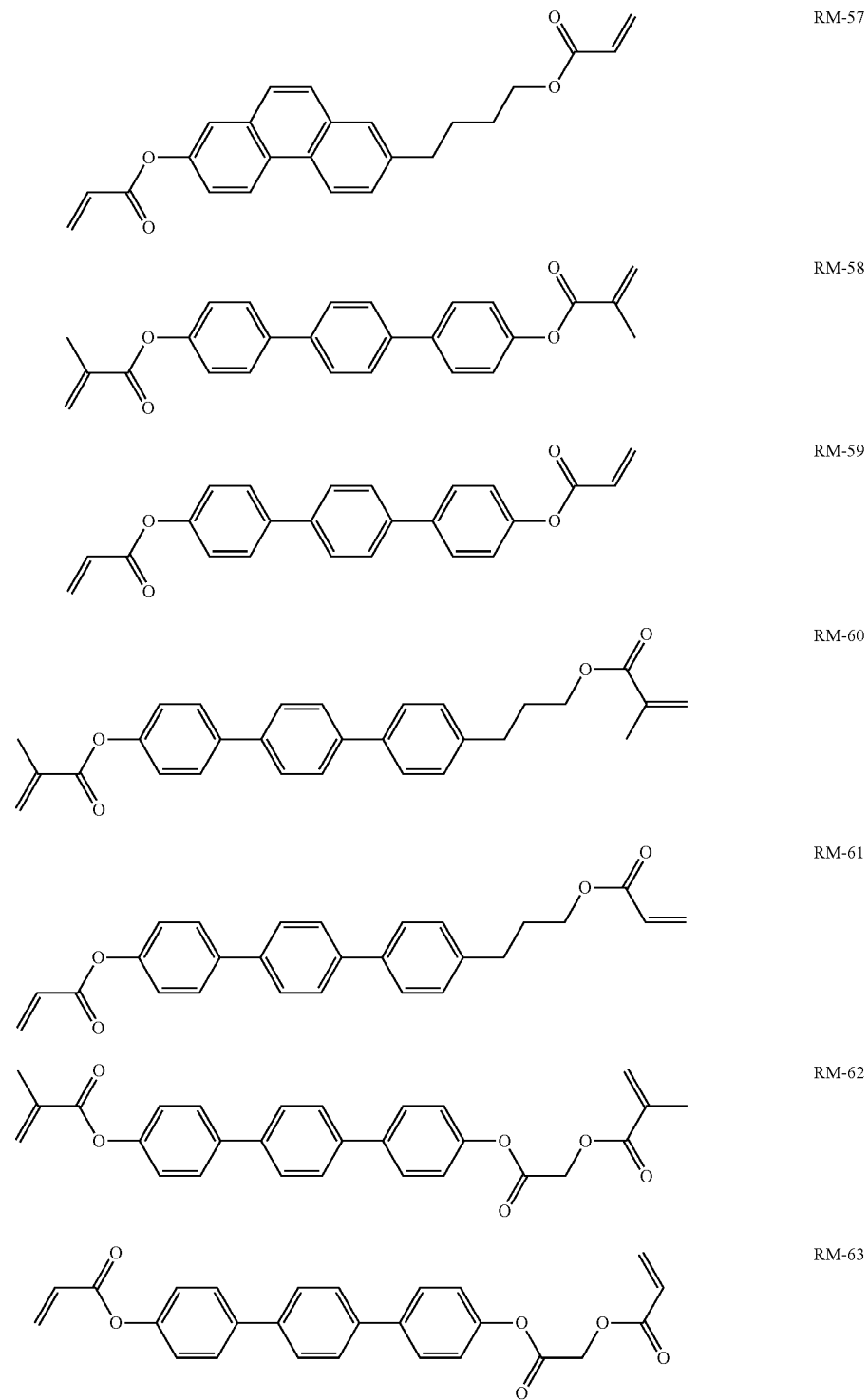

RM-57

RM-58

RM-59

RM-60

RM-61

RM-62

RM-63

TABLE E-continued

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

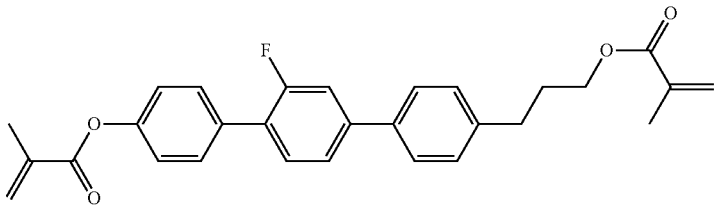 [SMILES: C=C(C)C(=O)OCCCc1ccc(-c2ccc(-c3ccc(OC(=O)C(=C)C)cc3)cc2)cc1]

RM-64

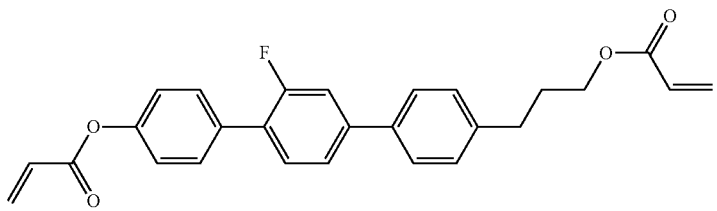 [SMILES: C=CC(=O)OCCCc1ccc(-c2ccc(-c3ccc(OC(=O)C=C)cc3)c(F)c2)cc1]

RM-65

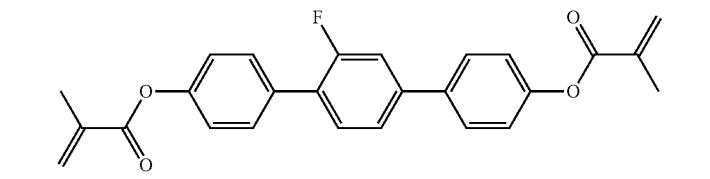 [SMILES: C=C(C)C(=O)Oc1ccc(-c2ccc(-c3ccc(OC(=O)C(=C)C)cc3)c(F)c2)cc1]

RM-66

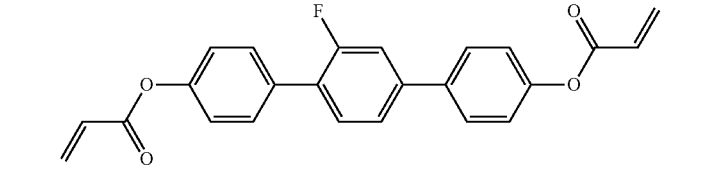 [SMILES: C=CC(=O)Oc1ccc(-c2ccc(-c3ccc(OC(=O)C=C)cc3)c(F)c2)cc1]

RM-67

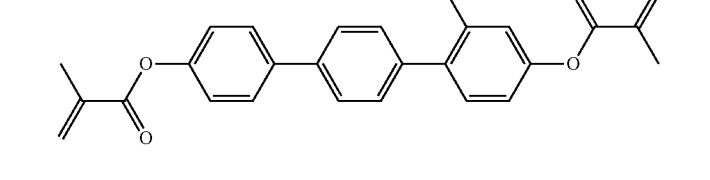

RM-68

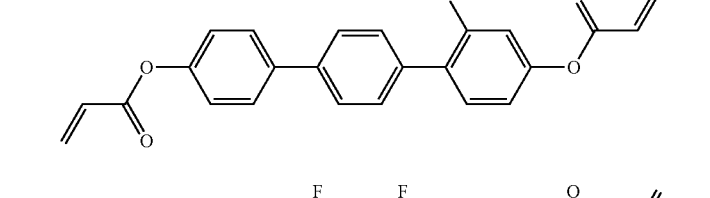

RM-69

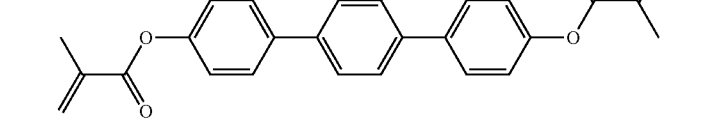

RM-70

TABLE E-continued

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

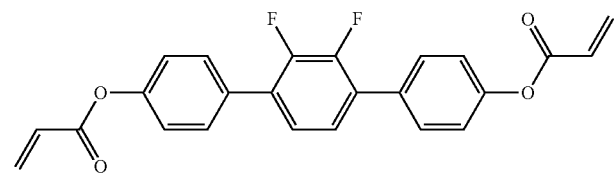 RM-71

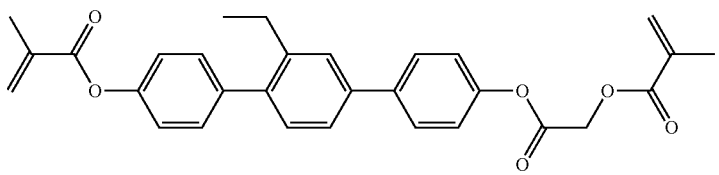 [SMILES: C=C(C)C(=O)OCC(=O)Oc1ccc(-c2ccc(-c3ccc(OC(=O)C(=C)C)cc3)c(CC)c2)cc1] RM-72

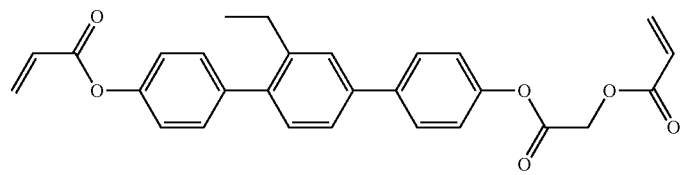 RM-73

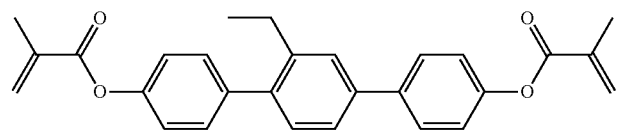 RM-74

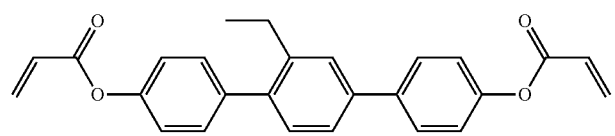 RM-75

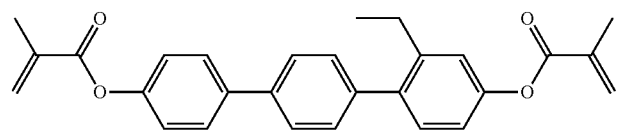 [SMILES: C=CC(=O)Oc1ccc(-c2ccc(-c3ccc(OC(=O)C=C)cc3CC)cc2)cc1] RM-76

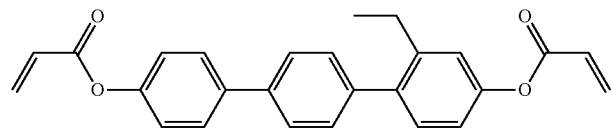 RM-77

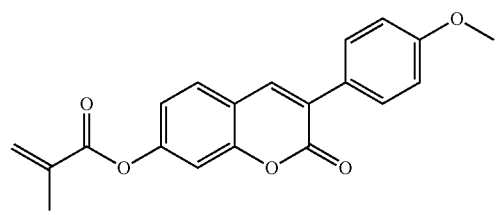 [SMILES: C=C(C)C(=O)Oc1ccc2cc(-c3ccc(OC)cc3)c(=O)oc2c1] RM-78

TABLE E-continued

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

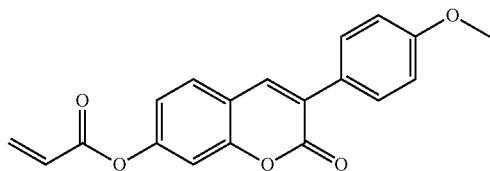 [SMILES: C=CC(=O)Oc1ccc2cc(-c3ccc(OC)cc3)c(=O)oc2c1]

RM-79

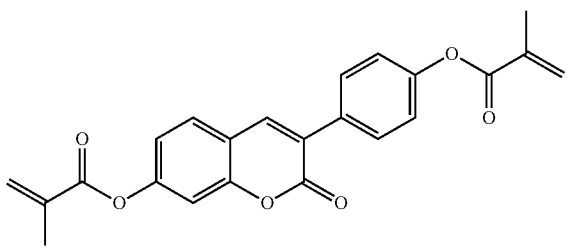 [SMILES: C=C(C)C(=O)Oc1ccc(-c2cc3ccc(OC(=O)C(=C)C)cc3oc2=O)cc1]

RM-80

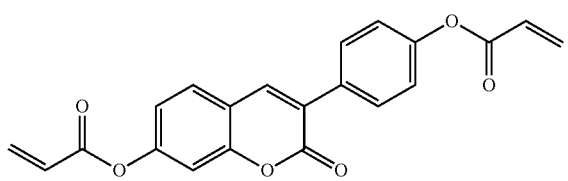 [SMILES: C=CC(=O)Oc1ccc(-c2cc3ccc(OC(=O)C=C)cc3oc2=O)cc1]

RM-81

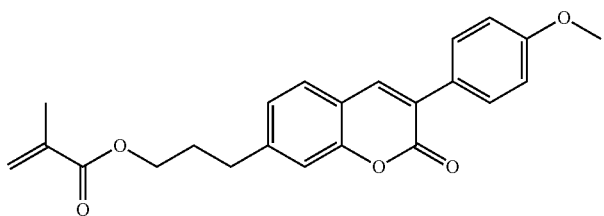 [SMILES: C=C(C)C(=O)OCCCc1ccc2cc(-c3ccc(OC)cc3)c(=O)oc2c1]

RM-82

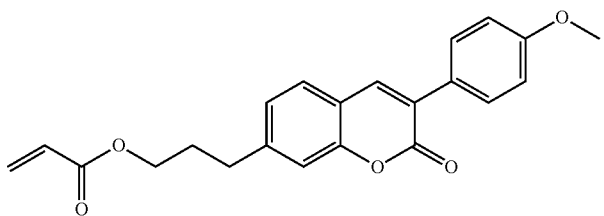 [SMILES: C=CC(=O)OCCCc1ccc2cc(-c3ccc(OC)cc3)c(=O)oc2c1]

RM-83

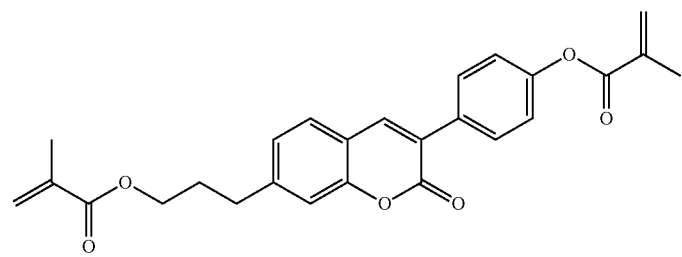 [SMILES: C=C(C)C(=O)OCCCc1ccc2cc(-c3ccc(OC(=O)C(=C)C)cc3)c(=O)oc2c1]

RM-84

TABLE E-continued

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

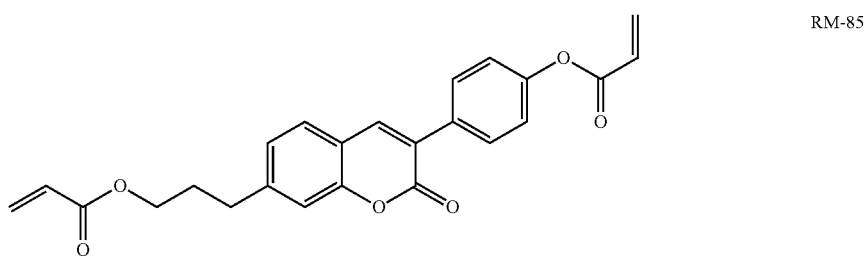

RM-85

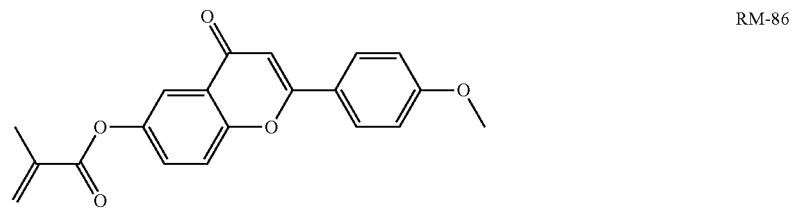

RM-86

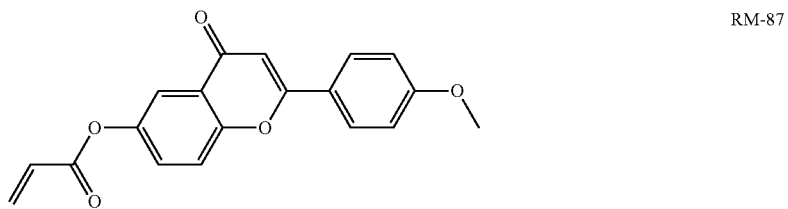

RM-87

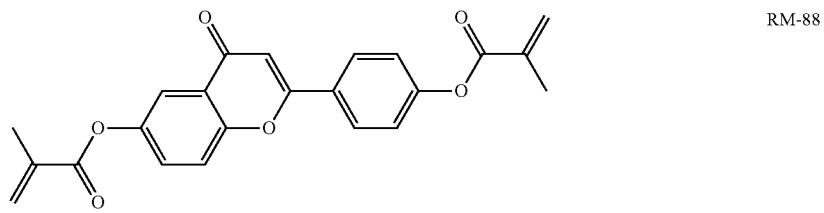

RM-88

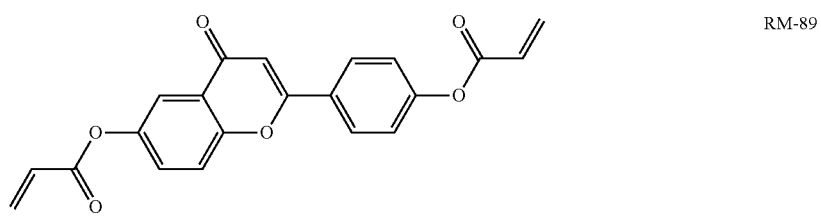

RM-89

TABLE E-continued

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

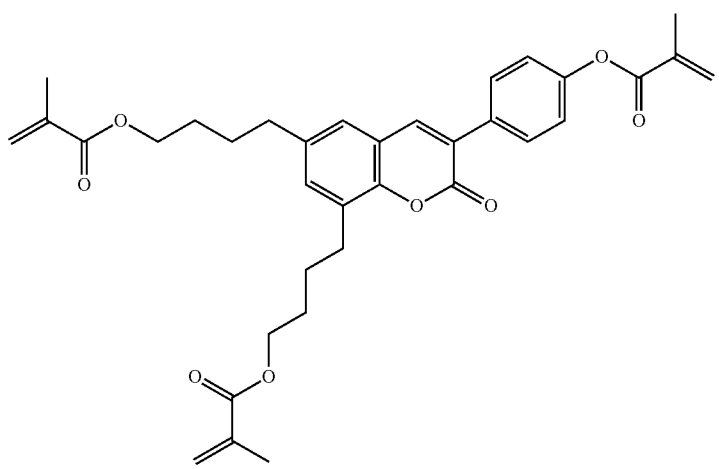 [SMILES: C=C(C)C(=O)OCCCCc1cc(CCCCOC(=O)C(=C)C)c2oc(=O)c(-c3ccc(OC(=O)C(=C)C)cc3)cc2c1]

RM-90

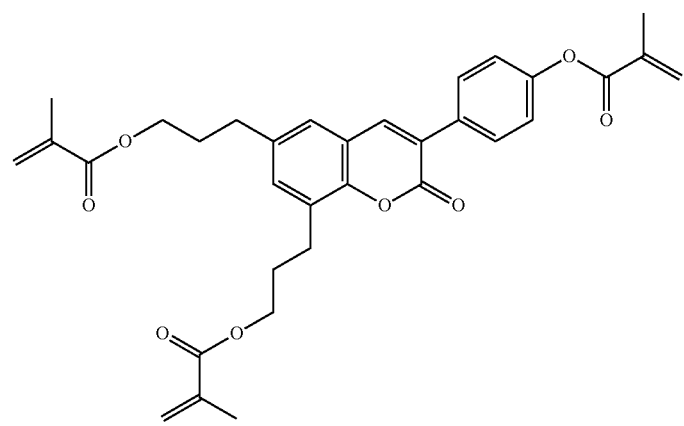 [SMILES: C=C(C)C(=O)OCCCc1cc(CCCOC(=O)C(=C)C)c2oc(=O)c(-c3ccc(OC(=O)C(=C)C)cc3)cc2c1]

RM-91

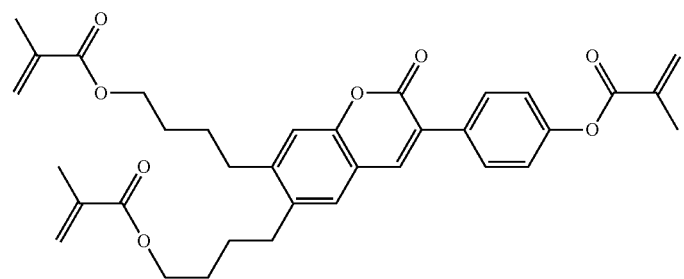 [SMILES: C=C(C)C(=O)OCCCCc1cc2cc(-c3ccc(OC(=O)C(=C)C)cc3)c(=O)oc2cc1CCCCOC(=O)C(=C)C]

RM-92

TABLE E-continued

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

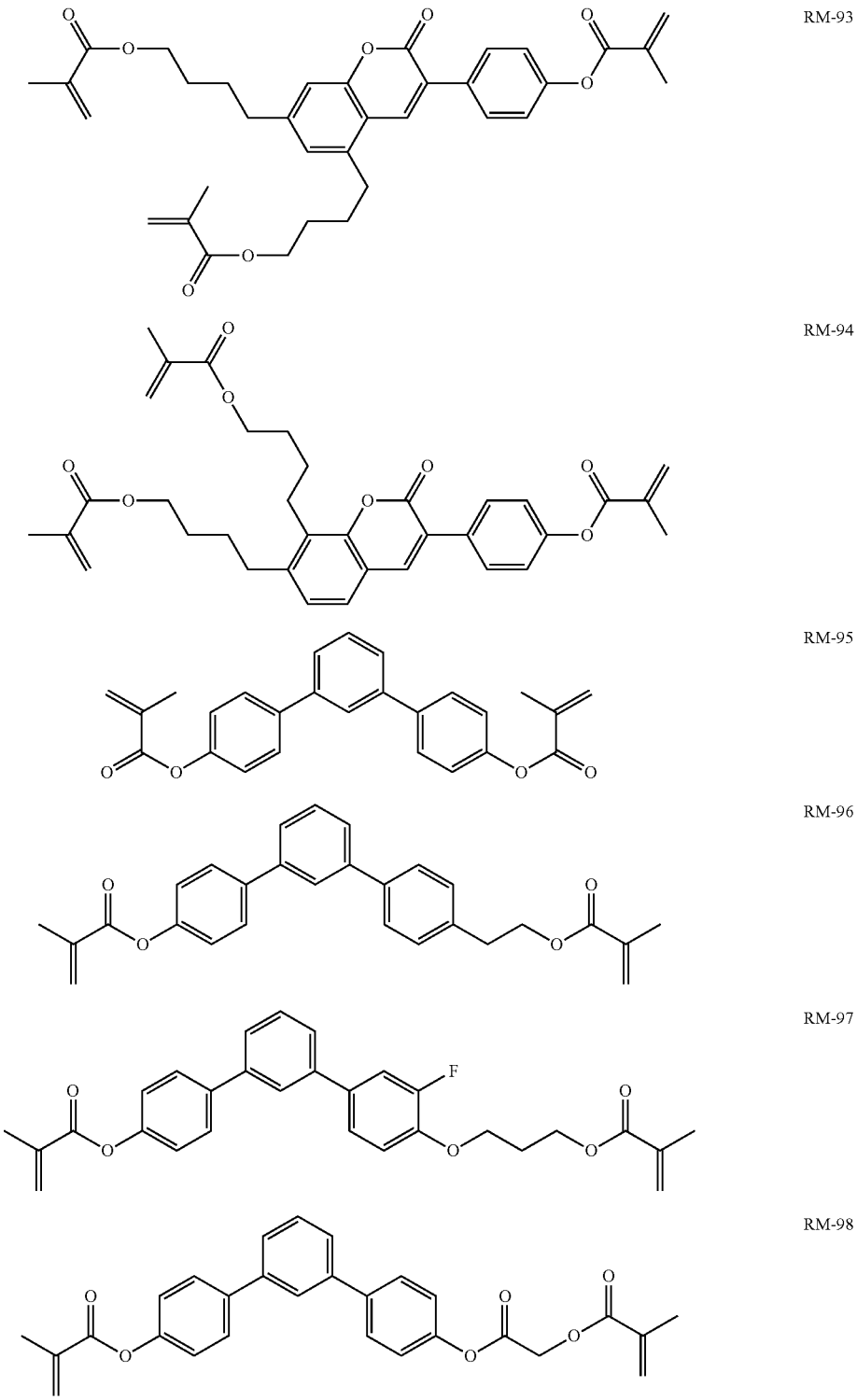

RM-93

RM-94

RM-95

RM-96

RM-97

RM-98

TABLE E-continued

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

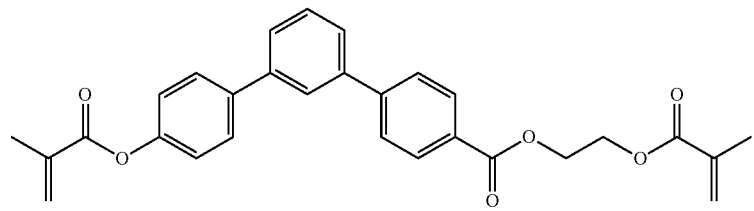 [SMILES: C=C(C)C(=O)OCCOC(=O)c1ccc(-c2cccc(-c3ccc(OC(=O)C(=C)C)cc3)c2)cc1]

RM-99

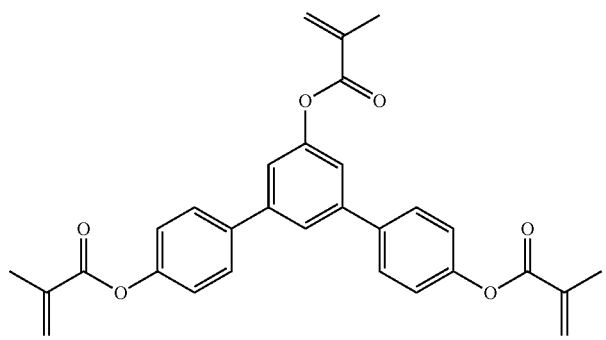 [SMILES: C=C(C)C(=O)Oc1ccc(-c2cc(OC(=O)C(=C)C)cc(-c3ccc(OC(=O)C(=C)C)cc3)c2)cc1]

RM-100

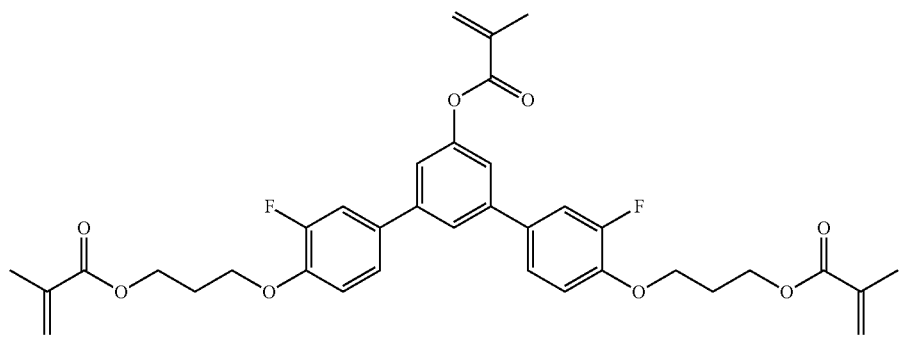 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]

RM-101

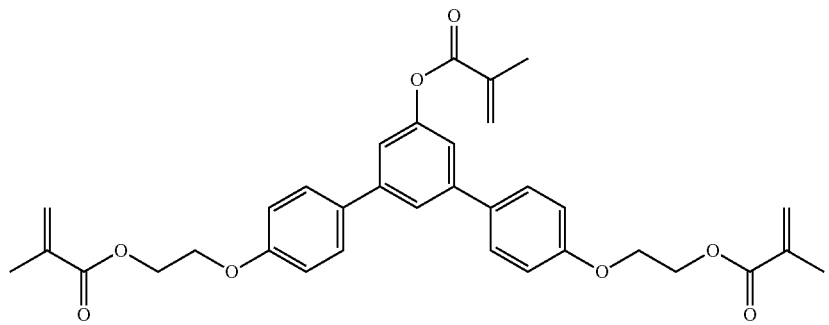 [SMILES: C=C(C)C(=O)OCCOc1ccc(-c2cc(OC(=O)C(=C)C)cc(-c3ccc(OCCOC(=O)C(=C)C)cc3)c2)cc1]

RM-102

TABLE E-continued

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

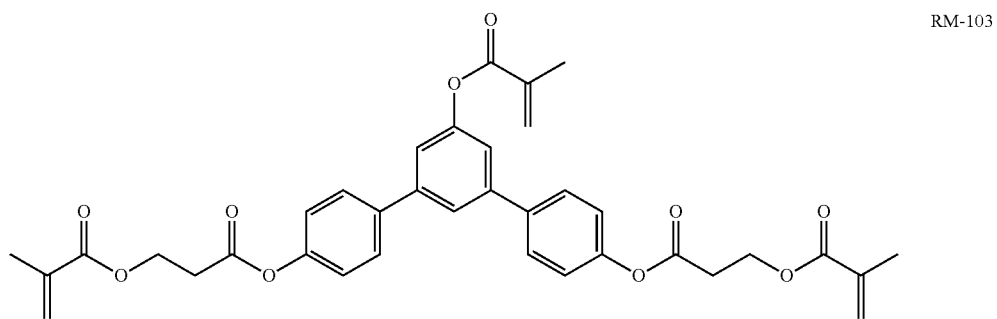
RM-103

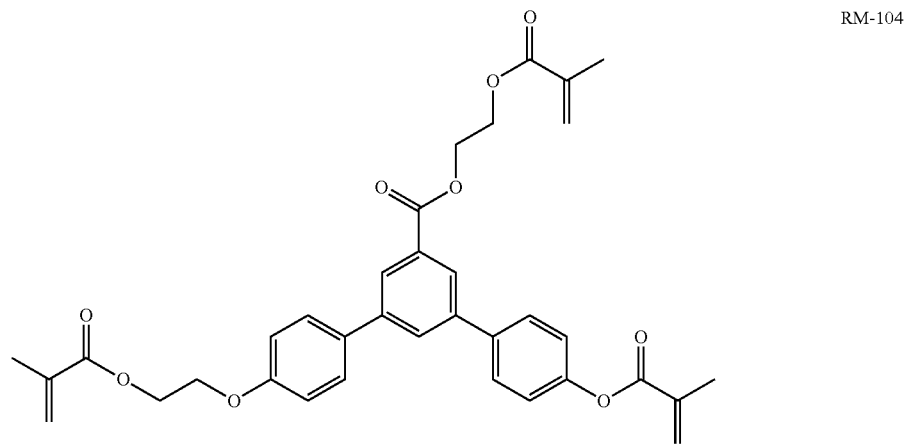
RM-104

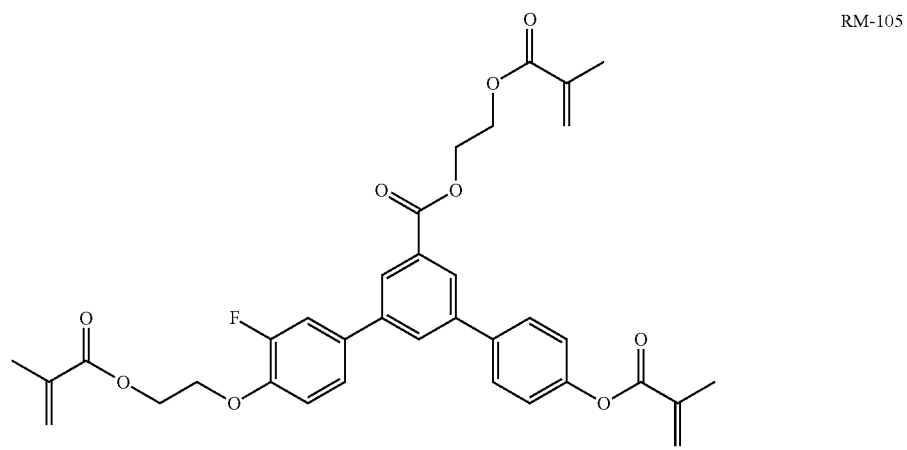
RM-105

TABLE E-continued

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

RM-106

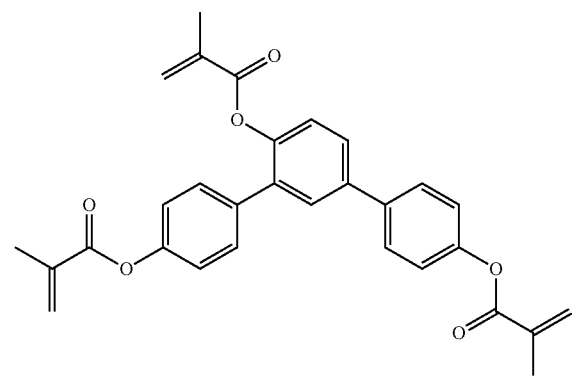 [SMILES: C=C(C)C(=O)Oc1ccc(-c2ccc(OC(=O)C(=C)C)c(-c3ccc(OC(=O)C(=C)C)cc3)c2)cc1]

RM-107

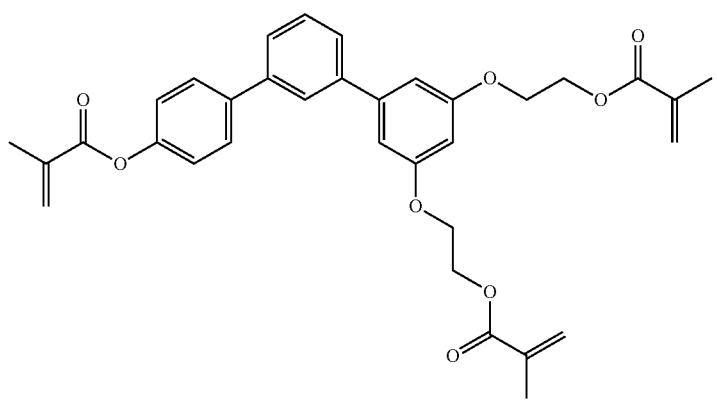 [SMILES: C=C(C)C(=O)OCCOc1cc(OCCOC(=O)C(=C)C)cc(-c2cccc(-c3ccc(OC(=O)C(=C)C)cc3)c2)c1]

RM-108

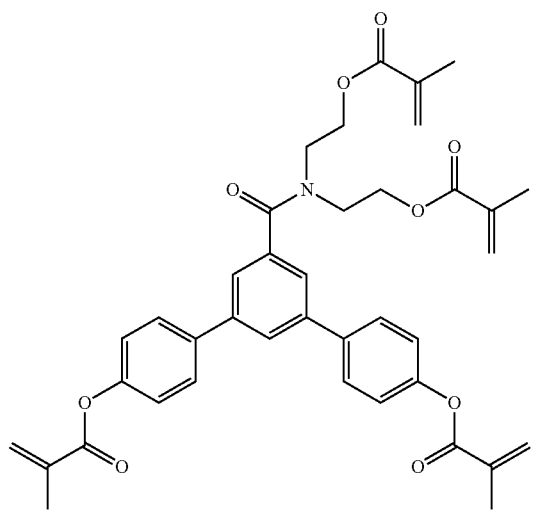 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]

TABLE E-continued

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

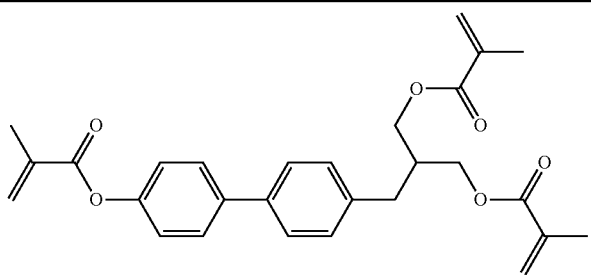

RM-109

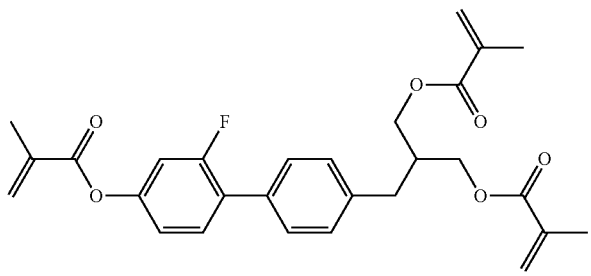 [SMILES: C=C(C)C(=O)OCC(COC(=O)C(=C)C)Cc1ccc(-c2ccc(OC(=O)C(=C)C)cc2F)cc1]

RM-110

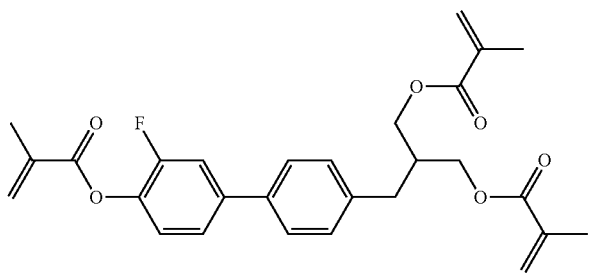 [SMILES: C=C(C)C(=O)OCC(COC(=O)C(=C)C)Cc1ccc(-c2ccc(OC(=O)C(=C)C)c(F)c2)cc1]

RM-111

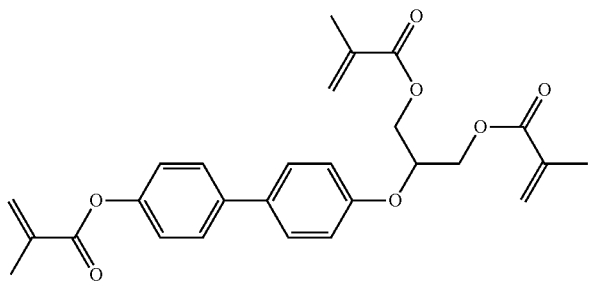 [SMILES: C=C(C)C(=O)OCC(COC(=O)C(=C)C)Oc1ccc(-c2ccc(OC(=O)C(=C)C)cc2)cc1]

RM-112

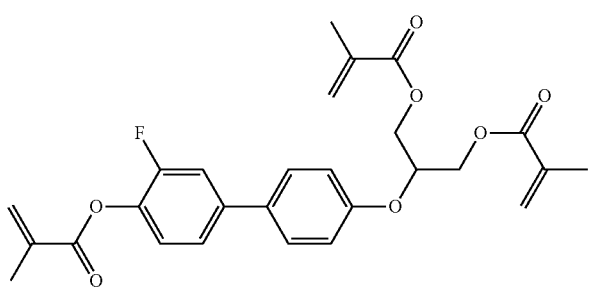 [SMILES: C=C(C)C(=O)OCC(COC(=O)C(=C)C)Oc1ccc(-c2ccc(OC(=O)C(=C)C)c(F)c2)cc1]

RM-113

TABLE E-continued

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

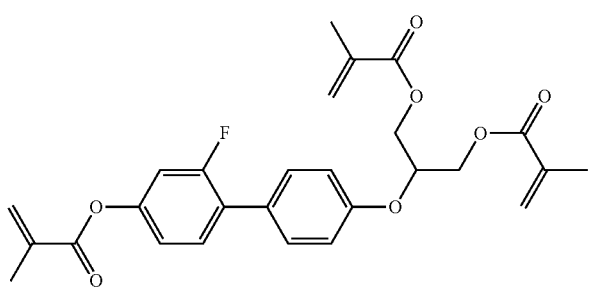 [SMILES: C=C(C)C(=O)OCC(COC(=O)C(=C)C)Oc1ccc(-c2ccc(OC(=O)C(=C)C)cc2F)cc1]

RM-114

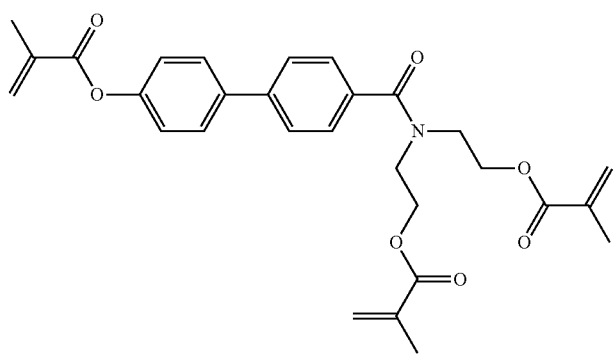 [SMILES: C=C(C)C(=O)OCCN(CCOC(=O)C(=C)C)C(=O)c1ccc(-c2ccc(OC(=O)C(=C)C)cc2)cc1]

RM-115

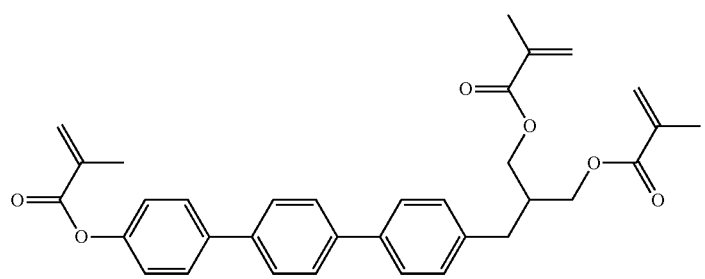 [SMILES: C=C(C)C(=O)OCC(COC(=O)C(=C)C)Cc1ccc(-c2ccc(-c3ccc(OC(=O)C(=C)C)cc3)cc2)cc1]

RM-116

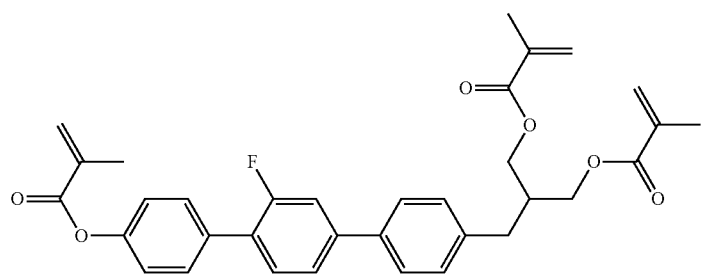

RM-117

TABLE E-continued

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

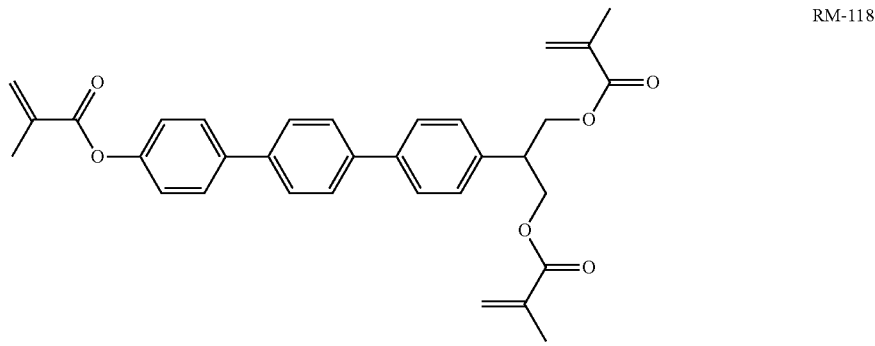

RM-118

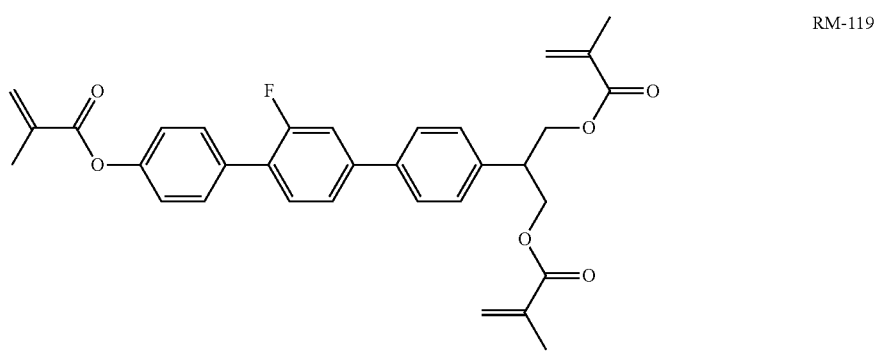

RM-119

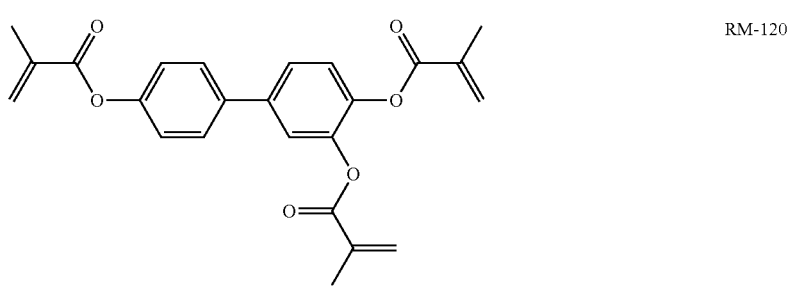

RM-120

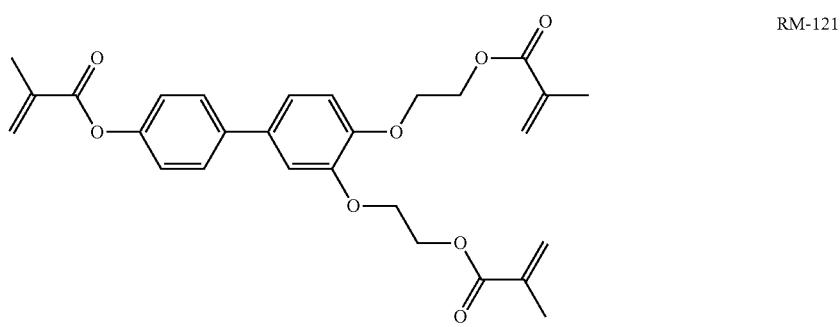

RM-121

TABLE E-continued

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

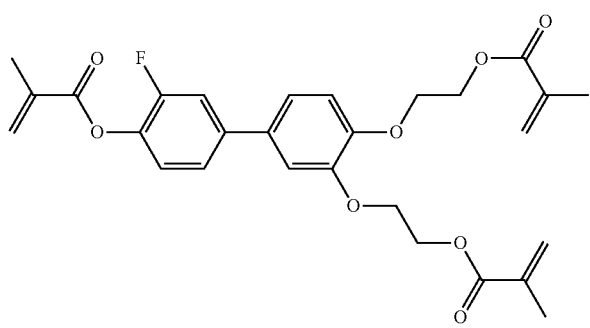 [SMILES: C=C(C)C(=O)OCCOc1ccc(-c2ccc(OC(=O)C(=C)C)c(F)c2)cc1OCCOC(=O)C(=C)C]

RM-122

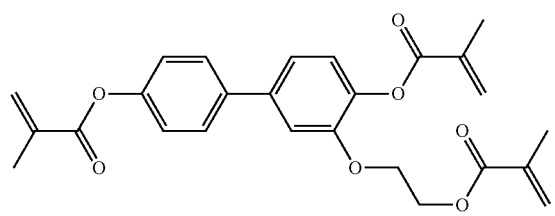

RM-123

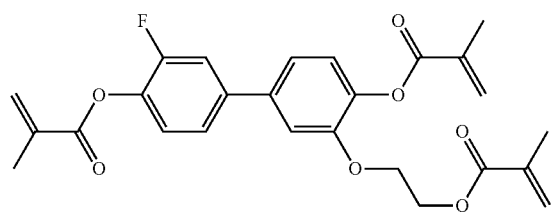 [SMILES: C=C(C)C(=O)OCCOc1cc(-c2ccc(OC(=O)C(=C)C)cc2)ccc1OC(=O)C(=C)C]

RM-124

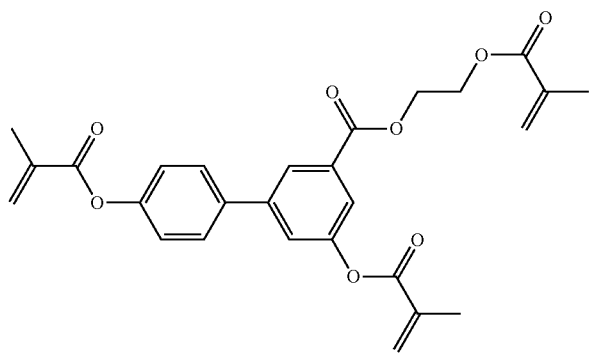 [SMILES: C=C(C)C(=O)OCCOC(=O)c1cc(OC(=O)C(=C)C)cc(-c2ccc(OC(=O)C(=C)C)cc2)c1]

RM-125

TABLE E-continued

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

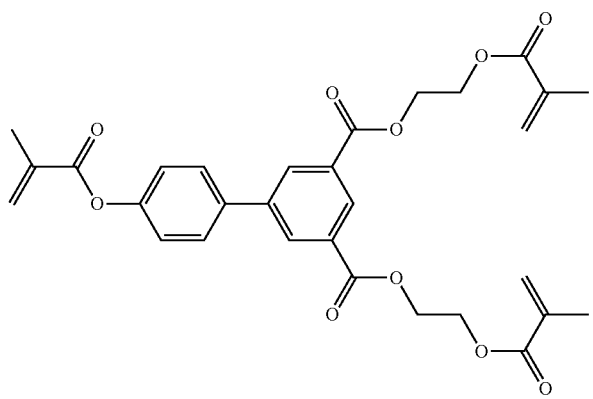 [SMILES: C=C(C)C(=O)OCCOC(=O)c1cc(C(=O)OCCOC(=O)C(=C)C)cc(-c2ccc(OC(=O)C(=C)C)cc2)c1]

RM-126

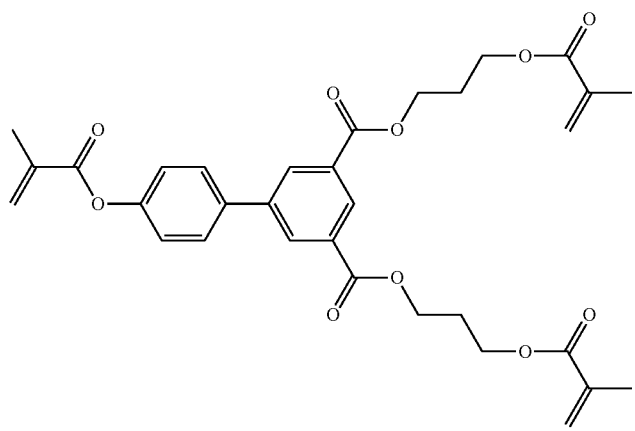 [SMILES: C=C(C)C(=O)OCCCOC(=O)c1cc(C(=O)OCCCOC(=O)C(=C)C)cc(-c2ccc(OC(=O)C(=C)C)cc2)c1]

RM-127

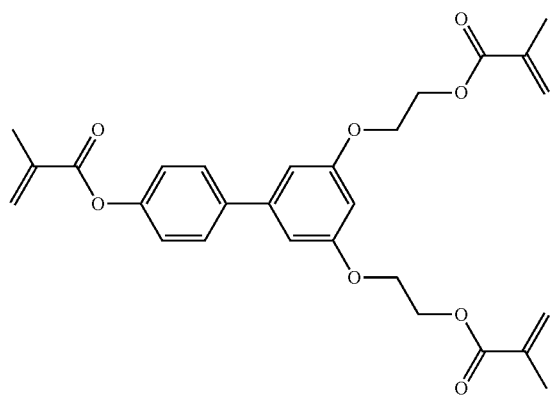 [SMILES: C=C(C)C(=O)OCCOc1cc(OCCOC(=O)C(=C)C)cc(-c2ccc(OC(=O)C(=C)C)cc2)c1]

RM-128

TABLE E-continued

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

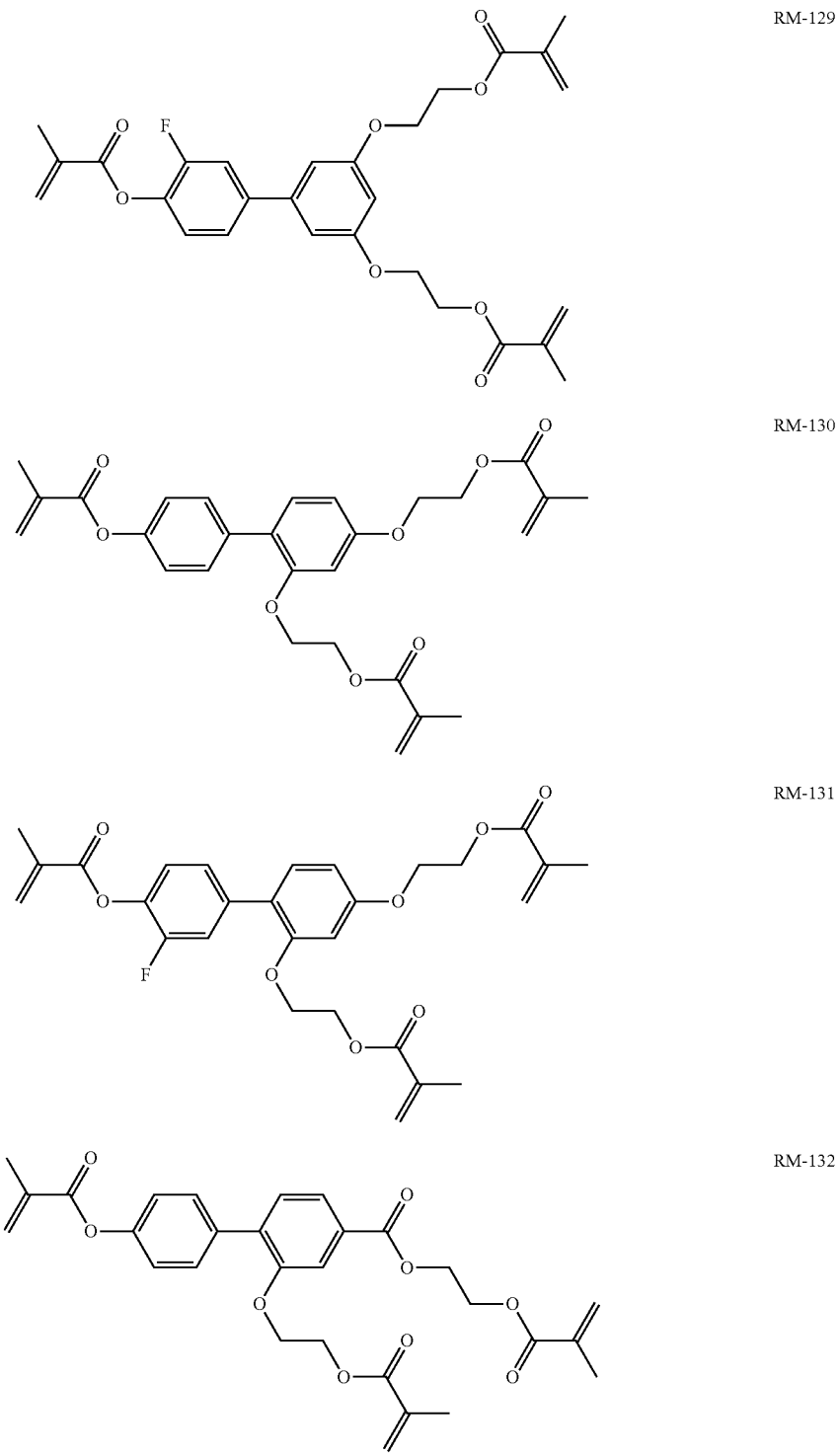

RM-129

RM-130

RM-131

RM-132

TABLE E-continued

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

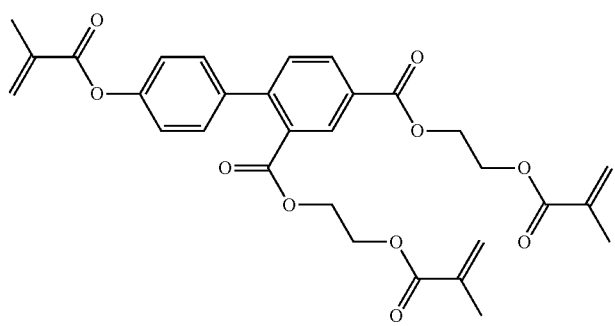 [SMILES: C=C(C)C(=O)OCCOC(=O)c1ccc(-c2ccc(OC(=O)C(=C)C)cc2)c(C(=O)OCCOC(=O)C(=C)C)c1]

RM-133

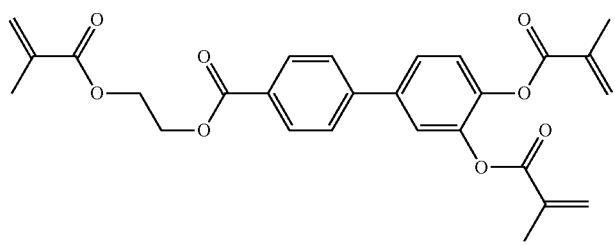 [SMILES: C=C(C)C(=O)OCCOC(=O)c1ccc(-c2ccc(OC(=O)C(=C)C)c(OC(=O)C(=C)C)c2)cc1]

RM-134

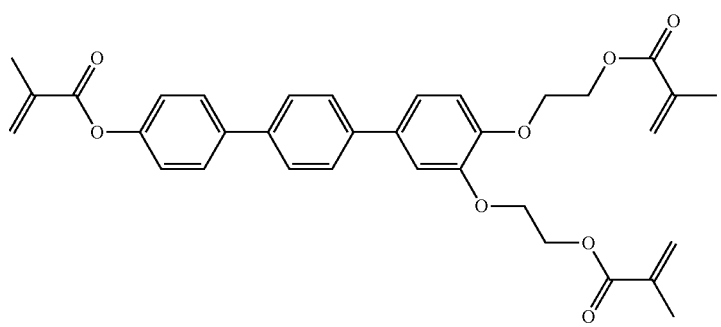 [SMILES: C=C(C)C(=O)OCCOc1ccc(-c2ccc(-c3ccc(OC(=O)C(=C)C)cc3)cc2)cc1OCCOC(=O)C(=C)C]

RM-135

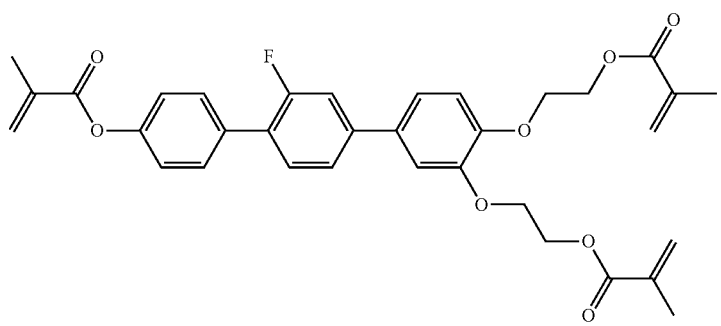 [SMILES: C=C(C)C(=O)OCCOc1ccc(-c2ccc(-c3ccc(OC(=O)C(=C)C)cc3)c(F)c2)cc1OCCOC(=O)C(=C)C]

RM-136

TABLE E-continued

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

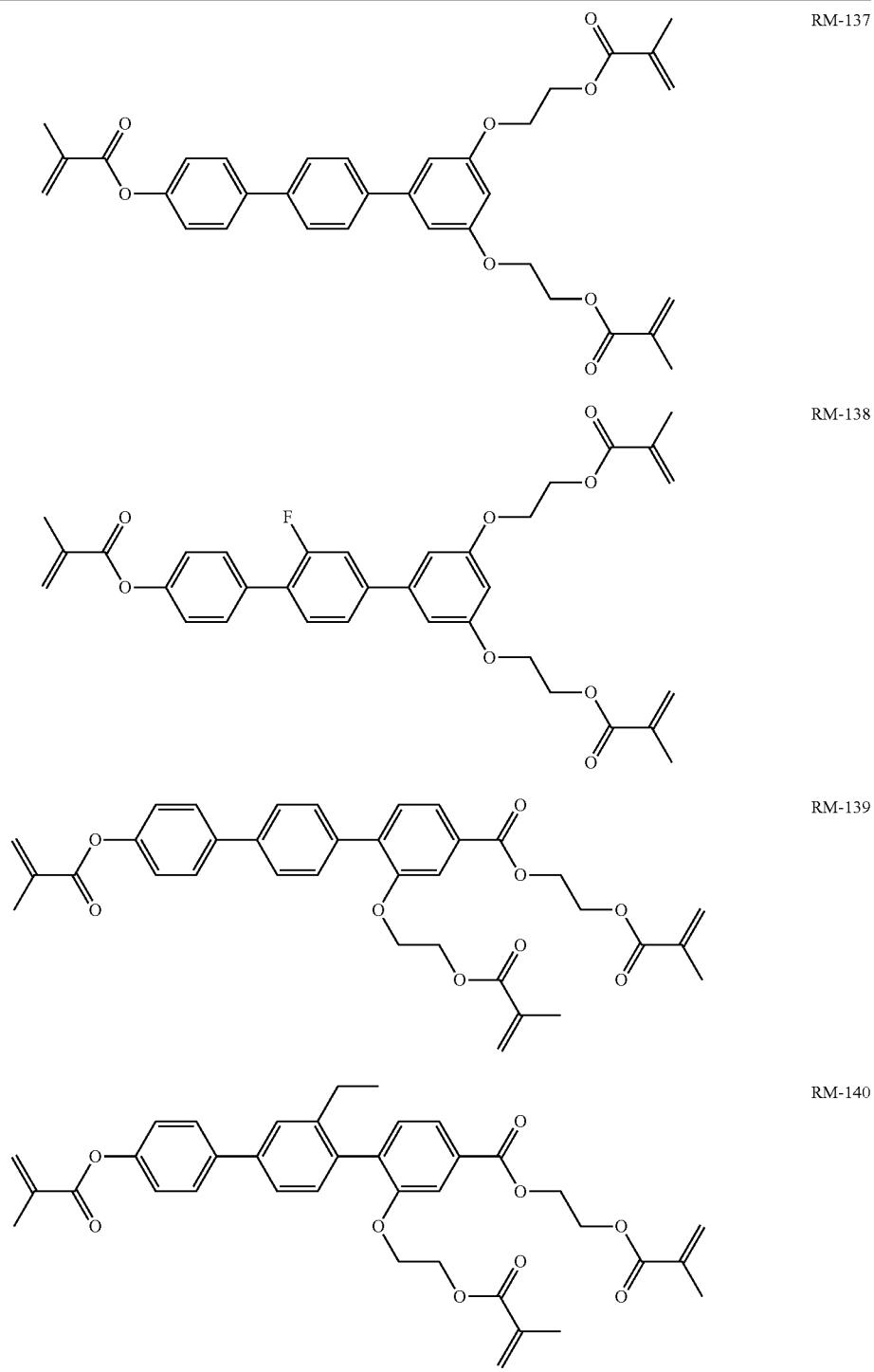

RM-137

RM-138

RM-139

RM-140

TABLE E-continued

Table E compiles illustrative compounds which can preferably be used as reactive mesogenic compounds in the LC media in accordance with the present invention. If the mixtures according to the invention comprise one or more reactive compounds, they are preferably employed in amounts of 0.01 to 5% by weight. An initiator or a mixture of two or more initiators may, if necessary, also have to be added for the polymerisation. The initiator or initiator mixture is preferably added in amounts of 0.001 to 2% by weight, based on the mixture. A suitable initiator is, for example, Irgacure ® 651 (BASF).

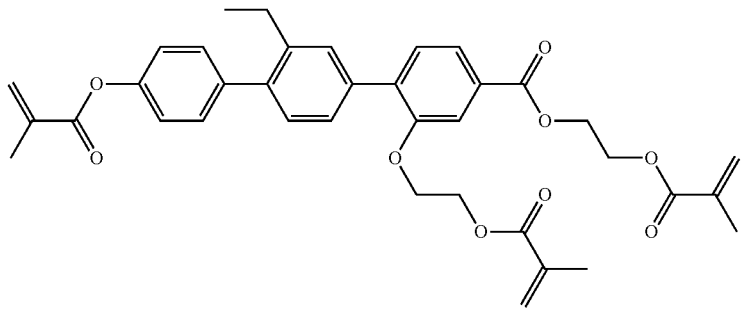 [SMILES: C=C(C)C(=O)OCCOC(=O)c1ccc(-c2ccc(-c3ccc(OC(=O)C(=C)C)cc3)c(CC)c2)c(OCCOC(=O)C(=C)C)c1]

RM-141

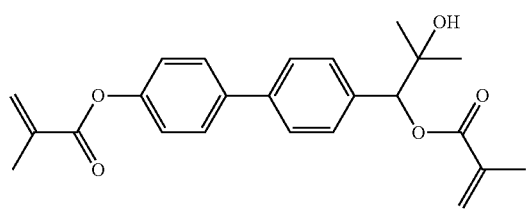

RM-142

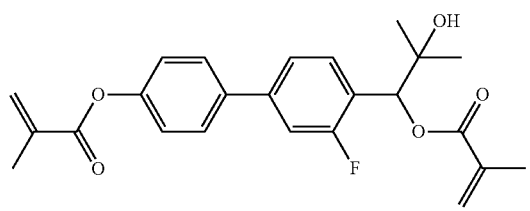 [SMILES: C=C(C)C(=O)Oc1ccc(-c2ccc(C(OC(=O)C(=C)C)C(C)(C)O)c(F)c2)cc1]

RM-143

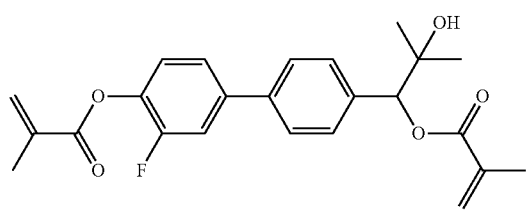 [SMILES: C=C(C)C(=O)Oc1ccc(-c2ccc(C(OC(=O)C(=C)C)C(C)(C)O)cc2)cc1F]

RM-144

In a preferred embodiment, the LC medium according to the invention comprises one or more polymerisable compounds from Table E, preferably selected from the polymerisable compounds of the formulae RM-1 to RM-144, particularly preferably from the formulae RM-1, RM-4, RM-8, RM-17, RM-19, RM-35, RM-37, RM-39, RM-40, RM-41, RM-48, RM-52, RM-54, RM-57, RM-64, RM-74, RM-76, RM-88, RM-102, RM-103, RM-109, RM-117, RM-120, RM-121 and RM-122.

TABLE F

Table F shows SA additives which can preferably be used in the media according to the invention:

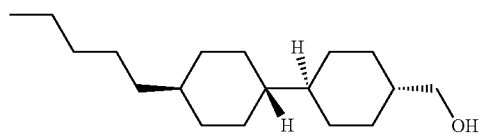 [SMILES: CCCCC[C@H]1CC[C@H]([C@H]2CC[C@H](CO)CC2)CC1]

SA-1

TABLE F-continued
Table F shows SA additives which can preferably be used in the media according to the invention:
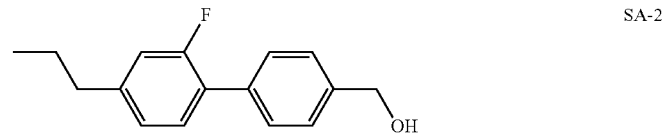
SA-2
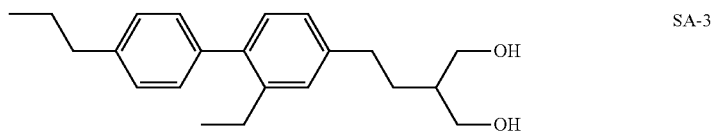
SA-3
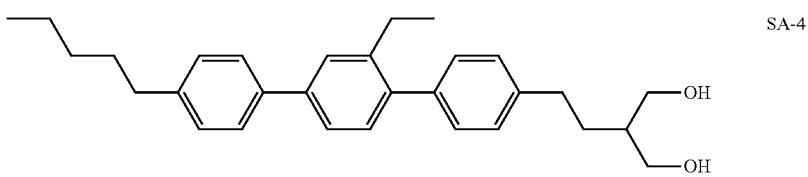
SA-4
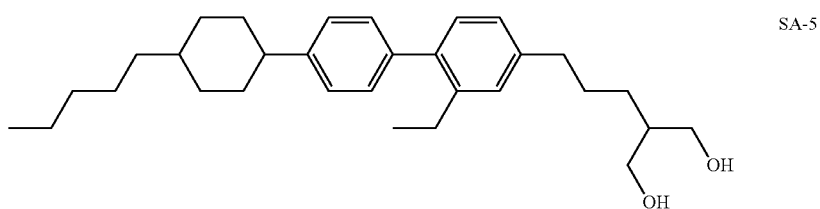
SA-5
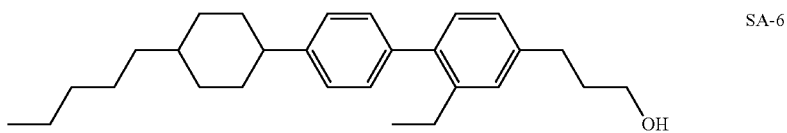
SA-6
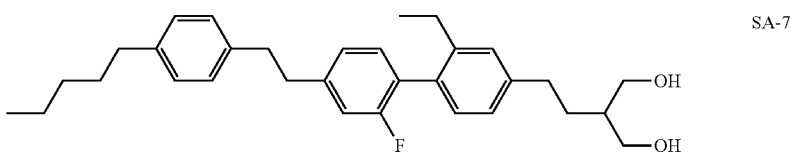
SA-7
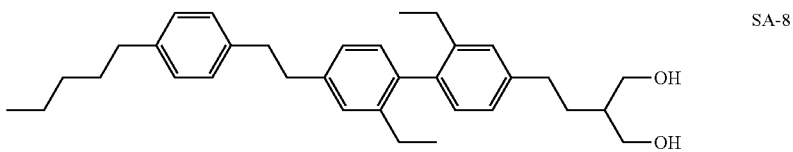
SA-8
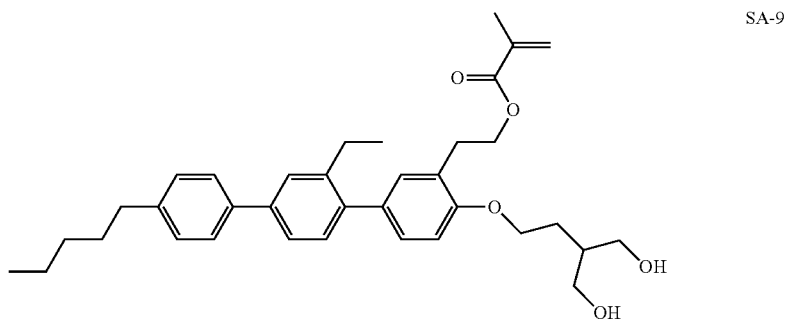
SA-9

163 164
TABLE F-continued
Table F shows SA additives which can preferably be used in the media according to the invention:
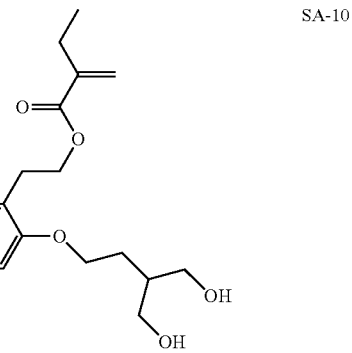
SA-10
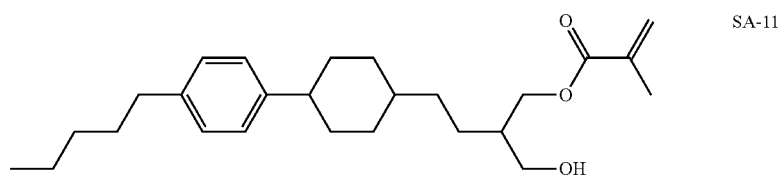
SA-11
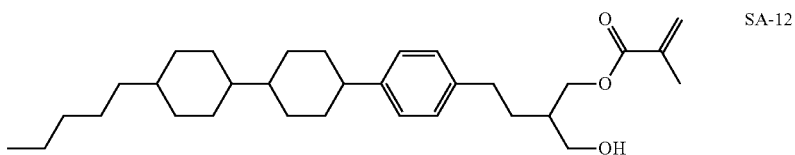
SA-12
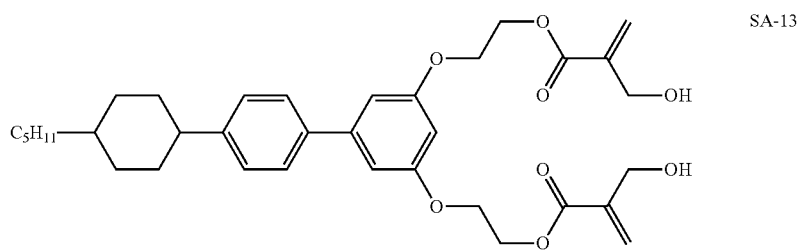
SA-13
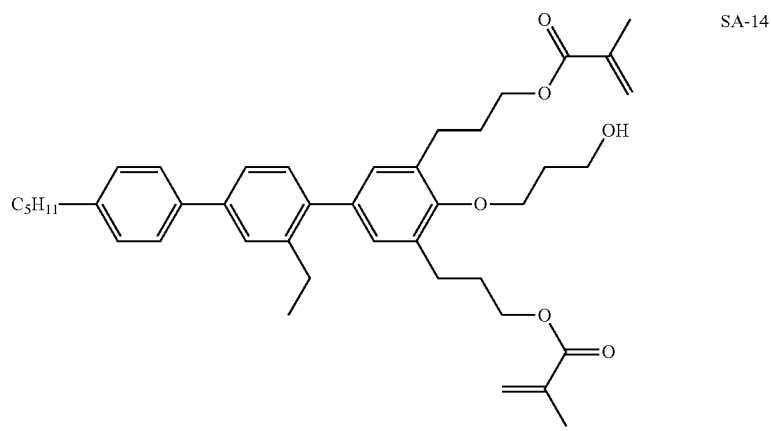
SA-14

TABLE F-continued
Table F shows SA additives which can preferably be used in the media according to the invention:
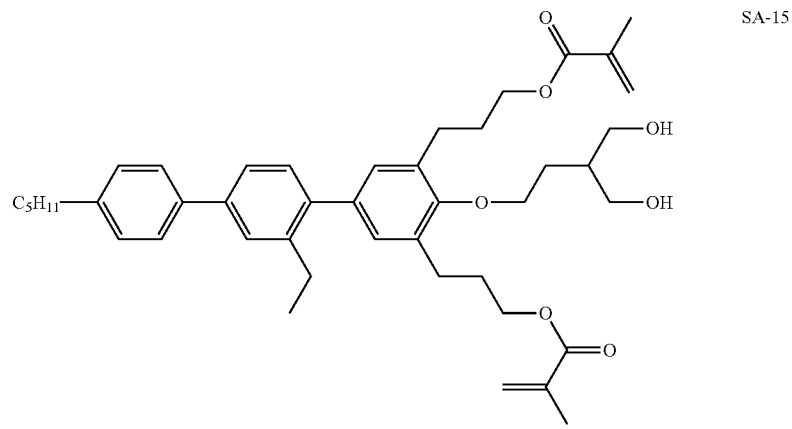
SA-15
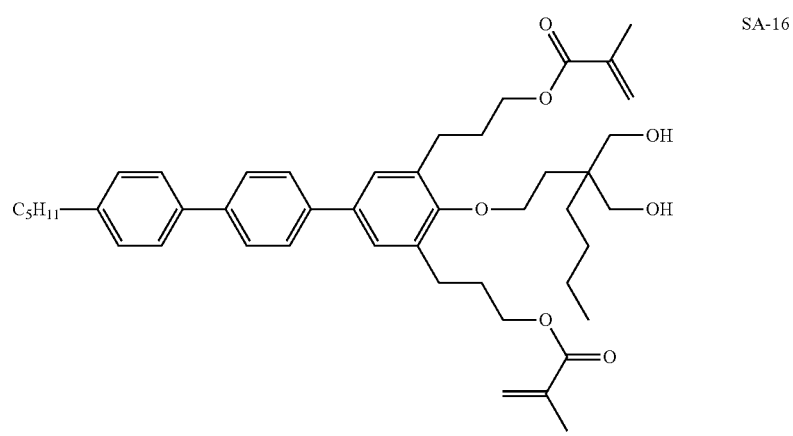
SA-16
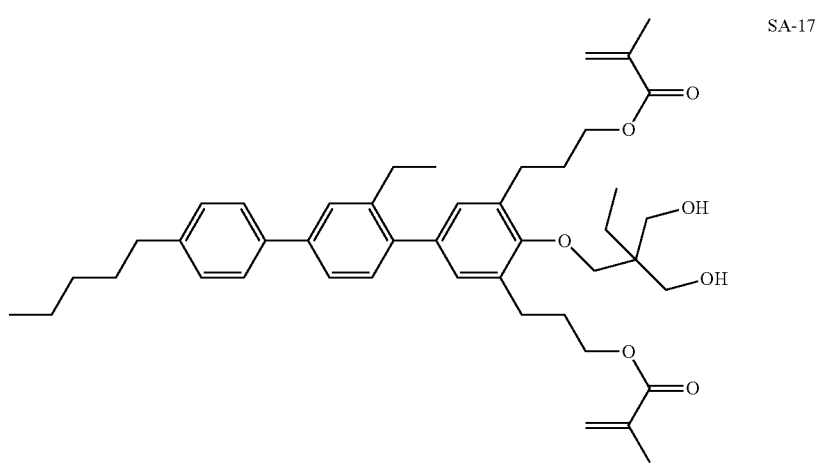
SA-17

TABLE F-continued
Table F shows SA additives which can preferably be used in the media according to the invention:
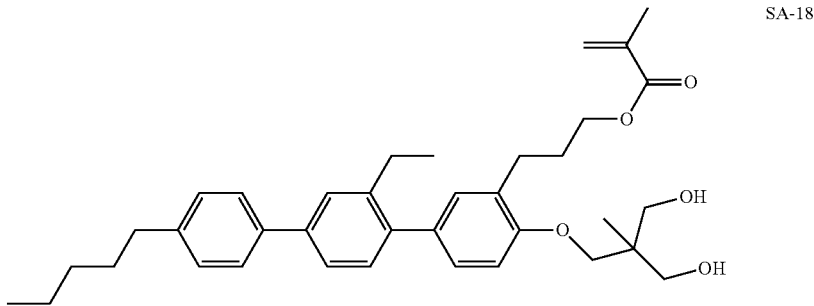
SA-18
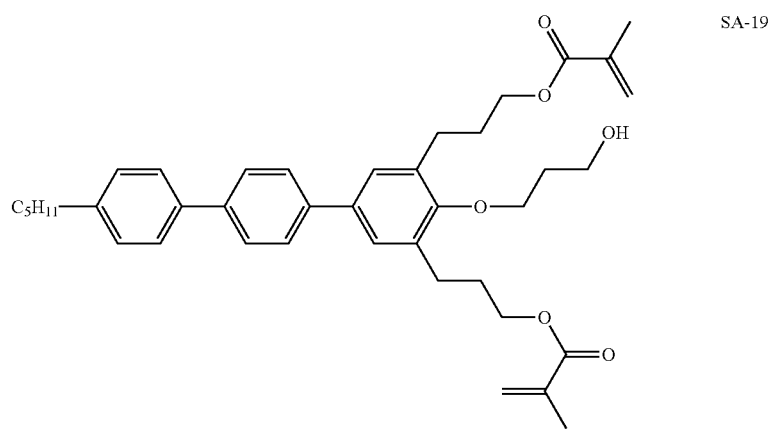
SA-19
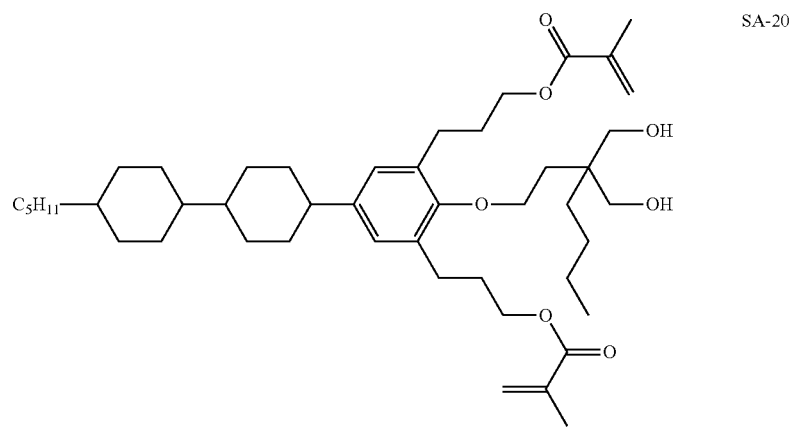
SA-20

TABLE F-continued
Table F shows SA additives which can preferably be used in the media according to the invention:
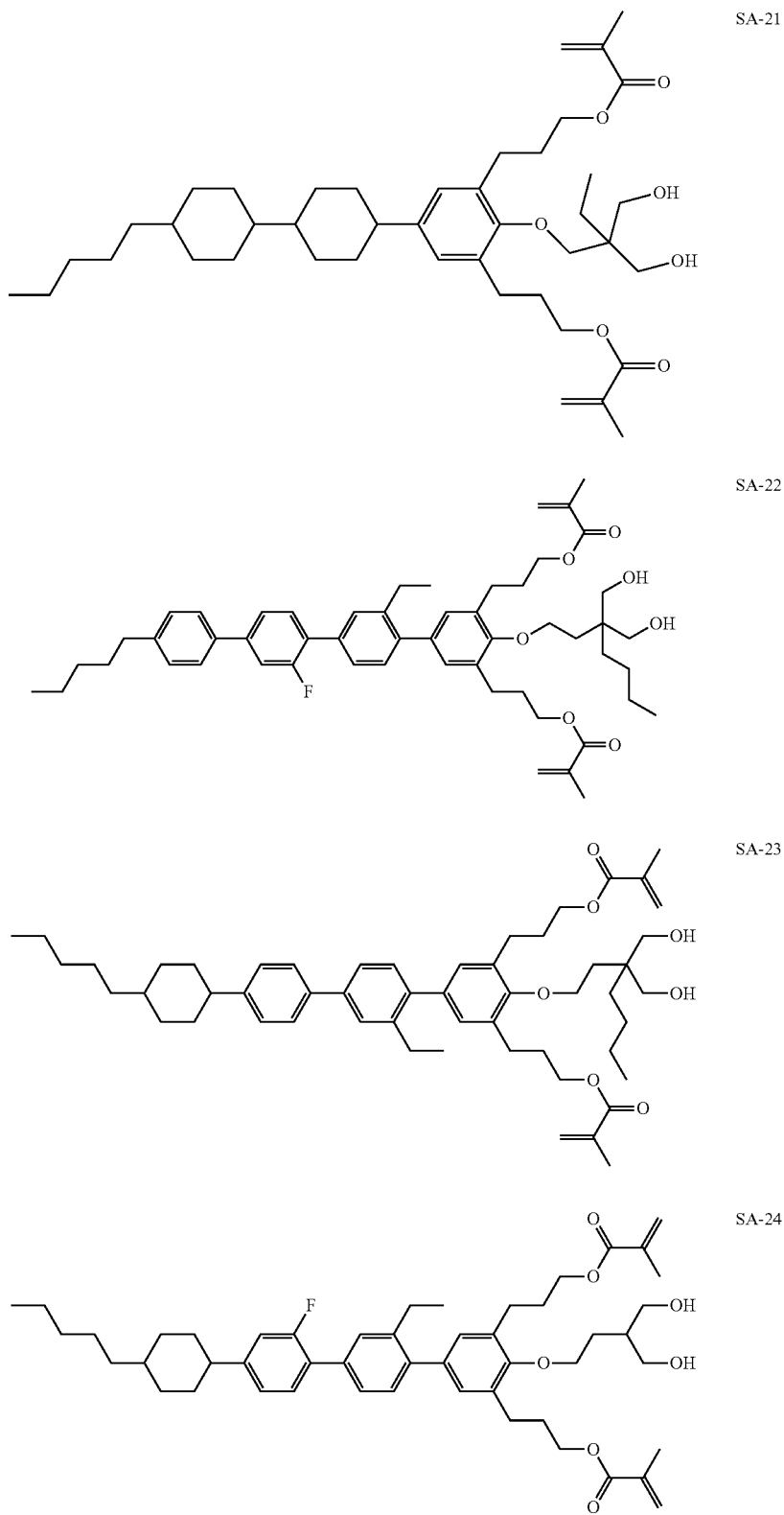

TABLE F-continued
Table F shows SA additives which can preferably be used in the media according to the invention:
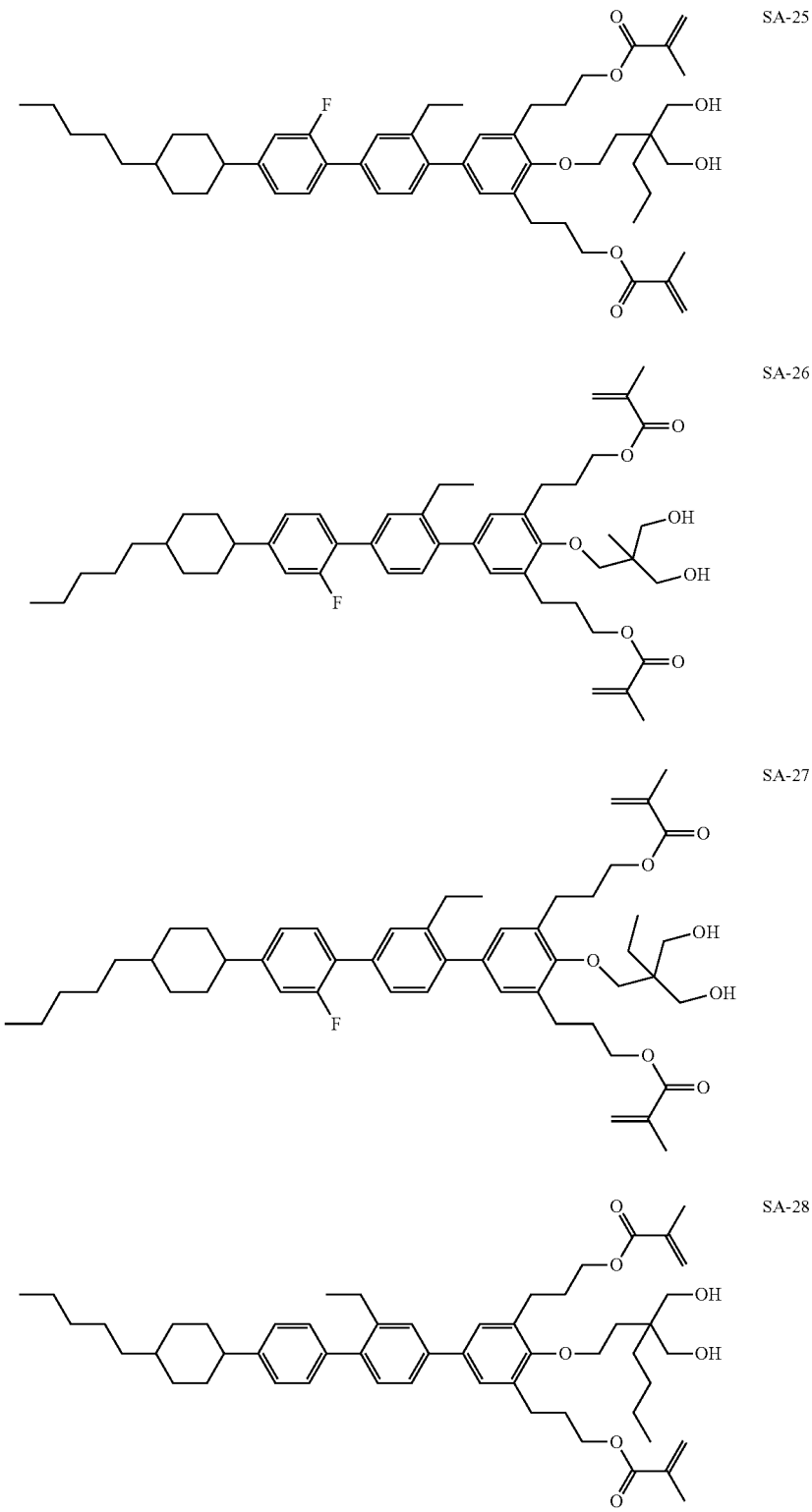

TABLE F-continued
Table F shows SA additives which can preferably be used in the media according to the invention:
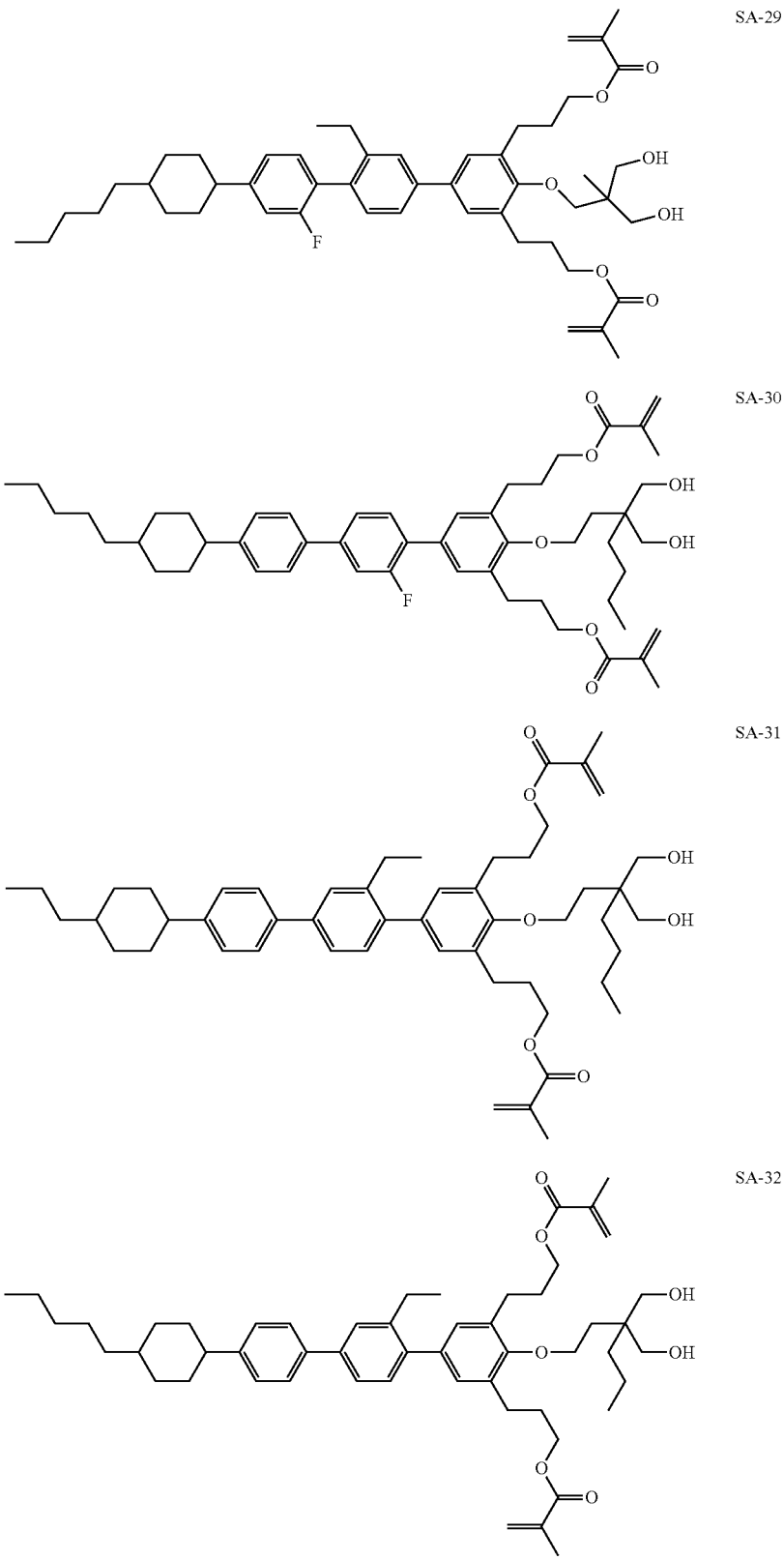

TABLE F-continued
Table F shows SA additives which can preferably be used in the media according to the invention:
SA-33
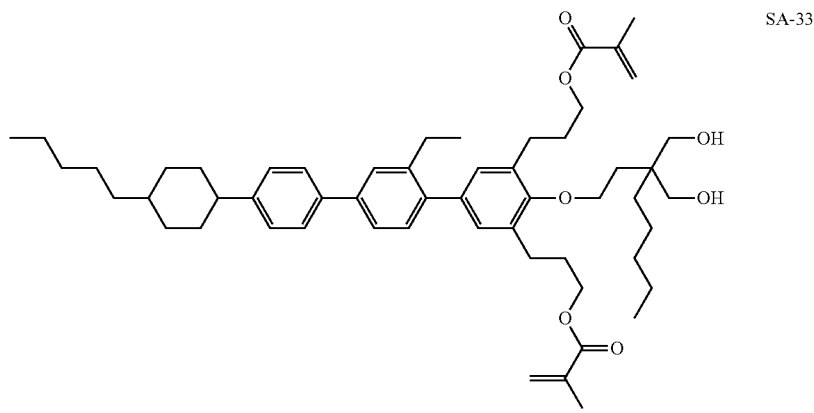
SA-34
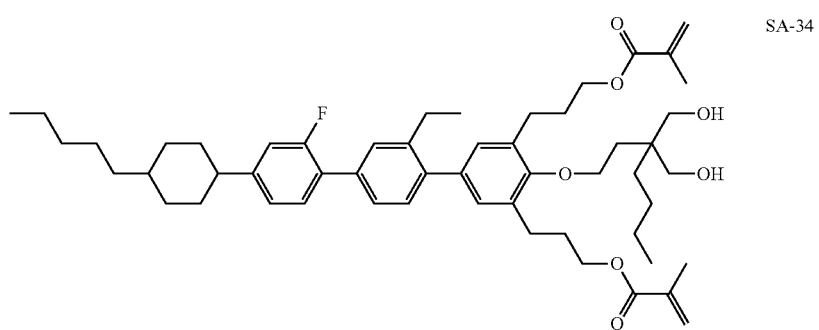
SA-35
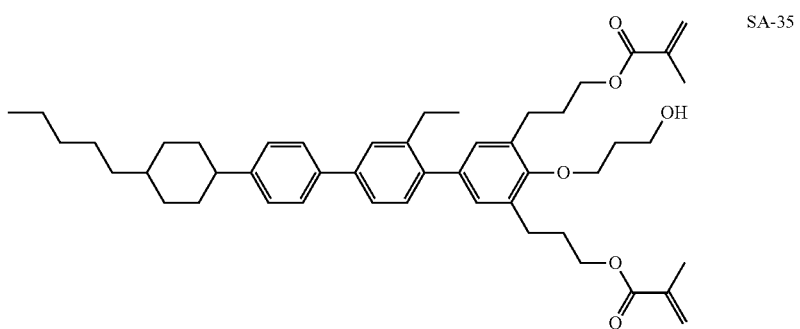
SA-36
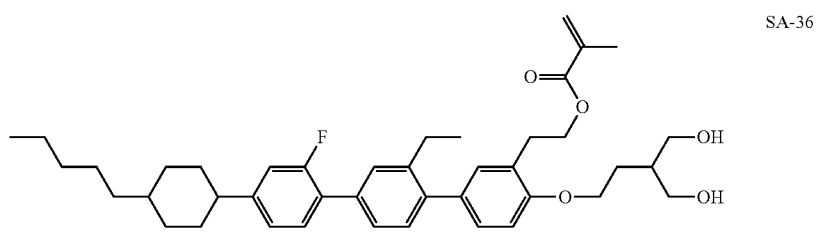
SA-37
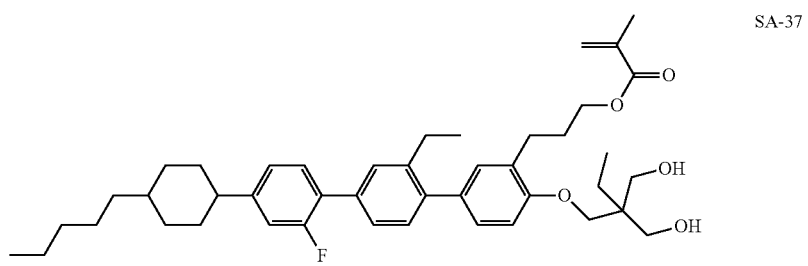

TABLE F-continued
Table F shows SA additives which can preferably be used in the media according to the invention:
SA-38
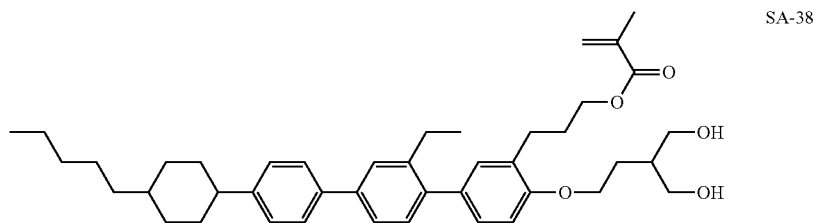
SA-39
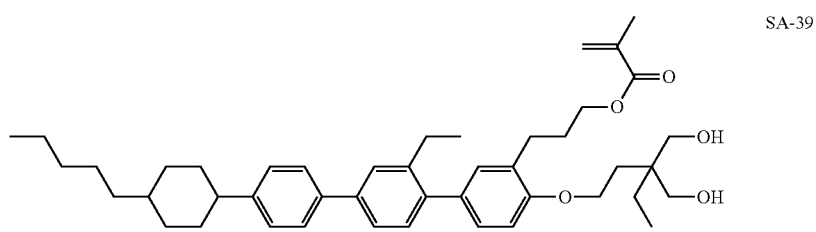
SA-40
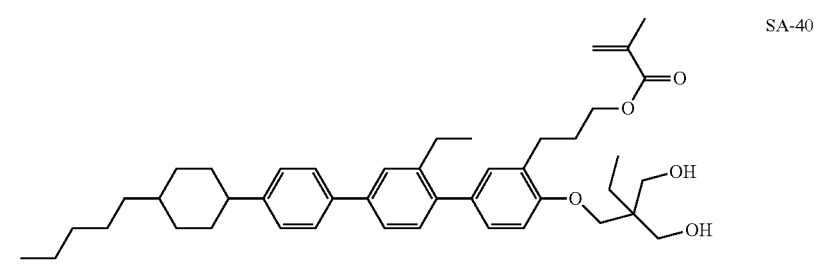
SA-41
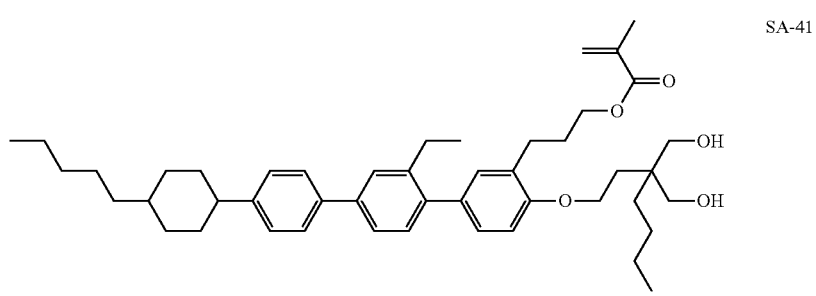
SA-42
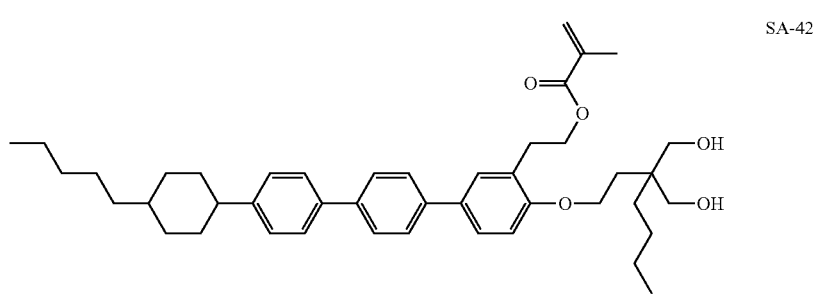
SA-43
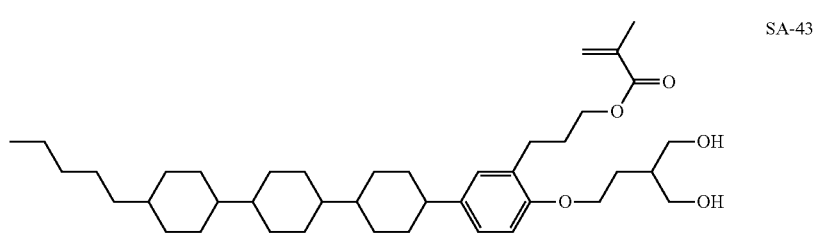

TABLE F-continued

Table F shows SA additives which can preferably be used in the media according to the invention:

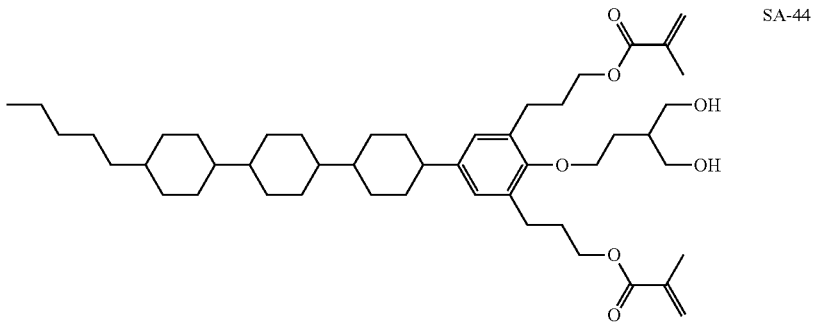

SA-44

In a preferred embodiment, the LC medium according to the invention comprises one or more SA additives selected from the formulae SA-1 to SA-44, particularly preferably from the formulae SA-14 to SA-34 and SA-44, very particularly preferably from the formulae SA-20 to SA-34 and SA-44.

The following mixture examples are intended to explain the invention without limiting it.

Above and below, percentage data denote percent by weight. All temperatures are quoted in degrees Celsius. m.p. denotes melting point, cl.p.=clearing point. Furthermore, C=crystalline state, N=nematic phase, S=smectic phase and I=isotropic phase. The data between these symbols represent the transition temperatures. Furthermore, Δn denotes the optical anisotropy at 589 nm and 20° C.,
$\gamma_1$ denotes the rotational viscosity (mPa·s) at 20° C.,
Δε denotes the dielectric anisotropy at 20° C. and 1 kHz ($\Delta\varepsilon=\varepsilon_\parallel-\varepsilon_\perp$, where $\varepsilon_\parallel$ denotes the dielectric constant parallel to the longitudinal axes of the molecules and $\varepsilon_\perp$ denotes the dielectric constant perpendicular thereto).
$V_{10}$ denotes the voltage (V) for 10% transmission (viewing angle perpendicular to the plate surface), (threshold voltage), determined in a TEM cell (90° twist) at the 1st minimum (i.e. at a &An value of 0.5 μm) at 20° C.,
$V_0$ denotes the Freedericks threshold voltage, determined capacitively at 20° C. in a cell rubbed antiparallel.
LTS denotes the storage or low-temperature stability in hours (h), measured in test cells suitable for this purpose at a temperature of −20° C., unless explicitly indicated otherwise.

All physical properties are determined in accordance with "Merck Liquid Crystals, Physical Properties of Liquid Crystals", status November 1997, Merck KGaA, Germany, and apply for a temperature of 20° C., unless explicitly indicated otherwise.

COMPARATIVE EXAMPLE 1

| | | | |
|---|---|---|---|
| CC-3-V | 29.4% | cl.p. | 75.5° C. |
| CCP-V-1 | 20.2% | Δn | 0.1035 |
| CCP-V2-1 | 9.0% | Δε | +7.1 |
| CPP-2-F | 4.1% | $\varepsilon_\parallel$ | 10.4 |
| CPP-3-F | 4.0% | $\varepsilon_\perp$ | 4.3 |
| BCH-3F.F.F | 10.0% | $\gamma_1$ | 61 mPas |
| PUQU-3-F | 23.3% | $V_{10}$ | 1.53 V |
| | | LTS | 1000 h |

EXAMPLE 1

| | | | |
|---|---|---|---|
| PUQU-3-F | 8.5% | cl.p. | 72.5° C. |
| CCQU-2-F | 12.0% | Δn | 0.0985 |
| CCQU-3-F | 13.0% | Δε | +7.2 |
| CCQU-5-F | 10.0% | $\varepsilon_\parallel$ | 10.6 |
| CCGU-3-F | 8.0% | $\varepsilon_\perp$ | 3.4 |
| PCH-301 | 10.5% | $\gamma_1$ | 84 mPas |
| PCH-3CL | 3.0% | $V_{10}$ | 1.50 V |
| CCH-23 | 14.0% | LTS | 1000 h |
| CCH-34 | 8.0% | | |
| PGP-2-3 | 4.0% | | |
| PGP-2-4 | 4.0% | | |
| PGP-2-5 | 5.0% | | |

EXAMPLE 2

| | | | |
|---|---|---|---|
| CCH-23 | 16.0% | cl.p. | 74.5° C. |
| CCH-34 | 7.0% | Δn | 0.0989 |
| PCH-301 | 17.0% | Δε | +6.5 |
| CCH-301 | 8.0% | $\varepsilon_\parallel$ | 9.9 |
| PGP-2-3 | 2.0% | $\varepsilon_\perp$ | 3.4 |
| PGP-2-4 | 2.0% | $\gamma_1$ | 86 mPas |
| PGP-2-5 | 2.0% | $V_{10}$ | 1.49 V |
| PGUQU-3-F | 8.0% | LTS | 1000 h |
| CCGU-3-F | 5.0% | | |
| CCQU-2-F | 7.0% | | |
| CCQU-3-F | 7.0% | | |
| CCQU-5-F | 6.0% | | |
| CBC-33F | 2.0% | | |
| CPGU-3-OT | 6.0% | | |
| BCH-3F.F.F | 5.0% | | |

EXAMPLE 3

| | | | |
|---|---|---|---|
| CCH-23 | 17.0% | cl.p. | 74.5° C. |
| CCH-34 | 6.5% | Δn | 0.0992 |
| PCH-301 | 15.5% | Δε | +7.1 |
| CCH-301 | 8.5% | $\varepsilon_\parallel$ | 10.7 |
| PGUQU-3-F | 9.0% | $\varepsilon_\perp$ | 3.6 |
| CCGU-3-F | 5.5% | $\gamma_1$ | 75 mPas |
| CCQU-2-F | 5.5% | $V_{10}$ | 1.43 V |

-continued

| | | | |
|---|---|---|---|
| CCQU-3-F | 4.0% | LTS | 1000 h |
| CCQU-5-F | 4.0% | | |
| CBC-33F | 2.0% | | |
| CPGU-3-OT | 3.5% | | |
| CPU-3-OXF | 19.0% | | |

EXAMPLE 4

| | | | |
|---|---|---|---|
| CCH-23 | 17.5% | cl.p. | 74.5° C. |
| CCH-34 | 11.5% | $\Delta n$ | 0.1014 |
| PCH-301 | 16.5% | $\Delta\varepsilon$ | +6.2 |
| CCH-301 | 9.5% | $\varepsilon_\parallel$ | 9.7 |
| PGUQU-3-F | 8.0% | $\varepsilon_\perp$ | 3.5 |
| CCGU-3-F | 9.0% | $\gamma_1$ | 76 mPas |
| CBC-33F | 2.0% | $V_{10}$ | 1.55 V |
| CPGU-3-OT | 3.0% | | |
| CPU-3-OXF | 23.0% | | |

COMPARATIVE EXAMPLE 2

| | | | |
|---|---|---|---|
| CC-3-V | 52.0% | cl.p. | 75.5° C. |
| APUQU-3-F | 14.0% | $\Delta n$ | 0.1187 |
| BCH-32 | 7.0% | $\Delta\varepsilon$ | +4.6 |
| GGP-3-CL | 2.0% | $\varepsilon_\parallel$ | 7.6 |
| PGP-2-3 | 9.0% | $\varepsilon_\perp$ | 3.0 |
| PGP-2-4 | 10.0% | $\gamma_1$ | 54 mPas |
| PGP-2-5 | 2.0% | $V_{10}$ | 1.96 V |
| PUQU-3-F | 4.0% | LTS −20° C. | 1000 h |
| | | LTS −30° C. | 168 h |

EXAMPLE 5

| | | | |
|---|---|---|---|
| BCH-32 | 5.0% | cl.p. | 74.0° C. |
| PUQU-3-F | 6.5% | $\Delta n$ | 0.1182 |
| PGP-2-3 | 6.0% | $\Delta\varepsilon$ | +4.1 |
| PGP-2-4 | 6.0% | $\varepsilon_\parallel$ | 7.2 |
| PGP-2-5 | 8.0% | $\varepsilon_\perp$ | 3.2 |
| CCQU-2-F | 2.0% | $\gamma_1$ | 66 mPas |
| CCQU-3-F | 5.0% | $V_{10}$ | 1.92 V |
| CCQU-5-F | 2.5% | LTS −20° C. | 1000 h |
| PCH-301 | 16.0% | LTS −30° C. | 1000 h |
| CCH-301 | 5.0% | | |
| CCH-23 | 15.5% | | |
| CCH-34 | 11.0% | | |
| CPGU-3-OT | 4.5% | | |
| CCGU-3-F | 7.0% | | |

EXAMPLE 6

| | | | |
|---|---|---|---|
| BCH-32 | 5.0% | cl.p. | 74.0° C. |
| PUQU-3-F | 5.0% | $\Delta n$ | 0.1167 |
| PGP-2-3 | 4.0% | $\Delta\varepsilon$ | +4.3 |
| PGP-2-4 | 3.5% | $\varepsilon_\parallel$ | 7.5 |
| PGP-2-5 | 7.5% | $\varepsilon_\perp$ | 3.2 |
| PCH-301 | 16.0% | $\gamma_1$ | 67 mPas |
| CCH-301 | 3.5% | $V_{10}$ | 1.91 V |
| CCH-23 | 17.5% | LTS −20° C. | 1000 h |
| CCH-34 | 11.5% | LTS −30° C. | 1000 h |
| CCGU-3-F | 9.0% | | |
| CPU-3-OXF | 17.5% | | |

EXAMPLE 7

| | | | |
|---|---|---|---|
| PUQU-3-F | 7.0% | cl.p. | 75.0° C. |
| PGP-2-3 | 7.5% | $\Delta n$ | 0.1170 |
| PGP-2-4 | 7.0% | $\Delta\varepsilon$ | +3.6 |
| PGP-2-5 | 9.0% | $\varepsilon_\parallel$ | 6.8 |
| CCQU-2-F | 4.0% | $\varepsilon_\perp$ | 3.2 |
| CCQU-3-F | 4.5% | $\gamma_1$ | 75 mPas |
| CCQU-5-F | 4.0% | $V_{10}$ | 1.97 V |
| PCH-301 | 14.0% | LTS −20° C. | 1000 h |
| CCH-301 | 8.0% | LTS −30° C. | 1000 h |
| CCH-23 | 14.5% | | |
| CCH-34 | 10.0% | | |
| CCGU-3-F | 6.5% | | |
| CPGP-4-3 | 4.0% | | |

EXAMPLE 8

| | | | |
|---|---|---|---|
| PGP-2-3 | 4.5% | cl.p. | 74.0° C. |
| PGP-2-4 | 4.5% | $\Delta n$ | 0.1173 |
| PGP-2-5 | 7.5% | $\Delta\varepsilon$ | +3.8 |
| PCH-301 | 15.5% | $\varepsilon_\parallel$ | 7.1 |
| CCH-301 | 9.0% | $\varepsilon_\perp$ | 3.3 |
| CCH-23 | 16.0% | $\gamma_1$ | 70 mPas |
| CCH-34 | 9.0% | $V_{10}$ | 1.94 V |
| CPGU-3-OT | 3.5% | LTS −20° C. | 1000 h |
| CPU-3-OXF | 19.5% | LTS −30° C. | 1000 h |
| CBC-33F | 3.5% | | |
| PGUQU-3-F | 2.0% | | |
| BCH-3F.F.F | 5.5% | | |

EXAMPLE 9

| | | | |
|---|---|---|---|
| PGP-2-3 | 5.0% | cl.p. | 75.0° C. |
| PGP-2-4 | 4.5% | $\Delta n$ | 0.1172 |
| PGP-2-5 | 6.5% | $\Delta\varepsilon$ | +3.7 |
| PCH-301 | 16.0% | $\varepsilon_\parallel$ | 6.9 |
| CCH-301 | 8.5% | $\varepsilon_\perp$ | 3.3 |
| CCH-23 | 17.0% | $\gamma_1$ | 68 mPas |
| CCH-34 | 10.5% | $V_{10}$ | 1.99 V |
| CCGU-3-F | 5.5% | LTS −20° C. | 1000 h |
| CPU-3-OXF | 20.0% | LTS −30° C. | 1000 h |
| CPGP-4-3 | 3.0% | | |
| PGUQU-3-F | 3.5% | | |

EXAMPLE 10

| | | | |
|---|---|---|---|
| PGP-2-3 | 5.5% | cl.p. | 75.0° C. |
| PGP-2-4 | 5.0% | $\Delta n$ | 0.1167 |
| PGP-2-5 | 8.0% | $\Delta\varepsilon$ | +3.7 |
| CCQU-2-F | 4.5% | $\varepsilon_\parallel$ | 7.0 |
| CCQU-3-F | 4.5% | $\varepsilon_\perp$ | 3.3 |

-continued

| | | | |
|---|---|---|---|
| CCQU-5-F | 4.0% | γ₁ | 70 mPas |
| PCH-301 | 15.5% | V₁₀ | 1.95 V |
| CCH-301 | 8.5% | LTS −20° C. | 1000 h |
| CCH-23 | 15.5% | LTS −30° C. | 1000 h |
| CCH-34 | 6.0% | | |
| CPGU-3-OT | 3.0% | | |
| CPU-3-OXF | 17.5% | | |
| CPGP-4-3 | 2.5% | | |

COMPARATIVE EXAMPLE 3

| | | | |
|---|---|---|---|
| CC-3-V | 30.0% | cl.p. | 76.0° C. |
| CCP-V-1 | 16.5% | Δn | 0.1321 |
| GGP-3-CL | 5.0% | Δε | +6.0 |
| BCH-3F.F.F | 14.0% | ε∥ | 9.3 |
| PUQU-3-F | 15.0% | ε⊥ | 3.3 |
| PGP-2-3 | 5.5% | γ₁ | 69 mPas |
| PGP-2-4 | 6.0% | V₁₀ | 1.68 V |
| PGP-2-5 | 8.0% | | |

EXAMPLE 11

| | | | |
|---|---|---|---|
| BCH-32 | 5.0% | cl.p. | 75.5° C. |
| PUQU-3-F | 7.5% | Δn | 0.1316 |
| PGP-2-3 | 6.5% | Δε | +6.2 |
| PGP-2-4 | 6.5% | ε∥ | 9.6 |
| PGP-2-5 | 8.0% | ε⊥ | 3.4 |
| CCQU-2-F | 2.0% | γ₁ | 86 mPas |
| CCQU-3-F | 3.0% | V₁₀ | 1.66 V |
| CCQU-5-F | 2.5% | | |
| PCH-301 | 17.5% | | |
| PCH-3CL | 4.5% | | |
| CCH-23 | 13.5% | | |
| CCH-34 | 7.0% | | |
| CPGU-3-OT | 5.5% | | |
| CCGU-3-F | 5.5% | | |
| PGUQU-3-F | 5.5% | | |

EXAMPLE 12

| | | | |
|---|---|---|---|
| PGP-2-3 | 6.0% | cl.p. | 75.0° C. |
| PGP-2-4 | 6.0% | Δn | 0.1317 |
| PGP-2-5 | 8.5% | Δε | +5.4 |
| PCH-301 | 16.5% | ε∥ | 8.8 |
| CCH-301 | 7.5% | ε⊥ | 3.4 |
| CCH-23 | 16.0% | γ₁ | 78 mPas |
| CCH-34 | 6.5% | V₁₀ | 1.73 V |
| CPGU-3-OT | 3.5% | | |
| CPU-3-OXF | 18.0% | | |
| CBC-33F | 1.5% | | |
| PGUQU-3-F | 10.0% | | |

EXAMPLE 13

0.04% of the following compound are added as stabiliser to the mixture from Example 1:

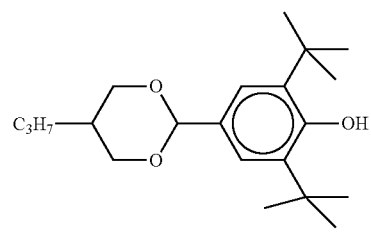

EXAMPLE 14

0.05% of the following compound are added as stabiliser to the mixture from Example 5:

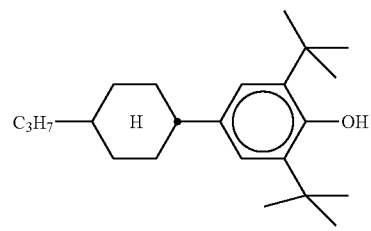

EXAMPLE 15

0.03% of the following compound are added as stabiliser to the mixture from Example 11:

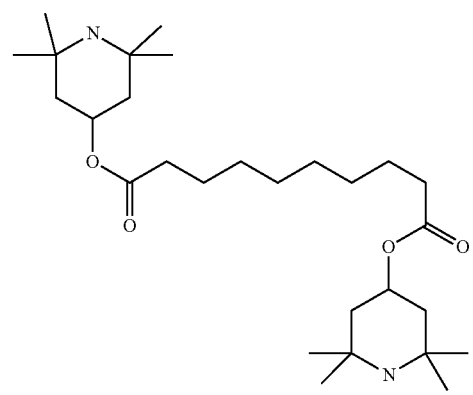

EXAMPLE 16

0.04% of the following compound are added as stabiliser to the mixture from Example 2:

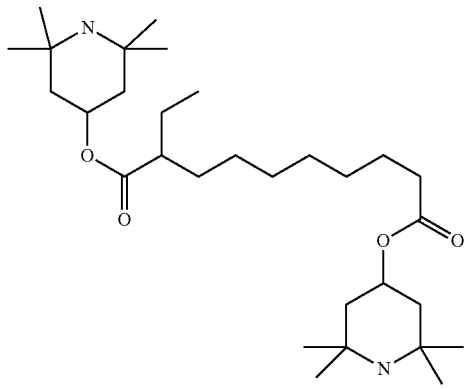

EXAMPLE 17

0.03% of the following compound are added as stabiliser to the mixture from Example 7:

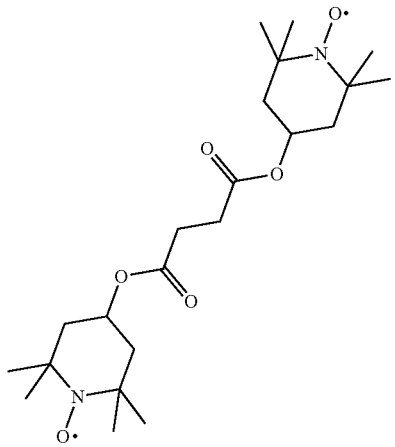

VHR Measurements

In order to determine the voltage holding ratio (VHR) or its stability after BL stress (BL=backlight), the respective mixture is filled into a test cell having an orientation material for parallel alignment in the TN configuration and flat ITO electrodes. The VHR of the respective mixture is then measured (measuring instrument: Autronic VHRM 105, signal amplitude: 1 V, pulse width 60 µs, measurement frequency 60 Hz, temperature 100° C.).

The corresponding test cells are subsequently exposed to illumination with a cold-cathode (CCFL) LCD backlight for a duration of up to 1000 hours. The VHR is in each case measured as described above after certain time intervals.

For each individual measurement, a measurement series of 4 test cells in each case is filled and investigated. The values indicated are the average of the individual values measured. The results are summarised in Table 1.

TABLE 1

| Mixture VHR (%) | cf. Ex. 1 | 1 | cf. Ex. 3 | 11 | 12 |
|---|---|---|---|---|---|
| initial | 98.8 | 98.8 | 98.3 | 97.1 | 96.9 |
| BL 48 h | 98.3 | 99.0 | 98.3 | 97.7 | 96.5 |
| BL 96 h | 97.6 | 98.9 | 96.6 | 97.3 | 96.0 |
| BL 360 h | 94.7 | 98.4 | 94.8 | 96.8 | 95.0 |
| BL 550 h | 93.4 | 98.3 | 93.8 [1] | 96.5 [1] | 94.1 [1] |
| BL 720 h | 92.0 | 98.1 | — | — | — |
| BL 1000 h | 89.9 | 98.0 | — | — | — |

[1] after 500 h

It can be seen from Table 1 that the mixtures according to the invention have a significantly smaller reduction in the VHR after BL stress and consequently significantly higher VHR stability than the comparative mixtures.

It can additionally be seen from the examples indicated above that the mixtures according to the invention have at least equally good or higher LTS values, in particular at low temperatures (−30° C.), compared with the comparative mixtures.

The invention claimed is:

1. An LC medium, having positive dielectric anisotropy and comprising one or more compounds of formula IA and one or more compounds of formula IB

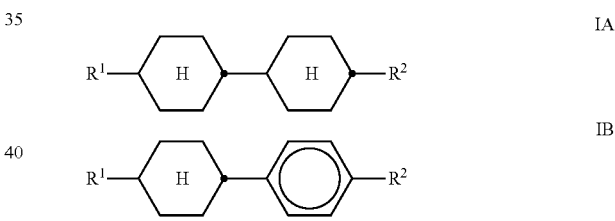

in which $R^1$ and $R^2$ in each case, independently of one another, denote alkyl, alkoxy, oxaalkyl or fluoroalkyl, in each case having 1 to 7 C atoms, the LC medium comprises no compounds of the formulae IA and IB in which one or both radicals $R^1$ or $R^2$ contain a C═C double bond, and wherein of the one or more compounds of formula IA at least one of formula IA1a and/or formula IA1b is present

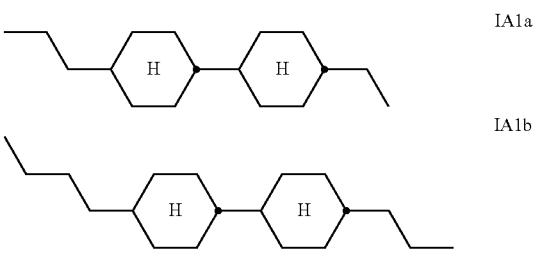

and of the one or more compounds of formula IB at least a compound of formula IB1a is present

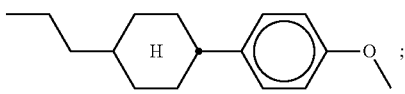   IB1a and wherein said medium further comprises one or more compounds selected from formulae XVIb1, XVIb2, and XVIb3

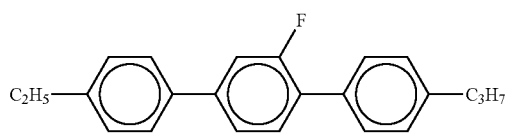   XVIb1

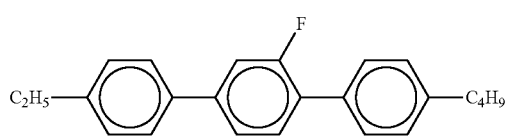   XVIb2

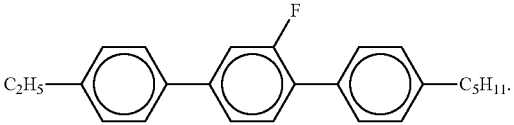   XVIb3

2. The LC medium according to claim 1, wherein the one or more compounds of the formula IA are of the following sub-formulae

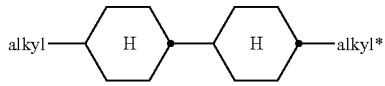   IA1

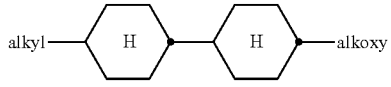   IA2 in which the individual radicals, in each case independently of one another and identically or differently on each occurrence, have the following meaning alkyl, alkyl* straight-chain alkyl having 1-6 C atoms, and
alkoxy straight-chain alkoxy having 1-6 C atoms.

3. The LC medium according to claim 2, wherein the one or more compounds of the formula IB are of the following sub-formula

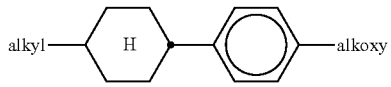   IB1 in which
alkyl is a straight-chain alkyl having 1-6 C atoms, and
alkoxy is a straight-chain alkoxy having 1-6 C atoms.

4. The LC medium according to claim 1, further comprising one or more compounds of the following sub-formulae

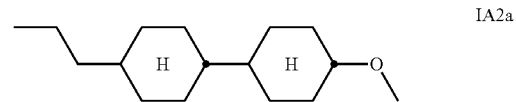   IA2a

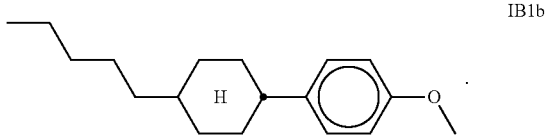   IB1b

5. The LC medium according to claim 1, further comprising one or more compounds of formulae II and III

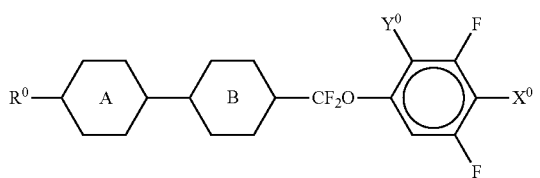   II

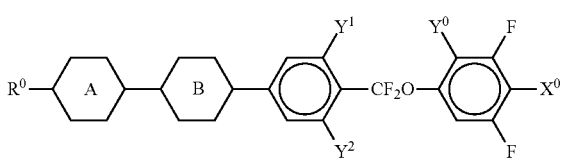   III in which the individual radicals, in each case independently of one another and identically or differently on each occurrence, have the following meaning

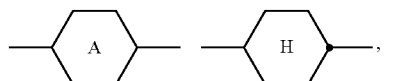

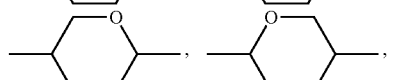

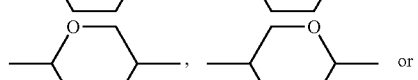

   or

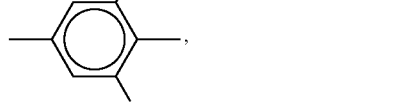

-continued

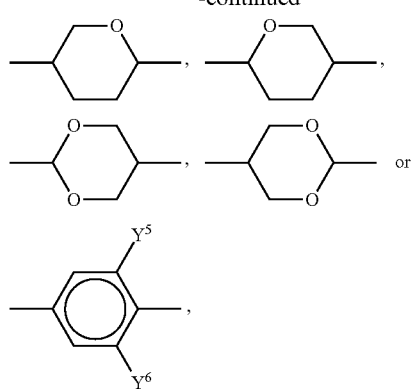

R⁰ unsubstituted or halogenated alkyl or alkoxy having 1 to 15 C atoms, where, in addition, one or more CH₂ groups in these radicals may in each case be replaced, independently of one another, by —CF₂O—,

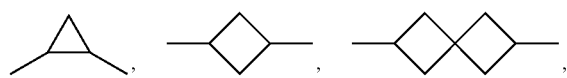

—O—, —CO—O—, or —O—CO— in such a way that O atoms are not linked directly to one another, X⁰ F, Cl, halogenated alkyl, halogenated alkoxy or halogenated alkenyloxy, in each case having up to 6 C atoms, $Y^{1-6}$ H or F, and $Y^0$ H or CH₃.

6. The LC medium according to claim 1, additionally comprising one or more compounds of formulae IV, V, VI, VII, and VIII

IV

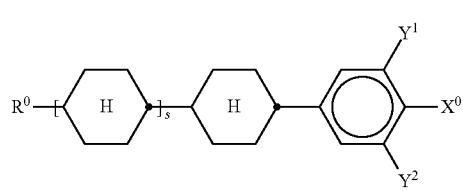

V

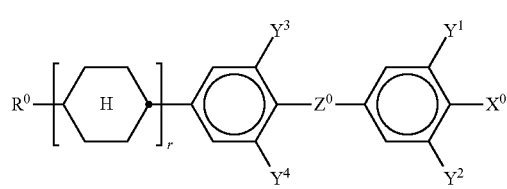

VI

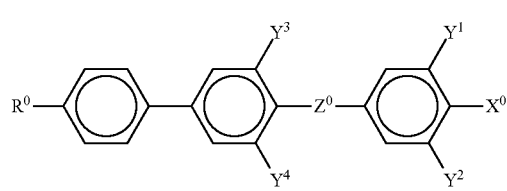

-continued

VII

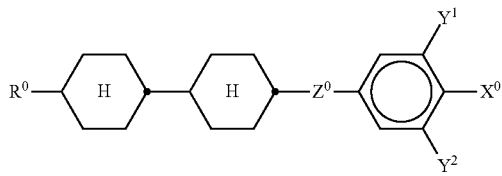

VIII

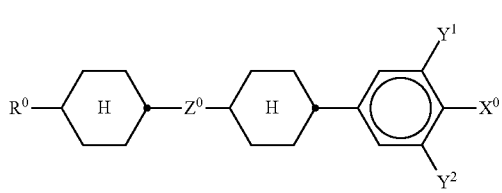

in which

R⁰ unsubstituted or halogenated alkyl or alkoxy having 1 to 15 C atoms, where, in addition, one or more CH₂ groups in these radicals may in each case be replaced, independently of one another, by —CF₂O—,

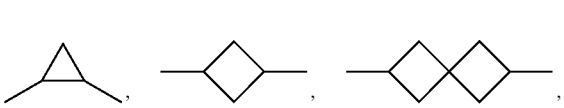

—O—, —CO—O— or —O—CO— in such a way that O atoms are not linked directly to one another, X⁰ F, Cl, halogenated alkyl, halogenated alkoxy or halogenated alkenyloxy, in each case having up to 6 C atoms, $Y^{1-4}$ H or F, Z⁰ denotes —C₂H₄—, —(CH₂)₄—, —CH═CH—, —CF═CF—, —C₂F₄—, —CH₂CF₂—, —CF₂CH₂—, —CH₂O—, —OCH₂—, —COO— or —OCF₂—, in formulae V and VI also a single bond, in formulae V and VIII also —CF₂O—, r denotes 0 or 1, and s denotes 0 or 1.

7. The LC medium according to claim 5, further comprising one or more compounds of the following formula

IX

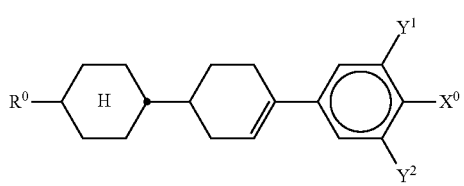

in which

R⁰ unsubstituted or halogenated alkyl or alkoxy having 1 to 15 C atoms, where, in addition, one or more CH₂ groups in these radicals may in each case be replaced, independently of one another, by —CF₂O—,

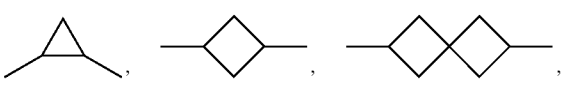

—O—, —CO—O— or —O—CO— in such a way that O atoms are not linked directly to one another, X⁰ F, Cl, halogenated alkyl, halogenated alkoxy or halogenated alkenyloxy, in each case having up to 6 C atoms, and $Y^{1-4}$ H or F.

8. The LC medium according to claim 5, further comprising one or more compounds of the following formula

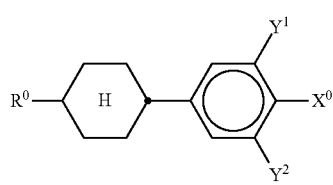

X in which

R⁰ unsubstituted or halogenated alkyl or alkoxy having 1 to 15 C atoms, where, in addition, one or more CH₂ groups in these radicals may in each case be replaced, independently of one another, by —CF₂O—,

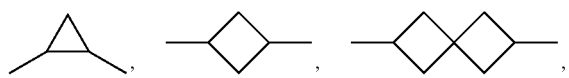

—O—, —CO—O— or —O—CO— in such a way that O atoms are not linked directly to one another, X⁰ F, Cl, halogenated alkyl, halogenated alkoxy or halogenated alkenyloxy, in each case having up to 6 C atoms, and $y^{1-2}$ H or F.

9. The LC medium according to claim 5, further comprising one or more compounds of the following formula

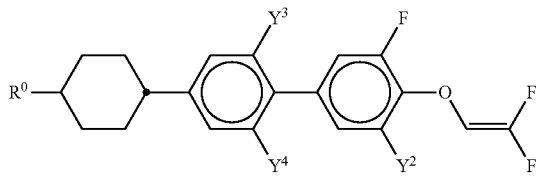

XI in which

R⁰ unsubstituted or halogenated alkyl or alkoxy having 1 to 15 C atoms, where, in addition, one or more CH₂ groups in these radicals may in each case be replaced, independently of one another, by —CF₂O—,

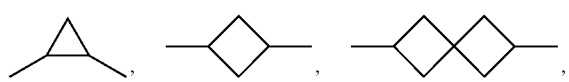

—O—, —CO—O— or —O—CO— in such a way that O atoms are not linked directly to one another, and $Y^{2-4}$ H or F.

10. The LC medium according to claim 1, further comprising one or more compounds of the following formulae

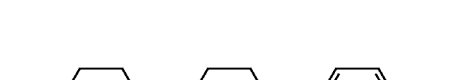

XIII

XIV

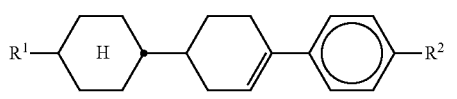

XV in which

R¹ and R² in each case, independently of one another, denote alkyl, alkoxy, oxaalkyl or fluoroalkyl, in each case having 1 to 7 C atoms, and L denotes H or F.

11. The LC medium according to claim 10, further comprising one or more compounds of the following formulae

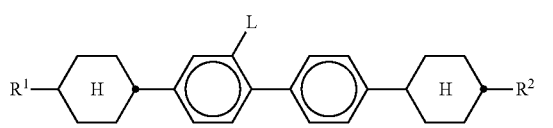

XVII1

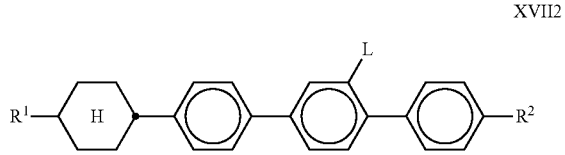

XVII2

XVII3 in which

R¹ and R² n each case, independently of one another, denote alkyl, alkoxy, oxaalkyl or fluoroalkyl, in each case having 1 to 7 C atoms, and L denotes H or F.

12. The LC medium according to claim 5, further comprising one or more compounds of the following formulae

XVIII

-continued

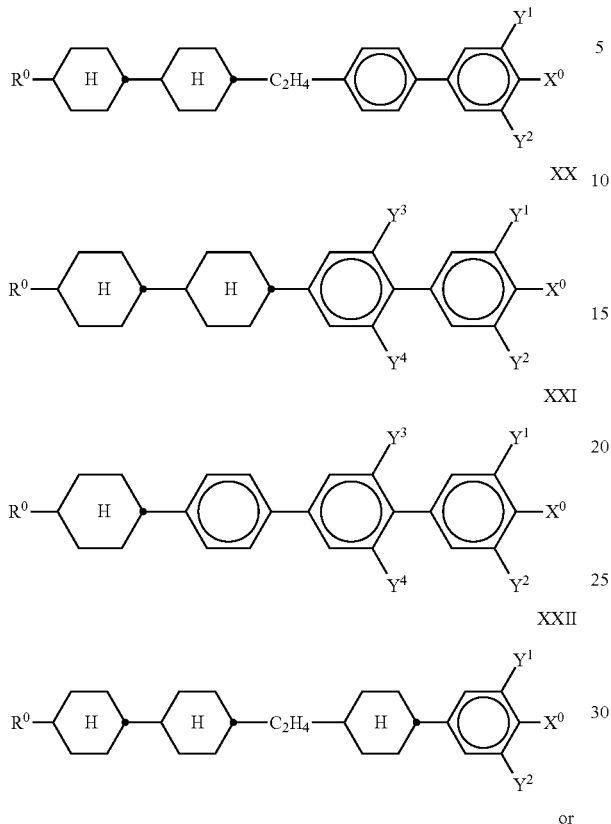

in which
R⁰ unsubstituted or halogenated alkyl or alkoxy having 1 to 15 C atoms, where, in addition, one or more CH₂ groups in these radicals may in each case be replaced, independently of one another, by —CF₂O—,

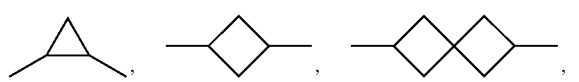

—O—, —CO—O— or —O—CO— in such a way that O atoms are not linked directly to one another, X⁰ F, Cl, halogenated alkyl, halogenated alkoxy or halogenated alkenyloxy, in each case having up to 6 C atoms, and $Y^{1-4}$ H or F.

13. The LC medium according to claim 1, further comprising one or more stabilizers of the following formulae

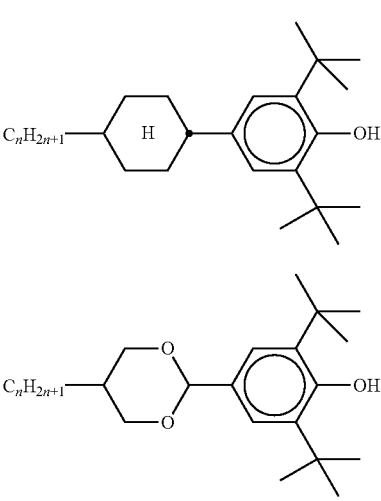

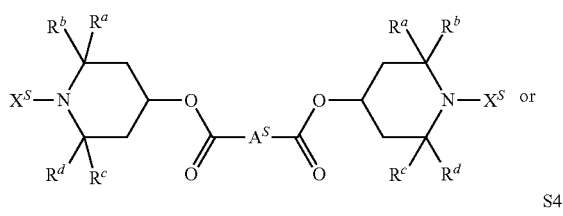

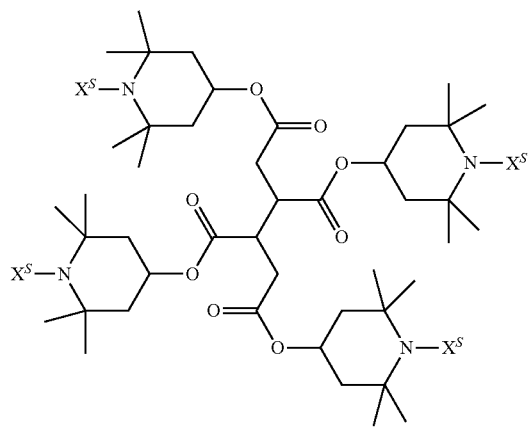

in which the individual radicals, in each case independently of one another and identically or differently on each occurrence, have the following meaning
$R^{a-d}$ $C_{1-20}$-straight-chain or $C_{3-10}$-branched alkyl,
$X^s$ H, $CH_3$, OH or O*,
$A^s$ $C_{1-20}$-straight-chain, $C_{3-20}$-branched or $C_{3-20}$-cyclic alkylene, which is optionally substituted, and
n an integer from 1 to 6.

14. The LC medium according to claim 1 having no compounds which contain a C═C double bond, except for a C═C double bond as constituent of a polymerizable group or of an aromatic or unsaturated ring.

15. A process for the preparation of an LC medium according to claim 1, comprising mixing together one or more compounds of the formula IA1a or IA1b and IB1a, and optionally one or more additional compounds of formula IA and one or more additional compounds of the formula IB.

16. An electro-optical device, comprising an LC medium according to claim 1.

17. A product, which is one of TN, PS-TN, STN, TN-TFT, OCB, IPS, PS-IPS, FFS, PS-FFS, positive-VA or PS-positive-VA displays, or LC windows or shutter spectacles for 3D applications, comprising an LC medium according to claim 1.

18. An LC display containing an LC medium according to claim 1.

19. An LC display according to claim 18, that is a TN, PS-TN, STN, TN-TFT, OCB, IPS, PS-IPS, FFS, PS-FFS, positive-VA or PS-positive-VA display.

20. The LC medium according to claim 2, wherein alkyl and alkyl* are, each independently, ethyl, propyl, butyl or pentyl, and alkoxy is methoxy, ethoxy or propoxy.

21. The LC medium according to claim 3, wherein alkyl is ethyl, propyl, butyl or pentyl, and alkoxy is methoxy, ethoxy or propoxy.

22. The LC medium according to claim 1, wherein the LC medium contains 2-30% of one or more compounds selected from formulae XVIb1, XVIb2 and XVIb3.

23. The LC medium according to claim 1, wherein the LC medium contains two or more compounds selected from formulae XVIb1, XVIb2 and XVIb3.

24. An LC medium, having positive dielectric anisotropy and comprising:

one or more compounds of formula IA and one or more compounds of formula IB

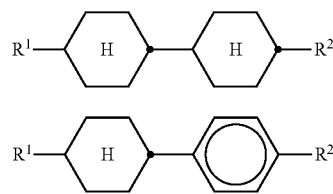

in which $R^1$ and $R^2$ n each case, independently of one another, denote alkyl, alkoxy, oxaalkyl or fluoroalkyl, in each case having 1 to 7 C atoms, wherein the LC medium comprises no compounds of the formulae IA and IB in which one or both radicals $R^1$ or $R^2$ contain a C═C double bond and wherein of the one or more compounds of formula IA at least one of formula IA1a and/or formula IA1b is present

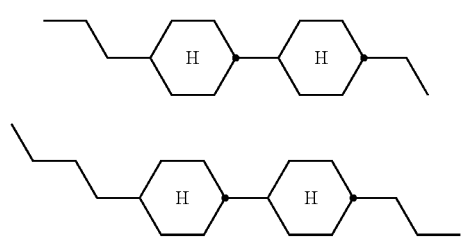

and of the one or more compounds of formula IB at least a compound of formula IB1a is present

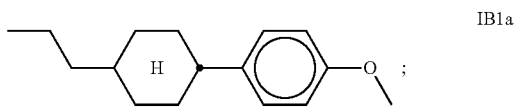

one or more compounds of formulae II and III

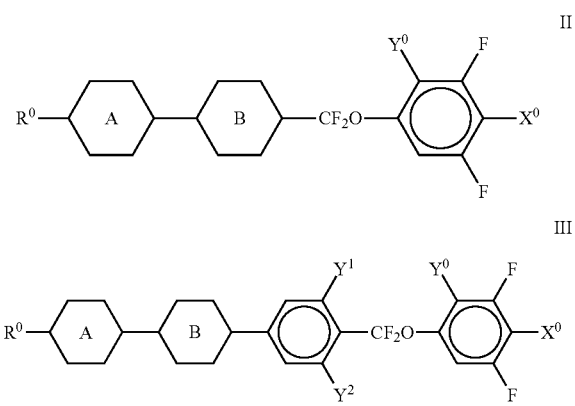

in which the individual radicals, in each case independently of one another and identically or differently on each occurrence, have the following meaning

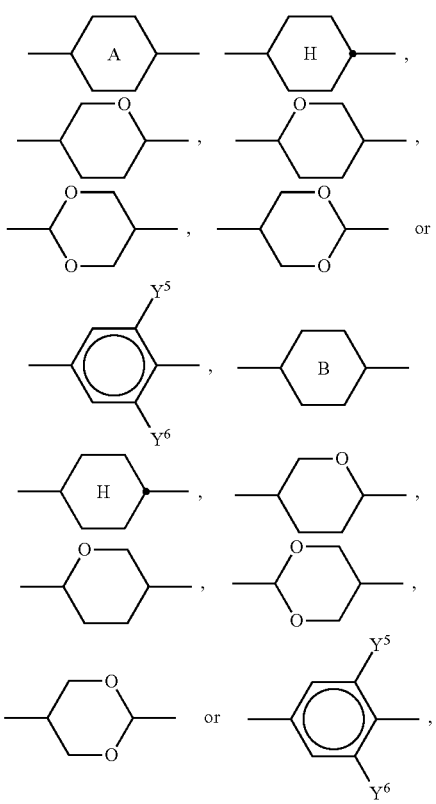

R⁰ unsubstituted or halogenated alkyl or alkoxy having 1 to 15 C atoms, where, in addition, one or more CH₂ groups in these radicals may in each case be replaced, independently of one another, by —CF₂O—,

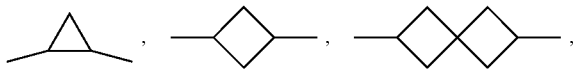

—O—, —CO—O— or —O—CO— in such a way that O atoms are not linked directly to one another,
  X⁰ F, Cl, halogenated alkyl, halogenated alkoxy or halogenated alkenyloxy, in each case having up to 6 C atoms,
  $Y^{1-6}$ H or F, and
  Y⁰ H or CH₃; and
one or more compounds of formula X

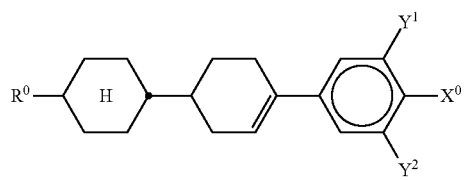

in which
  R⁰ unsubstituted or halogenated alkyl or alkoxy having 1 to 15 C atoms, where, in addition, one or more CH₂ groups in these radicals may in each case be replaced, independently of one another, by —CF₂O—,

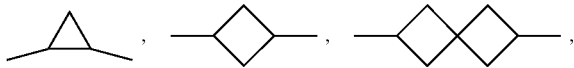

—O—, —CO—O— or —O—CO— in such a way that O atoms are not linked directly to one another,
  X⁰ F, Cl, halogenated alkyl, halogenated alkoxy or halogenated alkenyloxy, in each case having up to 6 C atoms, and
  $Y^{1-4}$ H or F.

25. An LC medium, having positive dielectric anisotropy and comprising:
  one or more compounds of formula IA and one or more compounds of formula IB

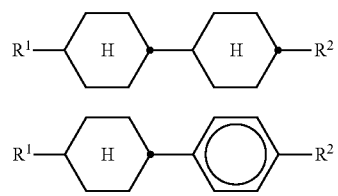

in which R¹ and R² n each case, independently of one another, denote alkyl, alkoxy, oxaalkyl or fluoroalkyl, in each case having 1 to 7 C atoms,
wherein the LC medium comprises no compounds of the formulae IA and IB in which one or both radicals R¹ or R² contain a C=C double bond and wherein of the one or more compounds of formula IA at least one of formula IA1a and/or formula IA1b is present

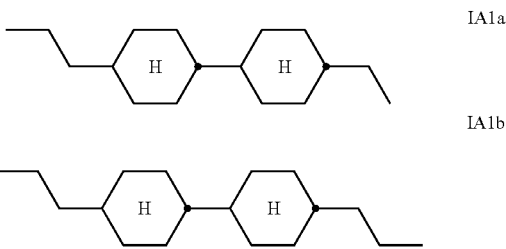

and of the one or more compounds of formula IB at least a compound of formula IB1a is present

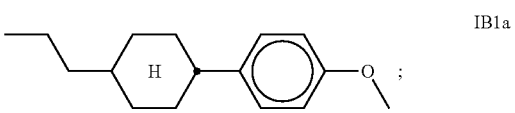

one or more compounds of formulae II and III

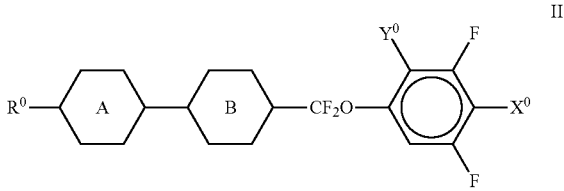

in which the individual radicals, in each case independently of one another and identically or differently on each occurrence, have the following meaning

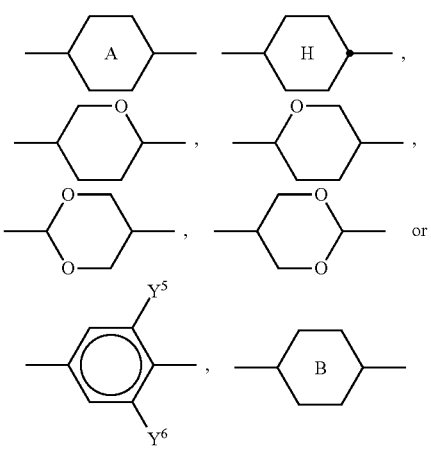

-continued

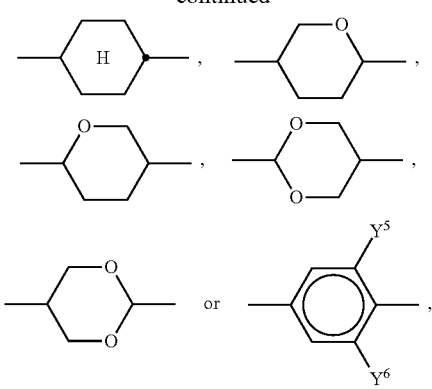

R⁰ unsubstituted or halogenated alkyl or alkoxy having 1 to 15 C atoms, where, in addition, one or more CH₂ groups in these radicals may in each case be replaced, independently of one another, by —CF₂O—,

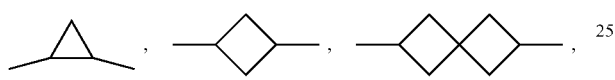

—O—, —CO—O— or —O—CO— in such a way that O atoms are not linked directly to one another, X⁰ F, Cl, halogenated alkyl, halogenated alkoxy or halogenated alkenyloxy, in each case having up to 6 C atoms, $Y^{1-6}$ H or F, and Y⁰ H or CH₃; and one or more compounds of formula XI

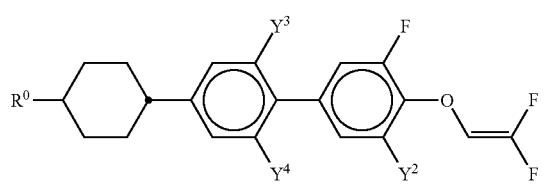

in which

R⁰ unsubstituted or halogenated alkyl or alkoxy having 1 to 15 C atoms, where, in addition, one or more CH₂ groups in these radicals may in each case be replaced, independently of one another, by —CF₂O—,

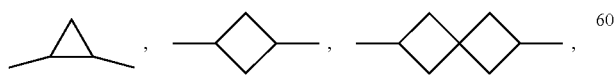

—O—, —CO—O— or —O—CO— in such a way that O atoms are not linked directly to one another, and $Y^{2-4}$ H or F.

26. An LC medium, having positive dielectric anisotropy and comprising:

one or more compounds of formula IA and one or more compounds of formula IB

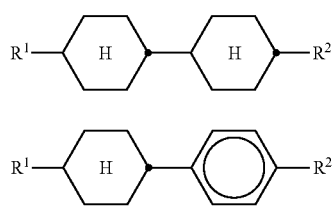

in which R¹ and R² n each case, independently of one another, denote alkyl, alkoxy, oxaalkyl or fluoroalkyl, in each case having 1 to 7 C atoms, wherein the LC medium comprises no compounds of the formulae IA and IB in which one or both radicals R¹ or R² contain a C=C double bond and wherein of the one or more compounds of formula IA at least one of formula IA1a and/or formula IA1b is present

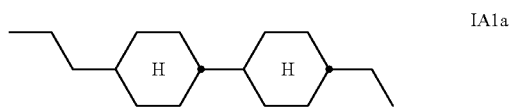

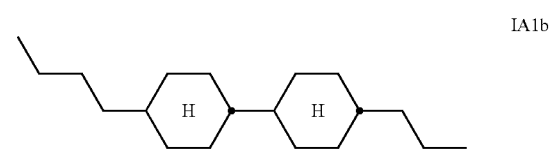

and of the one or more compounds of formula IB at least a compound of formula IB1a is present

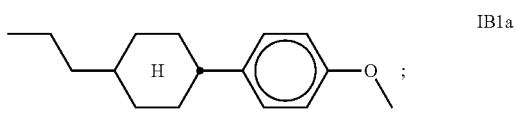

and one or more stabilizers of the following formulae

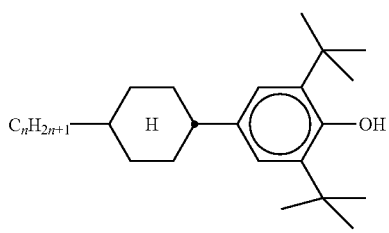

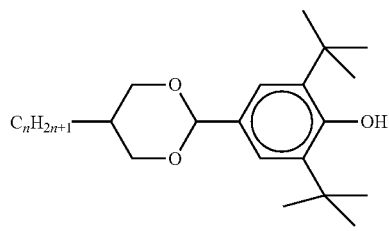
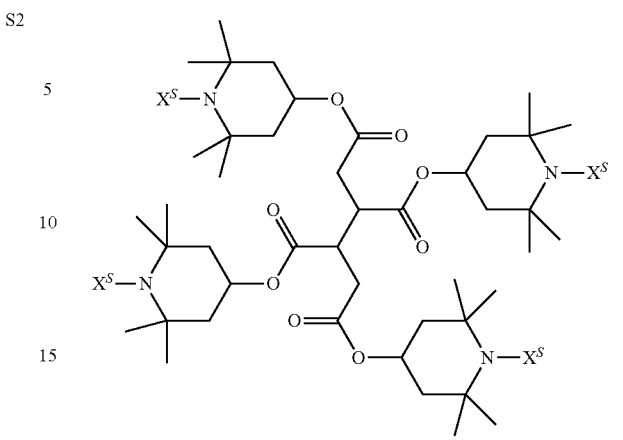
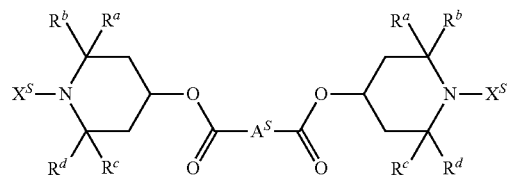
in which the individual radicals, in each case independently of one another and identically or differently on each occurrence, have the following meaning
$R^{a-d}$ $C_{1-10}$-straight-chain or $C_{3-10}$-branched alkyl,
$X^s$ H, $CH_3$, OH or O*,
$A^s$ $C_{1-20}$-straight-chain, $C_{3-20}$-branched or $C_{3-20}$-cyclic alkylene, which is optionally substituted, and
n an integer from 1 to 6.
* * * * *